United States Patent
Peled et al.

(10) Patent No.: US 10,403,889 B2
(45) Date of Patent: Sep. 3, 2019

(54) HIGH-CAPACITY SILICON NANOWIRE BASED ANODE FOR LITHIUM-ION BATTERIES

(71) Applicant: RAMOT AT TEL-AVIV UNIVERSITY LTD., Tel Aviv (IL)

(72) Inventors: Emanuel Peled, Even Yehuda (IL); Fernando Patolsky, Rehovot (IL); Diana Golodnitsky, Rishon Letzion (IL); Kathrin Freedman, Tsoran (IL); Guy Davidi, Even Yehuda (IL); Dan Schneier, Haifa (IL)

(73) Assignee: RAMOT AT TEL-AVIV UNLVERSITY LTD., Tel Aviv (IL)

(*) Notice: Subject to any disclaimer, the term of this patent is extended or adjusted under 35 U.S.C. 154(b) by 355 days.

(21) Appl. No.: 15/520,526

(22) PCT Filed: Oct. 21, 2015

(86) PCT No.: PCT/IL2015/051037
§ 371 (c)(1),
(2) Date: Apr. 20, 2017

(87) PCT Pub. No.: WO2016/063281
PCT Pub. Date: Apr. 28, 2016

(65) Prior Publication Data
US 2017/0309903 A1    Oct. 26, 2017

Related U.S. Application Data

(60) Provisional application No. 62/066,379, filed on Oct. 21, 2015.

(51) Int. Cl.
| | |
|---|---|
| H01M 4/38 | (2006.01) |
| H01M 4/134 | (2010.01) |
| H01M 4/04 | (2006.01) |
| H01M 4/1395 | (2010.01) |
| H01M 4/36 | (2006.01) |
| H01M 4/66 | (2006.01) |
| H01M 4/70 | (2006.01) |
| H01M 4/80 | (2006.01) |
| H01M 10/052 | (2010.01) |
| C23C 18/44 | (2006.01) |
| B82Y 30/00 | (2011.01) |

(52) U.S. Cl.
CPC .......... *H01M 4/386* (2013.01); *C23C 18/44* (2013.01); *H01M 4/0428* (2013.01); *H01M 4/134* (2013.01); *H01M 4/1395* (2013.01); *H01M 4/366* (2013.01); *H01M 4/661* (2013.01); *H01M 4/663* (2013.01); *H01M 4/667* (2013.01); *H01M 4/70* (2013.01); *H01M 4/80* (2013.01); *H01M 10/052* (2013.01); *B82Y 30/00* (2013.01); *Y02T 10/7011* (2013.01)

(58) Field of Classification Search
None
See application file for complete search history.

(56) References Cited

U.S. PATENT DOCUMENTS

| | | |
|---|---|---|
| 7,402,829 B2 | 7/2008 | Green |
| 7,683,359 B2 | 3/2010 | Green |
| 7,816,031 B2 | 10/2010 | Cui |
| 7,829,225 B2 | 11/2010 | Salot |
| 7,842,535 B2 | 11/2010 | Green |
| 7,985,454 B2 | 7/2011 | Niu |
| 8,017,430 B2 | 9/2011 | Green |
| 8,384,058 B2 | 2/2013 | Green |
| 8,420,258 B2 | 4/2013 | Rojeski |
| 8,435,676 B2 | 5/2013 | Zhamu |
| 8,450,012 B2 | 5/2013 | Cui |
| 8,481,214 B2 | 7/2013 | Rojeski |
| 8,556,996 B2 | 10/2013 | Loveness |
| 8,591,990 B2 | 11/2013 | Cai et al. |
| 8,597,831 B2 | 12/2013 | Green |
| 8,632,873 B2 | 1/2014 | Patolsky |
| 8,637,185 B2 | 1/2014 | Berdichevsky |
| 8,652,683 B2 | 2/2014 | Rojeski |
| 8,658,310 B2 | 2/2014 | Rojeski |
| 8,791,449 B2 | 7/2014 | Buchine |
| 8,828,481 B2 | 9/2014 | Burton |
| 8,877,374 B2 | 11/2014 | Cui |
| 8,968,820 B2 | 3/2015 | Zhamu |
| 9,061,902 B2 | 6/2015 | Cui |

(Continued)

FOREIGN PATENT DOCUMENTS

| | | |
|---|---|---|
| CN | 103000865 | 3/2013 |
| EP | 2579365 A1 | 4/2013 |

(Continued)

OTHER PUBLICATIONS

Chen et al., (2011) A Patterned 3D Silicon Anode Fabricated by Electrodeposition on a Virus-Structured Current Collector. Advanced Functional Materials 21(2): 380-387.

(Continued)

*Primary Examiner* — Sarah A. Slifka
(74) *Attorney, Agent, or Firm* — Browdy and Neimark, PLLC

(57) ABSTRACT

The present invention provides anodes comprising an electrically conductive substrate, comprising at least one non-uniform surface; and a random network of silicon nanowires (Si NWs) chemically grown on said at least one non-uniform surface of the substrate, wherein the Si NWs have at least about 30% amorphous morphology, and methods of manufacturing of the anodes. Further provided are lithium ion batteries comprising said anodes.

30 Claims, 20 Drawing Sheets

(56) References Cited

U.S. PATENT DOCUMENTS

| | | | |
|---|---|---|---|
| 9,142,864 B2 | 9/2015 | Roberts | |
| 9,166,252 B2 | 10/2015 | Zhamu | |
| 9,172,088 B2 | 10/2015 | Loveness | |
| 9,172,094 B2 | 10/2015 | Loveness | |
| 9,202,868 B2 | 12/2015 | Buchine | |
| 9,209,456 B2 | 12/2015 | Fasching | |
| 9,231,243 B2 | 1/2016 | Cui | |
| 9,412,998 B2 | 8/2016 | Rojeski | |
| 9,422,158 B2 | 8/2016 | Pehrsson | |
| 9,437,370 B2 | 9/2016 | Chen | |
| 9,472,804 B2 | 10/2016 | Burshtain | |
| 9,531,006 B2 | 12/2016 | Sun | |
| 9,536,737 B2 | 1/2017 | Patolsky | |
| 2009/0197416 A1 | 8/2009 | Lee et al. | |
| 2009/0214944 A1 | 8/2009 | Rojeski | |
| 2011/0024169 A1 | 2/2011 | Buchine et al. | |
| 2011/0117436 A1 | 5/2011 | Ma et al. | |
| 2011/0151290 A1 | 6/2011 | Cui et al. | |
| 2011/0309306 A1 | 12/2011 | Zhou | |
| 2012/0148799 A1 | 6/2012 | Patolsky et al. | |
| 2013/0089783 A1 | 4/2013 | Yoo et al. | |
| 2014/0370385 A1 | 12/2014 | Zeitler | |
| 2015/0337438 A1 | 11/2015 | Hong et al. | |

FOREIGN PATENT DOCUMENTS

| | | |
|---|---|---|
| TW | 201248976 | 6/2009 |
| WO | 2010052704 A2 | 5/2010 |
| WO | 2010138617 A2 | 12/2010 |
| WO | 2012080252 A1 | 6/2012 |
| WO | 2013052456 A1 | 4/2013 |
| WO | 2013098657 A1 | 7/2013 |

OTHER PUBLICATIONS

Chockla et al., (2011) Silicon Nanowire Fabric as a Lithium Ion Battery Electrode Material. J Am Chem Soc 133(51): 20914-20921.

Cui et al., (2009) Crystalline-Amorphous Core-Shell Silicon Nanowires for High Capacity and High Current Battery Electrodes. Nano Lett 9(1): 491-495.

Hwang et al., (2015) All-in-one assembly based on 3D-intertangled and cross jointed architectures of Si/Cu 1D-nanowires for lithium ion batteries. Sci Rep 5: 8623; 7 pages.

Liu et al., (2013) Three-dimensional hierarchical ternary nanostructures for high-performance Li-ion battery anodes. Nano Lett 13(7): 3414-9.

Magasinski et al., (2010) High-performance lithium-ion anodes using a hierarchical bottom-up approach. Nat Mater 9(4): 353-8.

Beaulieu et al., "Colossal Reversible Volume Changes in Lithium Alloys". Electrochemical and Solid-State Letters, 4(9), A137-A140 (2001).

Besenhard et al., "Will advanced lithium-alloy anodes have a chance in lithium-ion batteries?". Journal of Power Sources, 68(1), 87-90 (1997).

Bogart et al., "Lithium Ion Battery Performance of Silicon Nanowires with Carbon Skin. Acs Nano", 8(1), 915-922 (2013).

Chan et al., "High-performance lithium battery anodes using silicon nanowires." Nature nanotechnology, 3(1), 31-35 (2008).

Chan et al., "Surface chemistry and morphology of the solid electrolyte interphase on silicon nanowire lithium-ion battery anodes." Journal of Power Sources, 189(2), 1132-1140 (2009).

Cho & Picraux, "Silicon Nanowire Degradation and Stabilization during Lithium Cycling by SEI Layer Formation." Nano letters, 14(6), 3088-3095 (2014).

Deshpande, "Understanding and Improving Lithiumion Batteries Throught Mathematical Modeling and Experiments" Chemical and material Engineering 1-363 (2011).

Hatchard & Dahn, "In situ XRD and electrochemical study of the reaction of lithium with amorphous silicon." Journal of The Electrochemical Society, 151(6), A838-A842 (2004).

Hofmann et al., "Ledge-flow-controlled catalyst interface dynamics during Si nanowire growth." Nature materials, 7(5), 372-375 (2008).

Khachadorian et al., "Elastic Properties of Crystalline-Amorphous Core-Shell Silicon Nanowires." The Journal of Physical Chemistry C, 117(8), 4219-4226 (2013).

Khachadorian et al., "Magnesium and magnesium-silicide coated silicon nanowire composite anodes for lithium-ion batteries." Journal of Materials Chemistry A, 1(5), 1600-1612 (2013).

Laik et al., "Silicon nanowires as negative electrode for lithium-ion microbatteries." Electrochimica Acta, 53(17), 5528-5532 (2008).

Lee et al., "SEI Layer Formation on Amorphous Si Thin Electrode during Precycling." Journal of The Electrochemical Society, 154(6), A515-A519 (2007).

Li et al., "The crystal structural evolution of nano-Si anode caused by lithium insertion and extraction at room temperature." Solid State Ionics, 135(1), 181-191 (2000).

Liu et al., "Size-Dependent Fracture of Silicon Nanoparticles During Lithiation." Acs Nano, 6(2), 1522-1531 (2012).

Liu et al., "Single Nanowire Electrode Electrochemistry of Silicon Anode by in Situ Atomic Force Microscopy: Solid Electrolyte Interphase Growth and Mechanical Properties." ACS applied materials & interfaces, 6(22), 20317-20323 (2014).

Ma et al., "Nest-like Silicon Nanospheres for High-Capacity Lithium Storage." Advanced Materials, 19(22), 4067-4070 (2007).

Netz et al., "The formation and properties of amorphous silicon as negative electrode reactant in lithium systems." Journal of power sources, 119, 95-100 (2003).

Ogata et al., "Revealing lithium-silicide phase transformations in nano-structured silicon-based lithium ion batteries via in situ NMR spectroscopy." Nature communications, 5 (2014).

Park et al., "Silicon Nanotube Battery Anodes." Nano letters, 9(11), 3844-3847 (2009).

Peng et al., "Synthesis of Large-Area Silicon Nanowire Arrays via Self-Assembling Nanoelectrochemistry." Advanced Materials, 14(16), 1164-1167 (2002).

Ryu et al., "Failure Modes of Silicon Powder Negative Electrode in Lithium Secondary Batteries." Electrochemical and solid-state letters, 7(10), A306-A309 (2004).

Schmidt et al., "Growth, Thermodynamics, and Electrical Properties of Silicon Nanowires." Chemical reviews, 110(1), 361-388 (2010).

Sivakov et al., "Realization of Vertical and Zigzag Single Crystalline Silicon Nanowire Architectures." The Journal of Physical Chemistry C, 114(9), 3798-3803 (2010).

Song et al., "Arrays of Sealed Silicon Nanotubes as Anodes for Lithium Ion Batteries." Nano letters, 10(5), 1710-1716 (2010).

Wagner & Ellis, "Vapor-Liquid-Solid Mechanism of Single Crystal Growth" Applied Physics Letters, 4(5), 89-90 (1964).

Wu et al., "Stable cycling of double-walled silicon nanotube battery anodes through solid-electrolyte interphase control." Nature nanotechnology, 7(5), 310-315 (2012).

Xu et al., "Modified Solid Electrolyte Interphase of Silicon Nanowire Anodes for Lithium-Ion Batteries." ECS Transactions, 33(23), 55-61 (2011).

Yao et al., "Interconnected Silicon Hollow Nanospheres for Lithium-Ion Battery Anodes with Long Cycle Life." Nano letters, 11(7), 2949-2954 (2011).

Zhou et al., "Controlled Li doping of Si nanowires by electrochemical insertion method." Applied physics letters, 75(16), 2447-2449 (1999).

HIGH-CAPACITY SILICON NANOWIRE BASED ANODE FOR LITHIUM-ION BATTERIES

FIELD OF THE INVENTION

The present invention is directed to silicon nanowire-based anodes and methods of fabrication thereof.

BACKGROUND OF THE INVENTION

The increasing demand in energy storage has stimulated a significant interest in lithium-battery research. Most commercially available lithium-ion batteries include graphite based anodes, wherein the theoretical capacity of graphite is 372 mAh/g. In order to increase the energy density of the lithium batteries, higher capacity anodes are required. Silicon has attracted considerable attention in the field of Li-batteries due to its theoretical capacity of 4200 mAh/g, which is an order of magnitude greater than that of graphite. Additionally, Si exhibits a low de-lithiation potential against Li/Li$^+$, such that high battery voltages can be reached. Furthermore, silicon is a low-cost and environmentally-friendly material, and is the second most abundant material on Earth.

The main disadvantage of high-capacity anode materials, such as Si, is their particularly large volume expansion and contraction during Li insertion/de-insertion, followed by cracking and pulverization of the anode material. For instance, silicon exhibits up to about 320% volume expansion upon complete alloying with lithium, thus inducing a rapid degradation of Si-based anodes. One plausible way to deal with the detrimental pulverization is to reduce the size, and/or thickness of the anode down to the nanoscale. Several approaches have been reported, including the use of nanospheres, nanotubes, nanowire arrays and porous structures (Y. Yao, M. T. McDowell, I. Ryu, H. Wu, N. A. Liu, L. B. Hu, W. D. Nix, Y. Cui *Nano Lett.*, 11 (2011), pp. 2949B. Hu; H. Ma, F. Y. Cheng, J. Chen, J. Z. Zhao, C. S. Li, Z. L. Tao, J. Liang *Adv. Mater.*, 19 (2007), p. 4067; T. Song, J. L. Xia, J. H. Lee, D. H. Lee, M. S. Kwon, J. M. Choi, J. Wu, S. K. Doo, H. Chang, W. Il Park, D. S. Zang, H. Kim, Y. G. Huang, K. C. Hwang, J. A. Rogers, U. Paik *Nano Lett.*, 10 (2010), pp. 1710; M. H. Park, M. G. Kim, J. Joo, K. Kim, J. Kim, S. Ahn, Y. Cui, J. Cho, *Nano Lett.*, 9 (2009), pp. 3844). Si nanostructures have the advantage of a shorter diffusion distance for lithium species, which can improve the power performance of the battery. It has been shown that the high surface-to-volume ratio of nanoparticles helps to better withstand stress, and substantially limit the cracking extent. The existence of a strong particle size-dependent fracture behavior of Si nanoparticles during the first lithiation cycle was shown experimentally; that is, there exists a critical particle size of ~150 nm below which cracking does not occur, and above which surface cracking and particle fracture is observed. Silicon nanowires (SiNWs) provide a highly porous medium, which allows easy expansion of silicon during lithium insertion.

There are two main approaches for the preparation of silicon nanowires: growth methods and etching methods. The vapor-liquid-solid (VLS) mechanism, discovered about 50 years ago by Wagner and Ellis is the most popular of the growth methods (R. S. Wagner and W. C. Ellis, *Appl. Phys. Lett.*, 1964, 4, 89-91). VLS growth is usually performed in a chemical-vapor-deposition (CVD) reactor, by decomposition of silicon-bearing gases, like silane (SiH$_4$) or silicon tetrachloride (SiCl$_4$), over a temperature range of about 300-1000° C., depending on the gas precursor and the type of metal catalysts employed. Silicon NWs can be grown on different types of metal catalysts, like Au, Cu, Ag, In, Ga, Zn and others.

SiNWs for rechargeable Li battery applications, grown on the surface of a substrate, for example on stainless steel, generally have a "forest" structure (C. K. Chan, H. L. Peng, G. Liu, K. McIlwrath, X. F. Zhang, R. A. Huggins and Y. Cui, *Nat. Nanotechnol.*, 2008, 3, 31-35; B. Laïk, L. Eude, J.-P. Pereira-Ramos, C. S. Cojocaru, D. Pribat and E. Rouvière, *Electrochim. Acta*, 2008, 53, 5528-5532). The main drawbacks of this approach are: low surface capacity (typically less than 1 mAh/cm$^2$), very high irreversible capacity (about 30%), which is required for the formation of the SEI (solid electrolyte interphase), and insufficient current efficiency (typically 95 to 99.5%). In contrast, in the state-of art lithium-ion-battery technology, employing graphite-based anodes, the irreversible capacity is about 10% or less, the surface capacity is about 3-4 mAh/cm$^2$, and the current efficiency is over 99.9%. Furthermore, most publications on SiNWs-based anodes demonstrate a single desired property (low $Q_{ir}$, high surface capacity, high electrode capacity (mAh/gSi), high current efficiency or high cycle number) but not all of said properties are achieved for the same electrode. In most cases, good performances were demonstrated for very low and impractical surface capacity only. Furthermore, it was shown that SiNW forest agglomerates to a thick, solid mass of Si near the substrate, during the lithiation and de-lithiation processes, leading to the delamination of the SiNWs from the substrate (A. Kohandehghan, P. Kalisvaart, M. Kupsta, B. Zahiri, B. Shalchi Amirkhiz, Zh. Li, E. L. Memarzadeh, L. A. Benderskyc and D. Mitlin, *J. Mater. Chem. A*, 2013, 1, 1600-1612).

U.S. Pat. No. 8,637,185 is directed to conductive substrates having open structures and fractional void volumes of at least about 25% or, more specifically, or at least about 50% for use in lithium ion batteries. Nanostructured active materials are deposited over such substrates to form battery electrodes. In specific embodiments, a nanoscale layer of silicon is deposited over a metallic mesh to form a negative electrode. In another embodiment, a conductive substrate is a perforated sheet with multiple openings, such that a nanostructured active material is deposited into the openings but not on the external surfaces of the sheet.

Silicon nanowires or whiskers supported on carbonaceous materials or on silicon substrates, for use as Li-ion battery anode have also been reported.

U.S. Pat. No. 8,791,449 is directed to a process for etching a silicon-containing substrate to form nanowire arrays, which can be used for manufacturing an anode material for lithium ion batteries comprising nanostructured silicon.

US Patent Application No. 2011/0117436 is directed to carbon nanofibers having a surface and including at least one crystalline whisker extending from the surface of the carbon nanofiber, and to battery anode compositions that can be formed from a plurality of carbon nanofibers each including a plurality of crystalline whiskers.

International Patent Application No. 2013/052456 discloses nanostructured materials including silicon-based nanostructures such as silicon nanowires and coated silicon nanowires, nanostructures disposed on substrates comprising active materials or current collectors such as silicon nanowires disposed on graphite particles or copper electrode plates, and lithium-ion battery anode composites comprising high-capacity active material nanostructures formed on a porous copper and/or graphite powder substrate.

A recent study used Si nanowires grown on a conducting carbon-fiber support to provide a robust model battery system that can be studied by $^7$Li in situ NMR spectroscopy (K. Ogata, E. Salager, C. J. Kerr, A. E. Fraser, C. Ducati, A. J. Morris, S. Hofmann & C. P. Grey, Nature Communications 5, 3217 (2014)).

Additional problem related to depositing or growing high loading SiNWs on a substrate surface or applying SiNWs to a conductive substrate, in order to incorporate said SiNWs into an anode structure, is a poor electric contact between the nanowires and the substrate and lack of direct electron conduction path to the substrate. Furthermore, in all lithium batteries the anode is covered by a thin solid electrolyte interphase (SEI), which is formed during the first charging cycle. Ideally, this SEI is permeable to lithium ions, while being an electronic insulator, thus preventing or slowing down further electrolyte decomposition during the cycles that follow. However, in the case of the silicon-based anodes, "breathing" of the anode material during insertion/de-insertion of lithium causes cracks, exposing the bare silicon surface to the electrolyte, and this is followed by the creation of a fresh SEI, thus losing battery capacity and increasing battery impedance (H. Wu, G. Chan, J. W. Choi, I. Ryu, Y. Yao, M. T. McDowell, S. W. Lee, A. Jackson, Y. Yang, L. Hu and Y. Cui, *Nat. Nanotechnol.*, 2012, 7, 310-315). Reduction in silicon nanowire diameter with number of cycles due to SEI formation was also reported, while significantly greater Si loss was near the nanowire base, which was in contact with the current collector (J.-H. Cho and S. T. Picraux, *Nano Lett.* 2014, 14, 3088-3095). Additionally, the low electrical conductivity of Si sometimes requires the use of conductive additives in the anode film.

There remains an unmet need for the improved silicon nanostructures-based anodes, in particular for Li-ion batteries, which would meet the requirements of said batteries for portable and electric-vehicle applications. The silicon nanostructures-based anodes should be capable of providing high capacity, low irreversible capacity, high current efficiency and a stable cycle life.

SUMMARY OF THE INVENTION

The present invention provides a high-capacity silicon nanowires-based anode for lithium ion batteries. In order to overcome the disadvantages of the "SiNW forest" concept, inventors of the present invention developed a novel approach based on the growth of SiNWs on non-uniform surfaces of conductive substrates. The present invention is based in part on the unexpected finding that growth of a random network of highly dense SiNWs on carbon fiber-based conductive networks, having non-uniform surfaces, enables production of Li ion battery anodes having remarkably high loadings of up to about 20 mg Si/cm$^2$. It was further surprisingly found that said high-loading anodes were capable of providing very high capacity of up to about 16 mAh/cm$^2$, negligible irreversible capacity of not more than 10% for 3-4 mAh/cm$^2$ capacity anodes, and current efficiency greater than 99.5%. The random-network SiNWs-based anodes of the present invention not only meet the capacity and current efficiency requirements of lithium batteries for portable and electric-vehicle applications, but also exhibit a stable cycle life. The SiNWs-based anodes of the present invention were cycled for over 300 cycles, with only a minor capacity degradation of 10-20%. The chemical bonds formed between the SiNWs and the non-uniform surfaces of the conductive substrates are therefore sufficiently stable and the SiNWs remain chemically connected to the substrate for more than 300 charge/discharge cycles. Importantly, the SiNWs grown on the conductive substrates having at least one non-uniform surface do not require addition of a binder to apply the SiNWs to the substrate and/or to a current collector, thus increasing mechanic strength of the anode and enhancing electric contact between the components thereof. The SiNWs grown on the non-uniform surfaces of the conductive substrate according to the principles of the present invention are at least partially amorphous. Without wishing to being bound by theory or mechanism of action, the stable cycle life of the SiNWs-based anodes of the present invention can be attributed, inter alia, to the random network structure of the SiNWs grown on the non-uniform surfaces, to the good contact of the SiNWs to the substrate and to the at least partially amorphous nature of the SiNWs.

According to a first aspect, the present invention provides an anode comprising an electrically conductive substrate, comprising at least one non-uniform surface; and a random network of silicon nanowires (SiNWs) chemically grown on the at least one non-uniform surface of the substrate, wherein the SiNWs have at least about 30% amorphous morphology. According to some embodiments, said anode is a Li-ion battery anode. According to some embodiments, said non-uniform surface is continuous.

According to some embodiments, at least about 30% of the SiNWs mass is amorphous. According to further embodiments, at least about 30% of the mass of each SiNW is amorphous.

According to some embodiments, from about 30% to about 95% of the SiNWs mass is amorphous. According to further embodiments, from about 30% to about 95% of the mass of each SiNW is amorphous.

In some embodiments, the SiNWs have a core-shell structure. In some embodiments, the SiNW core is crystalline. In some embodiments, the SiNW shell is amorphous. In some embodiments, the SiNW shell constitutes at least about 30% of the mass of the SiNW. In further embodiments, the SiNW shell constitutes from about 30% to about 95% of the mass of the SiNW.

According to some embodiments, the SiNWs have a thickness of from about 10 nm to about 500 nm. According to further embodiments, the SiNWs have a thickness of from about 20 nm to about 300 nm. According to some embodiments, the length of the SiNWs is from about 1 μm to about 200 μm. In particular embodiments, the SiNWs have an aspect ratio of from about 20:1 to about 20,000:1.

According to some embodiments, the SiNW core has a thickness of from about 5 nm to about 40 nm. According to some embodiments, the SiNW shell has a thickness of from about 10 nm to about 120 nm. In certain embodiments, said shell is amorphous.

According to some embodiments, the substrate comprises a plurality of non-uniform surfaces. According to further embodiments, the plurality of non-uniform surfaces is interconnected. According to further embodiments, the SiNWs are chemically grown on the plurality of non-uniform surfaces of the substrate.

According to some embodiments, the substrate comprises a non-uniform bulk portion, comprising a plurality of non-uniform surfaces. According to further embodiments, the plurality of non-uniform surfaces is interconnected. In some embodiments, the non-uniform bulk portion comprises an open structure. According to further embodiments, the SiNWs are chemically grown in the non-uniform bulk portion of the substrate.

According to some embodiments, the SiNWs are connected to the substrate via a chemical bond. According to some embodiments, the SiNWs are connected to the substrate without a binder.

According to some embodiments, the anode has a silicon loading on the substrate of from about 0.5 mg/cm$^2$ to about 20 mg/cm$^2$. In further embodiments, the loading is from about 2 mg/cm$^2$ to about 6 mg/cm$^2$. In some embodiments, the weight ratio between the carbon substrate and the silicon nanowires ranges from about 1:0.1 to about 1:6.

According to some embodiments, the at least one non-uniform surface constitutes from about 10% to about 80% of the total substrate volume. In further embodiments, the at least one non-uniform surface constitutes from about 30% to about 50% of the total substrate volume.

The term 'non-uniform surface", as used herein, refers in some embodiments, to a surface having topographical irregularities, such irregularities rendering the surface non-smooth. In some embodiments, the non-uniform surface comprises a random network of said irregularities. In other embodiments, the irregularities are ordered.

According to some embodiments, the at least one non-uniform surface comprises elongated structures. The elongated structures can be selected from fibers, trenches or combinations thereof. Each possibility represents a separate embodiment of the invention.

According to some embodiments, the elongated structures have a thickness of from about 0.1 μm to about 300 μm. According to some embodiments, the elongated structures have a length of from about 1 mm to about 10000 mm. According to some embodiments, the non-uniform surface comprises elongated structures organized in a random network. According to other embodiments, the non-uniform surface comprises elongated structures organized in an ordered network.

According to some exemplary embodiments, the at least one non-uniform surface comprises fibers. According to further embodiments, the fibers have a thickness of from about 0.1 μm to about 300 μm. According to yet further embodiments, the fibers have a thickness of from about 0.5 μm to about 150 μm. According to still further embodiments, the fibers have a thickness of from about 1 μm to about 30 μm.

According to some embodiments, the non-uniform surface comprises fibers organized in a random network. According to other embodiments, the non-uniform surface comprises fibers organized in an ordered network. The fibers can comprise hollow fibers, non-hollow fibers or a combination thereof. Each possibility represents a separate embodiment of the invention. According to some embodiments, the fibers form the at least one continuous non-uniform surface of the substrate.

According to some embodiments, the at least one non-uniform surface comprises trenches. According to some embodiments, the trenches have a thickness of from about 0.1 μm to about 300 μm. According to yet further embodiments, the trenches have a thickness of from about 0.5 μm to about 150 μm. According to still further embodiments, the trenches have a thickness of from about 1 μm to about 30 μm.

In some embodiments, the substrate comprises a material selected from the group consisting of carbon, graphite, metal, metal alloy and combinations thereof. Each possibility represents a separate embodiment of the invention. In some embodiments, the substrate is made of carbon, graphite or a combination thereof.

The substrate can be in a form of a paper, woven or non-woven cloth, foil or film. Each possibility represents a separate embodiment of the invention.

According to some embodiments, the substrate comprises a paper made of carbon or graphite. In some exemplary embodiments, the substrate comprises a carbon paper. In some exemplary embodiments, the substrate comprises a woven or non-woven cloth made of carbon. Each possibility represents a separate embodiment of the invention. In further embodiments, the at least one non-uniform surface of the carbon paper or cloth comprises fibers. In yet further embodiments, the bulk non-uniform portion of the carbon paper or cloth comprises fibers.

In some embodiments, the substrate is made of a metal or metal alloy. The metal or metal alloy can comprise at least one element selected from the group consisting of copper (Cu), nickel (Ni), iron (Fe) and chromium (Cr). Each possibility represents a separate embodiment of the invention. In certain embodiments, the substrate comprises a film or foil made of a metal or metal alloy. Each possibility represents a separate embodiment of the invention.

In some embodiments, the at least one non-uniform surface of the foil or film is rough. In other embodiments, the at least one non-uniform surface comprises trenches. The trenches can be etched, carved, scratched or engraved on the foil of film to obtain the non-uniform surface. Thus, in some embodiments, the substrate comprises a foil or a film having an etched, carved, scratched, engraved surface or a combination thereof. Each possibility represents a separate embodiment of the invention.

In some embodiments, the substrate further comprises a layer of carbon or graphite. In further embodiments, said layer is deposited onto the metal or metal alloy foil or film.

According to some embodiments, the substrate has a thickness of from about 5 μm to about 500 μm. According to further embodiments, the substrate has a thickness of from about 10 μm to about 300 μm. According to other embodiments, the substrate has a thickness of from about 5 μm to about 10 μm. According to some embodiments, the substrate is a macro substrate.

In some particular embodiments, the substrate fibers have a thickness of from about 1 to about 30 μm and the SiNWs have a thickness of from about 20 nm to about 300 nm.

According to some embodiments, the SiNWs are chemically grown on the substrate by a chemical vapor deposition (CVD) technique.

The SiNWs can be doped with at least one element selected from the group consisting of boron, arsenic, phosphorus, iron, chromium, aluminum and a combination thereof. Each possibility represents a separate embodiment of the invention. The atomic ratio between the doping element and silicon can range from about 1:500 to about 1:10,000.

According to some embodiments, the SiNWs comprise a conducting coating. The conducting coating can cover the entire surface of the SiNW. Without wishing to being bound by theory or mechanism of action, the conductive coating prevents or diminishes formation of silicon oxide layer on the SiNWs. Thus, in some embodiments, the SiNWs according to the principles of the present invention do not include an oxide layer. The conducting coating can be selected from an electron conducting coating, a Li cation conducting coating or a combination thereof. Each possibility represents a separate embodiment of the invention. The electron conducting coating can comprise a material selected from carbon, graphite, reduced graphene oxide or combinations thereof. Each possibility represents a separate embodiment of the invention. The Li cation conducting coating can comprise a solid lithium electrolyte, selected from the group consisting of lithium imide ($Li_3N$), lithium oxide ($Li_2O$), lithium sulfate ($Li_2SO_4$), lithium fluoride (LiF), lithium carbonate ($Li_2CO_3$), lithium phosphate ($Li_3PO_4$) and combinations thereof. Each possibility represents a separate embodiment of the invention. In some embodiments, the Li cation conducting coating comprises a ceramic material, including aluminum oxide ($Al_2O_3$, alumina), zinc oxide (ZnO), titanium oxide (TiO), or hafnium oxide (HfO). In certain embodiments, the Li cation conducting coating forms a Solid-Electrolyte Interphase (SEI) on the SiNWs.

In some embodiments, the conducting coating thickness is from about 1 nm to about 10 nm. In further embodiments, the conducting coating thickness is from about 3 nm to about 7 nm. The conducting coating can be applied to the SiNWs by a technique selected from the group consisting of CVD, Physical Vapor Deposition (PVD), salt precipitation combined with thermal treatment, pyrolysis and any combination thereof. Each possibility represents a separate embodiment of the invention.

According to some embodiments, the anode has a geometric capacity of from about 0.5 mAh/cm$^2$ to about 20 mAh/cm$^2$. According to further embodiments, the anode has a geometric capacity of from about 1 mAh/cm$^2$ to about 10 mAh/cm$^2$. According to some embodiments, the anode has an irreversible capacity of up to about 15% of the total geometric capacity. According to further embodiments, a decrease in the geometric capacity of the anode is below about 10% for at least about 100 cycles at a charge/discharge rate of 0.1 mA/cm$^2$. In yet further embodiments, the anode is configured to be charged and or discharged at C rate of at least about 0.4C. In still further embodiments, the anode is configured to be charged and or discharged at C rate of at least about 1.0C. In yet further embodiments, the anode is configured to be charged at C rate of at least about 1.3C. In some embodiments, the anode provides at least about 92% Faradaic efficiency. In further embodiments, the anode provides at least about 98% Faradaic efficiency. In yet further embodiments, the anode provides at least about 99% Faradaic efficiency.

In another aspect, there is provided a lithium ion battery comprising the anode according to the principles of the present invention.

According to some embodiments, the lithium ion battery further comprises an electrolyte. The electrolyte can comprise a Li salt selected from the group consisting of lithium hexafluorophosphate ($LiPF_6$), lithium trifluoromethanesulfonate (lithium triflate, $CF_3SO_3Li$), and lithium bis-perfluoroethylsulfonylimide. Each possibility represents a separate embodiment of the invention. In some currently preferred embodiments, the substrate material is compatible with the electrolyte of the battery. According to further embodiments, the non-uniform surface of the substrate contacts the electrolyte in the lithium ion battery.

According to some embodiments, the lithium ion battery further comprises at least one cathode. The anode of the present invention can be disposed in the battery, such that at least one non-uniform surface comprising SiNWs faces said cathode. In further embodiments, the SiNWs are grown in the non-uniform bulk portion of the substrate.

The at least one cathode can be selected from the group consisting of lithium iron phosphate ($LiFePO_4$), sulfur-based cathode, lithium metal oxide-based cathode, and air or oxygen cathode. Each possibility represents a separate embodiment of the invention. According to some embodiments, the lithium metal oxide-based cathode comprises a metal selected from the group consisting of nickel (Ni), manganese (Mn), cobalt (Co) and aluminum (Al). Each possibility represents a separate embodiment of the invention.

According to further embodiments, the lithium ion battery comprises two cathodes. In further embodiments, the anode is disposed between two cathodes. In still further embodiments, the substrate comprises at least two opposed non-uniform surfaces. In certain embodiments, the SiNWs are grown on said two opposed non-uniform surfaces of the substrate facing said cathodes. In further embodiments, the SiNWs are further grown in the non-uniform bulk portion of the substrate.

According to some embodiments, the lithium ion battery further comprises at least one current collector. In some embodiments, a surface of the substrate facing said current collector is coated with an electrode ink. In some embodiments, said surface is a non-uniform surface. In further embodiments, said non-uniform surface comprises SiNWs, grown thereon. In other embodiments, the lithium ion battery does not include an anode current collector. In certain such embodiments, the anode is disposed between two cathodes in the lithium ion battery.

According to some embodiments, the lithium ion battery is packed in a cell configuration selected from a prismatic cell, pouch cell, cylinder cell or coin cell configuration. Each possibility represents a separate embodiment of the invention.

According to further embodiments, there is provided a device, comprising the lithium ion battery according to the principles of the present invention.

In another aspect the invention provides a method of manufacturing the anode according to the principles of the present invention, the method comprising providing an electrically conductive substrate, comprising at least one non-uniform surface; and chemically growing a random network of silicon nanowires (SiNWs) on the at least one non-uniform surface of the substrate. In some embodiments, said anode is a lithium ion battery anode. In some embodiments, the non-uniform surface of the electrically conductive surface is continuous.

According to some embodiments, the substrate comprises a plurality of non-uniform surfaces. According to some embodiments, the step of chemically growing a random network of SiNWs further comprises growing the SiNW on the plurality of non-uniform surfaces. According to some embodiments, the substrate comprises a non-uniform bulk portion, comprising a plurality of non-uniform surfaces. In some exemplary embodiments, the SiNW are grown in the non-uniform bulk portion of the substrate.

In some embodiments, the step of providing an electrically conductive substrate comprising at least one non-uniform surface, comprises formation of the non-uniform surface on an essentially flat substrate. In certain embodiments, said step includes etching, carving, engraving or scratching at least one surface of a metal or metal alloy foil or film. Each possibility represents a separate embodiment of the invention. In further embodiments, said step comprises depositing a conformal carbon or graphite coating on the at least one surface of a metal or metal alloy foil or film. In other embodiments, said step includes deposition of fibers on the at least one surface of a metal or metal alloy foil or film.

According to some embodiments, the process of chemically growing a random network of SiNWs comprises a Chemical Vapor Deposition (CVD) process.

In some embodiments, a one-step CVD process is performed to obtain the random network of SiNWs. In certain embodiments, the SiNWs having a crystalline core and an amorphous shell are grown in a one-step CVD process.

According to some embodiments, the process of chemically growing a random network of SiNWs comprises a step of depositing catalytic nanoparticles on the at least one non-uniform surface of the substrate. According to further embodiments, the catalytic nanoparticles are deposited in the non-uniform bulk portion of the substrate.

According to some embodiments, the deposition of the catalytic nanoparticles is performed by immersing the substrate into an aqueous colloidal solution of the catalytic nanoparticles or by an electroless deposition of the catalytic nanoparticles. Each possibility represents a separate embodiment of the invention. According to further embodiments, the substrate is immersed in the aqueous colloidal solution for at least about 5 min.

According to some embodiments, the method of manufacturing the lithium ion battery anode according to the principles of the present invention further comprises a step of coating the SiNWs with a conducting coating. The step of coating the SiNWs with a conducting coating can be performed by a technique selected from the group consisting of CVD, Physical Vapor Deposition (PVD), pyrolysis of a precursor, salt precipitation combined with thermal treatment, and any combination thereof. Each possibility represents a separate embodiment of the invention.

In some exemplary embodiments, SiNWs coating by a solid lithium electrolyte is performed by the salt precipitation combined with thermal treatment. In further embodiments, the salt precipitation combined with thermal treatment comprises applying to the SiNWs a composition comprising a Li salt selected from the group consisting of lithium nitrate ($LiNO_3$), lithium carbonate ($LiCO_3$), lithium triflate ($CF_3SO_3Li$), lithium imide (lithium bis-perfluoroethylsulfonylimide) and combinations thereof. Each possibility represents a separate embodiment of the invention. In further embodiments, the composition comprises a non-aqueous solvent. In yet further embodiments, the composition comprises a binder.

In further exemplary embodiments, SiNWs coating by a ceramic material is performed by CVD. In additional exemplary embodiments, SiNWs coating by an electron conducting coating is performed by pyrolysis. Pyrolysis can be performed by applying to the SiNWs a composition comprising a carbonaceous material and heating the SiNWs to a temperature of from about 500° C. to about 1000° C. in the presence of oxygen. The carbonaceous material can include a saccharide, such as sucrose, a polysaccharide, or a polymer, such as, poly(methyl methacrylate) (PMMA) or polynitrile (PN).

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

(FIG. 1A) photographic image of a copper substrate with a non-uniform surface including parallel trenches; (FIG. 1B) photographic image of a copper substrate with a non-uniform surface including randomly-oriented trenches; (FIG. 1C) Scanning electron microscopy (SEM) micrograph of SGL AA25 carbon paper substrate; (FIG. 1D) SEM micrograph of Freudenberg carbon non-woven cloth substrate.

(FIG. 2A) SEM micrograph of SiNWs anode on SGL AA25, 0.36 mg/cm$^2$ SiNWs loading; (FIG. 2B) SEM micrograph of SiNWs anode on SGL AA25, 0.36 mg/cm$^2$ SiNWs loading; (FIG. 2C) SEM micrograph of SiNWs anode on SGL AA25, 4.7 mg/cm$^2$ SiNWs loading; (FIG. 2D) SEM micrograph of the cross section of SiNWs anode on SGL AA25 (loading, 4.7 mg/cm$^2$ SiNWs); (FIG. 2E) Low magnification TEM micrograph of SiNWs with crystalline core and amorphous shell, grown at 25 Torr for 30 min; (FIG. 2F) TEM micrograph of a representative single nanowire of FIG. 2F, displaying a total thickness of about 70 nm and a core diameter of about 36 nm; (FIG. 2G) High-magnification (HRTEM) micrograph of a single nanowire with crystalline core (in the middle) having a thickness of about 17 nm and amorphous shell (bottom-left and upper-right corners of the micrograph); (FIG. 2H) TEM micrograph of a representative single nanowire with a crystalline core and an amorphous shell grown at 25 Torr for 30 min, displaying a total diameter of about 80 nm and a core diameter of about 34 nm; (FIG. 2I) TEM micrograph of a representative single nanowire with a crystalline core and an amorphous shell, grown at 25 Torr for 60 min, displaying a total thickness of about 120 nm and a core diameter of about 34 nm; (FIG. 2J) Low-magnification TEM micrograph of nanowires with a crystalline core and an amorphous shell, grown at 25 Torr for 120 min, displaying a total thickness of about 200 nm and a core thickness of about 32 nm.

(FIG. 3A) A schematic representation of the substrate having one non-uniform surface; (FIG. 3B) A schematic representation of the anode including the substrate having one non-uniform surface and a random network of SiNWs chemically grown on said substrate; (FIG. 3C) A schematic representation of the substrate having a plurality of non-uniform surfaces; and (FIG. 3D) A schematic representation of the anode including the substrate having the plurality of non-uniform surfaces and a random network of SiNWs chemically grown on said substrate.

(FIG. 4A) A schematic representation of the substrate comprising a non-uniform bulk portion; (FIG. 4B) A schematic representation of the anode including said substrate and a random network of SiNWs chemically grown on said substrate; (FIG. 4C) A schematic representation of the cross section of the anode depicted in FIG. 4B along line AA'.

(FIG. 6A) Cycle life of 1.06 mg Si/cm$^2$ anode (cell name "SGL2"), cycled at 0.1-1 mA/cm$^2$ and voltage range 0.01-1V, with an average efficiency of 99.5%; (FIG. 6B) Separate capacity contribution of the carbon paper (SGL) and of the SiNWs at the initial cycles, 1.06 mg Si/cm$^2$ anode, 0.1-1 mA/cm$^2$, voltage range 0.01-1V, anode mass is 5.5 mg (20% Si); (FIG. 6C) Charge-Discharge Profile-SGL2 (1.05 cm$^2$, 1.1 mgSi; all SiNWs/Li cells cycled with 1M LiPF$_6$ in 1:1 EC:DEC+15% w/w FEC at 30° C.

(FIG. 7A) Effect of cycling on dQ/dV curves; 1 mg SiNWs/cm$^2$, current—0.1 mA/cm$^2$, peaks a3, a4, c2, c3 belong to graphite peaks of SGL, peaks a1, a2 and c1 belong to SiNWs; (FIG. 7B) Effect of cycling on dQ/dV curves—comparison between SiNWs on SGL anode with pristine SGL, 0.1 mA/cm$^2$; (FIG. 7C) Effect of cycling on dQ/dV curves of pristine SGL (no Si), 0.1 mA/cm$^2$.

(FIG. 8A) a first lithiation/de-lithiation cycle for a 1.92 mg/cm$^2$ SiNWs anode (in a SiNWs/Li cell) 1 mA, 0.01-1V, anode mass: 6.5 mg; (FIG. 8B) a first lithiation/de-lithiation cycle for 0.95 mg/cm$^2$ SiNWs anode, 1 mA. 0.01-1V, Anode mass: 6 mg; (FIG. 8C) a first lithiation/de-lithiation cycle for 4.46 mg/cm$^2$ SiNWs anode, 1-st cycle at 1 mA.

(FIG. 11A) Cycle life of 2 mg SiNWs, 1.01 cm$^2$ anode with B:Si ratio of 1:8000 (cell name "FRDS11"), cycled at 0.1-1 mA/cm$^2$ and voltage range of 1-0.05V, with an average efficiency of 99.26%; (FIG. 11B) Cycle life of 1.9 mg SiNWs, 1.01 cm$^2$ anode with B:Si ratio of 1:1000 (cell name "FRDS14"), cycled at 0.1-1 mA/cm$^2$ and voltage range of 1-0.05V, with an average efficiency of 99.48%.

(FIG. 12A) Cycle life of 1.4 mg SiNWs, 1.01 cm$^2$ anode with carbon coated SiNWs and B:Si ratio of 1:8000 (cell name "FRDC3"), cycled at 0.1-1 mA/cm$^2$ and voltage range of 1-0.05V, with an average efficiency of 99.87%; (FIG. 12B) Cycle life of 1.4 mg Si, 1.01 cm$^2$ anode with carbon coated SiNWs and B:Si ratio of 1:8000 (cell name "FRDC4"), cycled at 0.1-1 mA/cm$^2$ and voltage range of 1-0.05V, with an average efficiency of 100.03%; (FIG. 12C) Cycle life of 1.7 mg SiNWs, 0.97 cm$^2$ anode with carbon coated SiNWs and B:Si ratio of 1:1000 (cell name "FRDC5"), cycled at 0.1-1 mA/cm$^2$ and voltage range of 1-0.05V, with an average efficiency of 99.77%.

(FIG. 14A) Cycle life of 0.44 mg SiNWs, 1.04 cm$^2$ anode with alumina coated SiNWs (cell name "SGLA2"), cycled at 0.1-1 mA/cm$^2$ and voltage range of 1-0.05V, with an average efficiency of 99.68%; (FIG. 14B) Cycle life of 0.99 mg Si, 1.02 cm$^2$ anode with alumina coated SiNWs (cell name "SGLA3"), cycled at 0.1-1 mA/cm$^2$, with an average efficiency of 99.51%; (FIG. 14C) Cycle life of 0.99 mg SiNWs, 1.02 cm$^2$ anode with alumina coated SiNWs (cell name "SGLA4"), cycled at 0.1-1 mA/cm$^2$ and voltage range of 1-0.05V, with an average efficiency of 99.45%; (FIG. 14D) Cycle life of a reference 0.98 mg SiNWs, 0.99 cm$^2$ anode without alumina coating (cell name "SGLA14"), cycled at 0.1-1 mA/cm$^2$ and voltage range of 1-0.05V, with an average efficiency of 99.47%.

DETAILED DESCRIPTION OF THE INVENTION

Figure 1A:
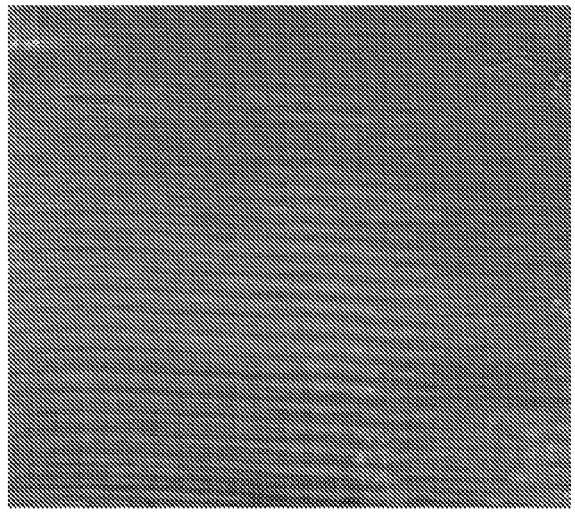
FIGS. 1A-1D: Various types of substrates.

The present invention provides a silicon nanostructures-based anode, which is suitable for use, for example, in lithium ion batteries, characterized by a high capacity, low irreversible capacity and stable cycle life. In particular, provided herein is an anode, comprising Si nanowires chemically grown on at least one non-uniform surface of an electrically conductive substrate, which is capable of providing geometric capacity of from about 1 to about 15 mAh/cm$^2$, irreversible capacity of only up to about 20% of the total geometric capacity and current efficiency greater than 98%. Additionally, the lithium battery anodes of the present invention have cycle life stability for over 200 cycles. Said capacity, current efficiency and cycle-life properties meet the current requirements of lithium batteries for portable and electric-vehicle applications, making the SiNWs-based anodes of the present invention excellent candidates for practical Li battery applications and providing significant advantages over the prior art SiNWs-based anodes.

The present invention is based in part on the unexpected finding that SiNWs chemically grown on a substrate having at least one non-uniform surface are superior to the existing "SiNWs forest" technology anodes, wherein SiNWs are epitaxially grown on a flat surface of a metal substrate. SiNWs of the present invention are grown on the non-uniform surface of the substrate in a random network configuration, thus reducing loss of Si surface area during battery cycling due to agglomeration of the adjacent nanowires. The substrates suitable for chemically growing thereon a random network of silicon nanowires have at least one or a plurality of non-uniform surfaces, providing a continuous structure from which SiNWs can protrude in various directions.

Additionally, SiNWs grown on the non-uniform surface of the substrate in a random network configuration provide a significantly higher surface area for the silicon lithiation and de-lithiation reactions, and enough space for SEI formation, thus reducing irreversible capacity due to the formation of the SEI during the first battery cycle. While the existing Si-based anodes display very high irreversible capacity values of over 30%, the SiNWs-based cathodes of the present invention are characterized by a very low irreversible capacity loss of up to about 10%, which is characteristic of state-of-the-art graphite anodes. Substrates including a plurality of the non-uniform surfaces provide exceptionally high Si loadings and geometric capacity of the electrode, which are achieved by growing the SiNWs on said plurality of the non-uniform surfaces. Such anodes provide high charge-discharge rate without increasing the risk of agglomeration of adjacent SiNWs and further delamination thereof during battery cycling. Additional advantage of the high-loading anode including a plurality of non-uniform surfaces with SiNWs grown thereon is that it can be used without an anode current collector, being disposed between two cathodes in a lithium ion battery.

Furthermore, the SiNWs according to the principles of the present invention have at least about 30% amorphous morphology. Without wishing to being bound by theory or mechanism of action, the amorphous morphology of the SiNW eliminates or diminishes the change from crystalline state to amorphous state at the first charge-discharge cycle of the state of the art SiNWs anode. It is assumed that said change from crystalline to the amorphous state leads to a fast anode degradation. Without further wishing to being bound by theory, it is contemplated that the amorphous morphology of the SiNWs according to the principles of the present invention, promotes high-rate charge-discharge rate or the anode.

The SiNWs according to the principles of the present invention are chemically grown on the electrically-conducting substrate and, thus, do not require a binder for the attachment to an electrode, to be incorporated in a lithium ion battery. The anodes of the present invention thus provide an enhanced electric contact between the conducting substrate and lithium ions, during silicon lithiation and delithiation reactions, as compared to the electrodes comprising SiNWs mechanically attached to a conducting substrate, for example by means of a binder. Furthermore, the chemically-grown SiNWs maintain their chemical bonding to the substrate throughout battery cycling, demonstrating a stable cycle life for hundreds of lithiation and de-lithiation cycles. Without wishing to being bound by theory or mechanism of action, it can be assumed that the crystalline core prevents or diminishes detachment of the nanowires during cycling and the amorphous shell reduces degradation resulting from changes from crystalline to amorphous state.

Thus, according to a first aspect there is provided an anode comprising: an electrically conductive substrate, comprising at least one non-uniform surface; and a random network of silicon elongated nanostructures chemically grown on the at least one non-uniform surface of the substrate. According to another aspect, there is provided a method for manufacturing an anode comprising providing an electrically conductive substrate, comprising at least one non-uniform surface; and chemically growing a random network of silicon elongated nanostructures on the at least one non-uniform surface of the substrate. In some embodiments, said anode is for use in an alkaline metal ion-based battery. In some embodiments, said anode is for use in a lithium ion battery.

According to some embodiments, the non-uniform surface is continuous. In some currently preferred embodiments, the silicon elongated structures have at least about 30% amorphous morphology.

The term "silicon (Si) elongated nanostructure", as used herein, refers to a silicon nanostructure having one dimension (referred to as the length of the nanostructure) elongated with respect to the other two dimensions (referred to as the thickness and the width of the nanostructure), such as a cylindrical or tubular configuration. It is to be understood that the term "silicon elongated nanostructure" as used herein refers to structures having length in the nanometer as well as micrometer range.

According to some exemplary embodiments, said silicon elongated nanostructures comprise nanowires. According to some embodiments, said silicon elongated nanostructures comprise tubular nanostructures. In certain embodiments, the silicon elongated structures do not include crystalline whiskers. In further embodiments, the nanowires do not include crystalline whiskers.

The Substrate Including a Non-Uniform Surface

The substrates suitable for the anodes of the present invention have at least one non-uniform surface, configured to enable growth of the Si elongated nanostructures, including, inter alia, SiNWs, in a random network configuration. The term "non-uniform surface", as used therein, refers in some embodiments, to a surface having topographical irregularities, said irregularities rendering the surface non-smooth.

According to some embodiments, the height of said irregularities is from about 1 to about 1000 µm. In further embodiments, the height of said irregularities is from about 1 to about 100 µm, from about 1 to about 50 µm, from about 5 to about 40 µm, or from about 10 to about 30 µm. Each possibility represents a separate embodiment of the invention. The term "height of the irregularities", as used herein, refers in some embodiments to the dimension of the irregularity, which is perpendicular to a portion of the non-uniform surface of the substrate, devoid of said irregularities.

According to some embodiments, the thickness of said irregularities is from about 0.1 µm to about 300 µm. In further embodiments, the thickness of said irregularities is from about 0.1 µm to about 150 µm, from about 0.1 µm to about 100 µm, from about 0.5 µm to about 150 µm or from about 1 µm to about 30 µm. Each possibility represents a separate embodiment of the invention. The term "thickness of the irregularities", as used herein, refers in some embodiments to the smallest dimension of the irregularity, which is parallel to a portion of the non-uniform surface of the substrate, devoid of said irregularities. In some embodiments, the height of said irregularities is essentially the same as the thickness thereof.

According to some embodiments, the length of said irregularities is from about 0.1 µm to about 10000 mm. According to further embodiments, the length of said irregularities is from about 1 mm to about 10000 mm. According to still further embodiments, the length of said irregularities is from 10 mm to about 1000 mm. The term "length of the irregularities", as used herein, refers in some embodiments to the largest dimension of the irregularity, which is parallel to a portion of the non-uniform surface of the substrate, devoid of said irregularities.

In some embodiments, the non-uniform surface comprises a random network of said irregularities. In other embodiments, the irregularities are ordered. In further embodiments, the irregularities are organized in an ordered network.

According to some embodiments, the non-uniform surface comprises a curve, a slope or combinations thereof. Each possibility represents a separate embodiment of the invention. According to further embodiments, the non-uniform surface comprises a plurality of curves and/or slopes. The non-limiting example of the non-uniform surface comprising a plurality of curves and/or slopes includes a wave-like surface. Said wave can be, for example, a sine, triangular or sawtooth wave. According to some embodiments, the non-uniform surface comprises a rough or leveled surface. In certain embodiments, said surface is a micro-leveled surface. The term "micro-leveled", as used herein, refers in some embodiments to the non-uniform surface having topographical irregularities which height is below about 1 mm. In some embodiments, said surface is an etched surface. In some embodiments, a substrate having an essentially smooth surface is chemically or mechanically modified to include at least one non-uniform surface.

According to some embodiments, the substrate comprises a plurality of non-uniform surfaces. According to further embodiments, the plurality of non-uniform surfaces is interconnected. The plurality of non-uniform surfaces can be electronically and/or mechanically interconnected. Each possibility represents a separate embodiment of the invention. According to further embodiments, the Si elongated nanostructures, including, inter alia, SiNWs, are chemically grown on the plurality of non-uniform surfaces of the substrate.

According to some embodiments, the substrate comprises a non-uniform bulk portion, comprising a plurality of non-uniform surfaces. According to further embodiments, the plurality of non-uniform surfaces is interconnected. The plurality of non-uniform surfaces can be electronically and/or mechanically interconnected. Each possibility represents a separate embodiment of the invention. According to further embodiments, the Si elongated nanostructures, including, inter alia, SiNWs, are chemically grown in the non-uniform bulk portion of the substrate.

According to some embodiments, the non-uniform bulk portion of the substrate is permeable to lithium ions. According to other embodiments, said non-uniform bulk portion is permeable to an electrolyte of the battery. According to further embodiments, said non-uniform bulk portion is permeable to catalytic metal particles. According to still further embodiments, said non-uniform bulk portion is permeable to gases, such as, but not limited to silane. According to some embodiments, the non-uniform bulk portion of the substrate is continuous.

According to some embodiments, the substrate comprising at least one non-uniform surface is an open-structure substrate. According to further embodiments, the substrate comprising the non-uniform bulk portion is an open-structure substrate. The term "open-structure", as used herein, refers in some embodiments to a structure having a continuous solid medium comprising pores, open space, open non-uniform surfaces or openings of variety of forms. In some embodiments, said pores or opening are permeable to lithium ions. According to other embodiments, said pores or openings are permeable to an electrolyte of the battery. According to further embodiments, said pores or openings are permeable to catalytic metal particles. According to still further embodiments, said pores or openings are permeable to gases, such as, but not limited to silane. Without wishing to being bound by theory or mechanism of action, it is contemplated that the open-structure of the substrate, in combination with the plurality of the non-uniform surfaces thereof provides open space for the electrolyte to penetrate into the anode and allows room for the growth of the SEI without blocking the ion path in the electrolyte.

According to some embodiments, the non-uniform surfaces constitute from about 5% to about 80% of the total substrate volume. In further embodiments, the non-uniform surfaces constitute from about 10% to about 70% of the total substrate volume, from about 15% to about 60%, or from about 20% to about 50% of the total substrate volume. Each possibility represents a separate embodiment of the invention.

According to other embodiments, the non-uniform surface comprises elongated structures. The term "elongated structure", as used herein, refers to a structure having one dimension (referred to as the length of the structure) elongated with respect to the other two dimensions (referred to as the thickness and the width of the structure). The elongated structures can have an a circle-like cross section, or other cross sectional shapes including, but not limited to, trapezoidal, triangular, square, strips or rectangular. According to some embodiments, the elongated structures have a circle-like cross section. In certain such embodiments, the thickness of the elongated structure is essentially the same as the diameter thereof.

According to some embodiments, the elongated structures have a thickness of from about 0.1 µm to about 300 µm. According to further embodiments, the elongated structures have a thickness of from about 0.1 µm to about 150 µm. According to still further embodiments, the elongated structures have a thickness of from about 0.1 µm to about 100 µm. According to yet further embodiments, the elongated structures have a thickness of from about 0.5 µm to about 50 µm. According to still further embodiments, the elongated structures have a thickness of from about 1 µm to about 30 µm.

According to some embodiments, the elongated structures have a width of from about 0.1 µm to about 300 µm. According to further embodiments, the elongated structures have a width of from about 0.1 µm to about 150 µm. According to still further embodiments, the elongated structures have a width of from about 0.1 µm to about 100 µm. According to yet further embodiments, the elongated structures have a width of from about 0.5 µm to about 50 µm. According to still further embodiments, the elongated structures have a width of from about 1 µm to about 30 µm.

According to some embodiments, the elongated structures have a length of from about 1 mm to about 10000 mm. According to further embodiments, the elongated structures have a length of from about 10 mm to about 1000 mm.

According to some embodiments, the non-uniform surface comprises elongated surfaces present in a random network. According to other embodiments, the non-uniform surface comprises elongated structures organized in an ordered network.

According to some exemplary embodiments, the elongated structures comprise fibers. Thus, in some embodiments, the substrate is fibrous. In certain such embodiments, the substrate comprises interconnected fibers, which form the non-uniform surfaces of said substrate. In further embodiments, the interconnected fibers form the continuous non-uniform surfaces of said substrate.

The fibers can have an elongated cylinder-like shape with a circle-like cross section, or equivalent dimensions, wherein the fibers have other cross sectional shapes including, but not limited to, trapezoidal, triangular, square, strips or rectangular. The fibers can have a thickness, a diameter, or equivalent dimensions for shapes other than cylinder in the range from about 0.1 µm to about 300 µm. According to some embodiments, the fibers have a thickness of from about 0.3 µm to about 200 µm, from about 0.5 µm to about 100 µm, or from about 1 µm to about 30 µm. Each possibility represents a separate embodiment of the invention.

According to some embodiments, the fibers have an amorphous morphology. According to further embodiments, at least a portion of said fibers has an amorphous morphology. According to still further embodiments, at least 30% of said fibers have an amorphous morphology, or at least about 40%, or even at least about 50% of said fibers have an amorphous morphology. Each possibility represents a separate embodiment of the invention. According to other embodiments, said fibers are crystalline.

According to some embodiments, the non-uniform surface comprises fibers present in a random network. According to other embodiments, the non-uniform surface comprises fibers organized in an ordered network. The fibers can comprise hollow fibers, non-hollow fibers or a combination thereof. Each possibility represents a separate embodiment of the invention.

According to some embodiments, the elongated structures comprise trenches. The trenches can have an a circle-like cross section, or other cross sectional shapes including, but not limited to, trapezoidal, triangular, square, strips or rectangular. According to some embodiments, the trenches have a circle-like cross section. In certain such embodiments, the thickness of the trench is essentially the same as the diameter thereof.

According to some embodiments, the trenches have a thickness of from about 0.1 µm to about 300 µm. According to further embodiments, the trenches have a thickness of from about 0.1 µm to about 150 µm. According to still further embodiments, the trenches have a thickness of from about 0.1 μm to about 100 μm. According to yet further embodiments, the trenches have a thickness of from about 0.5 μm to about 50 μm. According to still further embodiments, the trenches have a thickness of from about 1 μm to about 30 μm.

According to some embodiments, the trenches have a width of from about 0.1 μm to about 300 μm. According to further embodiments, the trenches have a width of from about 0.1 μm to about 150 μm. According to still further embodiments, the trenches have a width of from about 0.1 μm to about 100 μm. According to yet further embodiments, the trenches have a width of from about 0.5 μm to about 50 μm. According to still further embodiments, the trenches have a width of from about 1 μm to about 30 μm.

According to some embodiments, the trenches have a length of from about 1 mm to about 10000 mm. According to further embodiments, the trenches have a length of from about 10 mm to about 1000 mm.

According to some embodiments, the non-uniform surface comprises trenches present in a random network. According to other embodiments, the non-uniform surface comprises trenches organized in an ordered network. In further embodiments, the trenches form the continuous non-uniform surfaces of the substrate.

According to some embodiments, the at least one non-uniform surface constitutes at least about 80% of the total geometrical surface area of the substrate, at least about 85% of the total geometrical surface area, at least about 90% of the total geometrical surface, or at least about 99.9% of the total geometrical surface area of the substrate. Each possibility represents a separate embodiment of the invention.

According to some embodiments, the at least two non-uniform surfaces constitute at least about 80% of the total geometrical surface area of the substrate, at least about 85% of the total geometrical surface area, at least about 90% of the total geometrical surface, or at least about 99.9% of the total geometrical surface area of the substrate. Each possibility represents a separate embodiment of the invention.

In some embodiments, the substrate includes at least one or at least two non-uniform surfaces. The non-limiting examples of such substrate include a foil or a film.

In some embodiments, the substrate comprises one non-uniform surface. In some embodiments, the substrate comprises two non-uniform surfaces. In some embodiments, the substrate comprises at least two opposed non-uniform surfaces. In some embodiments, said at least two non-uniform surfaces are substantially parallel. In some embodiments, the substrate comprises a first non-uniform surface and a second non-uniform surface.

Figure 1B:
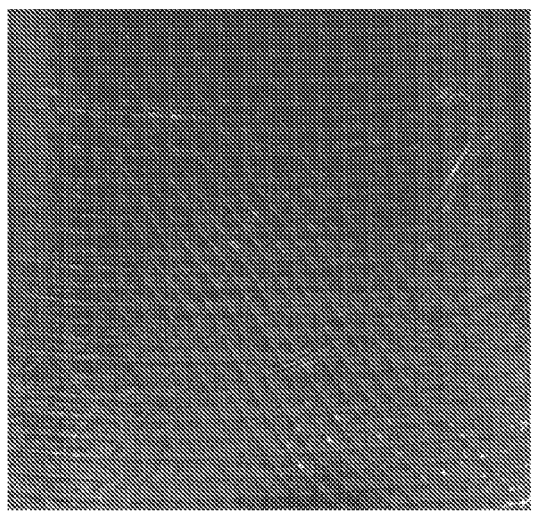

In some embodiments, the at least one or at least two non-uniform surfaces of the foil or film are rough. In other embodiments, the foil or film has one or two essentially flat surfaces. In further embodiments, at least one surface of said foil or film is modified to provide a non-uniform surface. The surface of the foil or film can be etched, carved, scratched, engraved or any combination thereof. The etching can be performed by a technique selected from dry etching, wet chemical etching or a combination thereof. The engraving can be performed, inter alia, by photolithography. In certain embodiments, the at least one or at least two non-uniform surfaces of the foil or film comprise trenches. FIGS. 1A and 1B show a photographic image of a foil substrate comprising one non-uniform surface, according to some embodiments of the invention. The essentially flat surface of the foil substrate was scratched in order to obtain the non-uniform surface comprising trenches, as shown in FIGS. 1A and 1B.

Figure 1C:
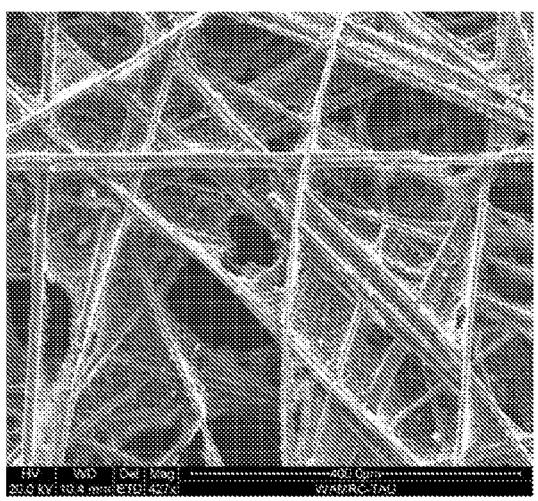
Figure 1D:
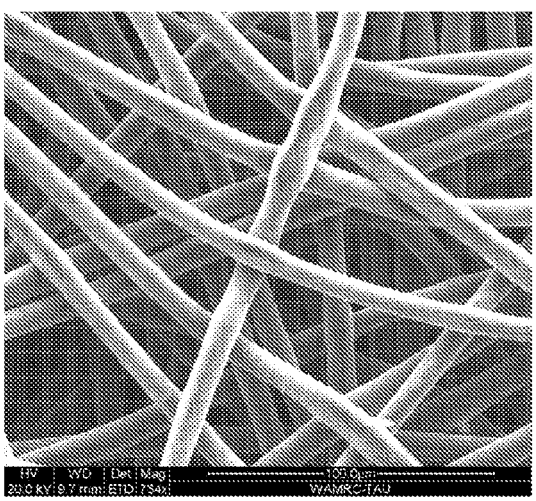

In some embodiments, the substrate comprises a plurality of non-uniform surfaces, such as but not limited to 2, 3, 4, 5, 6 10, 20, 50, 200, 500 or more non-uniform surfaces. In some embodiments, the substrate comprises a non-uniform bulk portion. The non-uniform bulk portion can comprise a plurality of non-uniform surfaces. In some embodiments, the substrate comprises a first non-uniform surface, a second non-uniform surface and a non-uniform bulk portion between said first and said second non-uniform surfaces. The non-limiting examples of said substrate include a paper, a cloth or a mesh. The cloth can be selected from a woven or a non-woven cloth. Each possibility represents a separate embodiment of the invention. Such substrates can be fabricated using, for example, sintering fibers, molding fibers, electrospinning fibers, or weaving fibers. FIG. 1C shows a SEM micrograph of a fibrous substrate comprising a carbon paper, comprising a plurality of non-uniform surfaces, according to some embodiments of the invention. FIG. 1D shows a SEM micrograph of a fibrous substrate comprising a non-woven carbon cloth, comprising a plurality of non-uniform surfaces, according to some embodiments of the invention.

The substrate can be of any geometric shape, suitable for incorporation as an anode into battery, such as, for example, a lithium ion battery. According to some embodiments, the substrate is configured to be rolled and/or folded in order to be incorporated into a cylinder, prismatic or pouch cell configuration.

The substrate is typically a macro substrate, wherein the at least one non-uniform surface have a geometrical surface area of from about 0.1 to about 10,000 cm$^2$. The geometric area of the substrate can be in the range from about 0.1 to about 10,000 cm$^2$, from about 1 to about 1000 cm$^2$, or from about 10 to about 100 cm$^2$. Each possibility represents a separate embodiment of the invention.

The thickness of the substrate is typically from about 1 μm to about 500 μm. In some embodiments, the thickness of the substrate is from about 5 μm to about 500 μm, such as from about 10 μm to about 400 μm or from about 20 μm to about 300 μm. Each possibility represents a separate embodiment of the invention. In some exemplary embodiments, the thickness of the substrate is from about 50 μm to about 200 μm. In certain exemplary embodiments, the thickness of the substrate is about 160 μm. In other exemplary embodiments, the thickness of the substrate is about 7 μm. According to certain embodiments, the thickness of the fiber is about 7 μm. In some embodiments, the thickness of the substrate is defined as a thickness of the bulk portion of the substrate. In other embodiments, the thickness is defined as a distance between the two opposed non-uniform surfaces of the substrate.

The Substrate Material

The substrate can be made of any electronically conducting material, suitable for providing at least one non-uniform surface. According to some embodiments, the substrate is compatible with the electrolyte of the lithium ion battery. The non-limiting examples of such material include carbon, graphite, metal, metal alloy and combinations thereof. Each possibility represents a separate embodiment of the invention. The metals or metal alloys, suitable for the formation of the substrate of the Li ion battery anode include, inter alia, copper (Cu), nickel (Ni), iron (Fe), chromium (Cr) or combinations thereof. In some exemplary embodiments, the substrate material comprises copper. In further exemplary embodiments, the substrate material comprises carbon, graphite, or a combination thereof. Each possibility represents a separate embodiment of the invention.

In some embodiments, the substrate material comprises carbon, graphite, or a combination thereof, coated with a metal or a metal-alloy coating. Each possibility represents a separate embodiment of the invention.

According to some embodiments, the substrate comprises a metal or a metal alloy covered by a conductive coating. The non-limiting examples of the conducting coating of the metal substrate include carbon, graphite and graphene. In further embodiments, said conductive coating is deposited onto the metal or metal alloy foil or film.

In some embodiments, the foil or film comprises an essentially flat surface and the carbon or graphite conductive coating comprises fibers. In certain such embodiments, the silicon nanowires are chemically grown on said fibers. In further embodiments, the fibers are applied to the film or foil by using a binder.

In some embodiments, the foil or film surface comprises trenches and the carbon or graphite conductive coating comprises a conformal coating. The conformal carbon coating may be formed by CVD or by pyrolysis of a carbonaceous precursor. The non-limiting examples of such precursors include saccharide, oligomer or polymer precursors. Each possibility represents a separate embodiment of the invention. One non-limiting example of suitable saccharide is sucrose. The non-limiting examples of the polymers include poly(methyl methacrylate) (PMMA) or polynitrile (PN).

The graphene layer enables the growth of nanowires directly on the metal surface, without affecting the direct electrical contract between the SiNWs and the current collector. Graphene layers can be grown on metal surfaces, such as, but not limited to, copper or nickel matrixes, by well-developed CVD procedures.

In some embodiments, the substrate material is amorphous. In other embodiments, the substrate material is crystalline. In additional embodiments, the substrate material comprises both amorphous and crystalline fractions.

In certain embodiments, the substrate comprises a metal or a metal-alloy foil. In particular embodiments, the substrate comprises a copper foil. In some embodiments, the copper foil comprises trenches. In further embodiments, the copper foil comprises a carbon conformal coating.

In certain embodiments, the substrate comprises a carbon paper or woven or non-woven carbon cloth. Each possibility represents a separate embodiment of the invention. In some exemplary embodiments, the substrate comprises a carbon paper. In certain such embodiments, the carbon paper is graphitized. In some exemplary embodiments, about 50% of the carbon paper is graphitized and about 50% is amorphous. In some embodiments, the carbon paper thickness is from about 5 µm to about 500 µm, from about 10 µm to about 400 µm, from about 20 µm to about 300 µm, or from about 50 µm to about 200 µm. Each possibility represents a separate embodiment of the invention. In further embodiments, the carbon paper comprises carbon fibers having a thickness of about 0.3 µm to about 200 µm, from about 0.5 µm to about 100 µm, or from about 1 µm to about 30 µm. Each possibility represents a separate embodiment of the invention. In yet further embodiments, the carbon paper porosity is from about 20% to about 95%, from about 30% to about 90%, from about 40% to about 85%, or from about 50% to about 70%. Each possibility represents a separate embodiment of the invention.

In further exemplary embodiments, the substrate comprises a carbon cloth. In some embodiments, the carbon cloth is a non-woven cloth. In further embodiments, the carbon cloth has a thickness of from about 5 µm to about 500 µm, from about 10 µm to about 400 µm, from about 20 µm to about 300 µm, or from about 50 µm to about 200 µm. Each possibility represents a separate embodiment of the invention. In further embodiments, the carbon cloth comprises carbon fibers having a thickness of about 0.3 µm to about 200 µm, from about 0.5 µm to about 100 µm, or from about 1 µm to about 30 µm. Each possibility represents a separate embodiment of the invention. In some embodiments at least about 80% of the carbon cloth is amorphous. In further embodiments, at least about 90% of the carbon cloth is amorphous. In still further embodiments, about 100% of the carbon cloth is amorphous.

Silicon Nanowires (SiNWs)

According to some embodiments, there is provided an anode comprising: an electrically conductive substrate, comprising at least one non-uniform surface; and a random network of SiNWs chemically grown on the at least one non-uniform surface of the substrate.

The SiNWs are present in the anode in a random network configuration. The term "random network", as used herein, refers in some embodiments, to SiNWs, which are substantially non-parallel to each other. The random network of SiNWs is shown, for example, on SEM micrographs in FIGS. 2A-2D. Without wishing to being bound by theory or mechanism of action, the random network configuration of the SiNWs provides improved cycle life stability and increased capacity of the anode throughout battery cycling, as compared to the prior art Si "forest" anodes.

The silicon nanowires have an elongated cylinder-like shape with a circle-like cross section, or equivalent dimensions wherein the nanowires have other cross sectional shapes including, but not limited to, trapezoidal, triangular, square, strips or rectangular. In some exemplary embodiments, the nanowire has a circle-like cross section. According to some embodiments, the trenches have a circle-like cross section. In certain such embodiments, the thickness of the SiNW is essentially the same as the diameter thereof. In some embodiments, the nanowire has a strip cross sectional shape.

SiNWs can have a thickness, a diameter, or equivalent dimensions for shapes other than cylinder in the range from about 10 nm to about 500 nm. According to some embodiments, the SiNWs have a thickness of from about 20 nm to about 400 nm, from about 50 nm to about 300 nm, or from about 100 nm to about 200 nm. Each possibility represents a separate embodiment of the invention. According to some embodiments, the length of the SiNWs is from about 1 µm to about 200 µm, from about 5 µm to about 100 µm, or from about 20 µm to about 60 µm. Each possibility represents a separate embodiment of the invention. In some embodiments, the length of the SiNWs is above about 1 µm. In further embodiments, the length of the SiNWs is above about 5 µm. In yet further embodiments, the length of the SiNWs is above about 10 µm. In still further embodiments, the length of the SiNWs is above about 20 µm.

The SiNWs can have an aspect ratio of from about 2:1 to about 20,000:1. In some embodiments, the SiNWs have an aspect ratio of from about 10:1 to about 20,000:1. In particular embodiments, the SiNWs have an aspect ratio of from about 20:1 to about 20,000:1. In further embodiments, the SiNWs have an aspect ratio of from about 20:1 to about 10,000:1, from about 20:1 to about 5,000 or from about 20:1 to about 1,000. Each possibility represents a separate embodiment of the invention.

According to some embodiments, the thickness and length of the SiNWs throughout the at least one non-uniform surface of the substrate is essentially uniform. The term "essentially uniform", as used herein, refers to the variation of the thickness and/or or length of less than about 30%. In further embodiments, the term "essentially uniform" refers to the variation of less than about 20%, less than about 10% or less than about 5%. Each possibility represents a separate embodiment of the invention.

The SiNWs according to the principles of the present invention have at least about 30% amorphous morphology. The term "amorphous morphology" refers in some embodiments to the structure (for example, volume) of a single SiNW, which is amorphous. In further embodiments, the term "amorphous morphology" refers to the mass of a single SiNW, which is amorphous. In further embodiments, the term "amorphous morphology" refers to the total number of the SiNWs of the anode, which are amorphous. In yet further embodiments, the term "amorphous morphology" refers to the total mass of the SiNWs of the anode, which is amorphous.

According to some embodiments, the SiNWs have at least about 40% amorphous morphology. According to further embodiments, the SiNWs have at least about 50% amorphous morphology. According to yet further embodiments, the SiNWs have at least about 60% amorphous morphology. According to still further embodiments, the SiNWs have at least about 70% amorphous morphology. According to yet further embodiments, the SiNWs have at least about 80% amorphous morphology. According to some embodiments, the SiNWs have from about 30% to about 95% amorphous morphology. According to further embodiments, the SiNWs have from about 40% to about 70% amorphous morphology.

According to some embodiments, at least about 30% of the SiNWs have an amorphous morphology. According to further embodiments, at least about 50% of the SiNWs have an amorphous morphology. According to still further embodiments, at least about 70% of the SiNWs have an amorphous morphology. According to some embodiments, from about 30% to about 95% of the SiNWs have an amorphous morphology. According to further embodiments, from about 40% to about 70% of the SiNWs have an amorphous morphology.

According to some embodiments, at least about 50% of the SiNWs structure is amorphous. According to further embodiments, at least about 70% of the SiNWs structure is amorphous. According to some embodiments, from about 30% to about 95% of the SiNWs structure is amorphous. According to some embodiments, from about 30% to about 95% of the SiNWs structure is amorphous. According to further embodiments, from about 40% to about 70% of the SiNWs structure is amorphous.

According to some embodiments, at least about 50% of the SiNWs mass is amorphous. According to further embodiments, at least about 70% of the SiNWs mass is amorphous. According to some embodiments, from about 30% to about 95% of the SiNWs mass is amorphous. According to some embodiments, from about 30% to about 95% of the SiNWs mass is amorphous. According to further embodiments, from about 40% to about 70% of the SiNWs mass is amorphous.

According to some embodiments, at least about 50% of the mass of each SiNW is amorphous. According to further embodiments, at least about 70% of the mass of each SiNW is amorphous. According to some embodiments, from about 30% to about 95% of the mass of each SiNW is amorphous. According to some embodiments, from about 40% to about 70% of the mass of each SiNW is amorphous.

In some embodiments, the SiNWs have a core-shell structure. In some embodiments, the inner part of the SiNW (which can also be referred to as "SiNW core") is crystalline. In some embodiments, the outer part of the SiNW (which can also be referred to as "SiNW shell") is amorphous. In some embodiments, the amorphous shell constitutes a conformal coating on the crystalline core. In further embodiments, the core-sell structure of the SiNWs in obtained by a single step CVD process. Without wishing to being bound by theory or mechanism of action, it is contemplated that the crystalline core-amorphous shell structure of the SiNWs according to some embodiments of the invention, affords for the high loadings of Si on the substrate without compromising the anode stability.

According to some embodiments, at least about 30% of the SiNWs have a core-shell structure. According to further embodiments, at least about 50% of the SiNWs have a core-shell structure. According to still further embodiments, at least about 70% of the SiNWs have a core-shell structure. According to some embodiments, from about 30% to about 95% of the SiNWs have a core-shell structure. According to further embodiments, from about 40% to about 70% of the SiNWs have a core-shell structure. In certain embodiments, said shell is amorphous.

In some embodiments, the SiNW shell constitutes at least about 30% of the mass of the SiNW, at least about 40%, at least about 50%, at least about 60%, at least about 70% or at least about 80% of the mass of the SiNW. Each possibility represents a separate embodiment of the invention. In further embodiments, the SiNW shell constitutes from about 30% to about 95% of the mass of the SiNW. In yet further embodiments, the SiNW shell constitutes from about 40% to about 70% of the mass of the SiNW. In certain embodiments, said shell is amorphous.

In some embodiments, the SiNW shell constitutes at least about 30% of the SiNW structure, at least about 40%, at least about 50%, at least about 60%, at least about 70% or at least about 80% of the SiNW structure. Each possibility represents a separate embodiment of the invention. In further embodiments, the SiNW shell constitutes from about 30% to about 95% of the SiNW structure. In yet further embodiments, the SiNW shell constitutes from about 40% to about 70% of the SiNW structure. In certain embodiments, said shell is amorphous.

The core-shell shape of the SiNWs depends on the shape of the SiNWs. In some exemplary embodiments, the SiNWs have a radial heterostructure, wherein the core is crystalline and the shell is amorphous. In certain such embodiments, the thickness of the core is essentially the same as the diameter thereof. The thickness (or diameter) of the SiNW core can be measured, inter alia, by Transmission Electron Microscopy (TEM) or by TEM coupled with Fourier transform analyzer. The thickness of the shell can be calculated by subtracting the diameter of the core from the diameter of the SiNW, and dividing the obtained value by the factor of 2, wherein the diameters of the SiNW and of the core are extracted from the TEM micrograph.

According to some embodiments, the SiNW core has a thickness of from about 5 nm to about 40 nm. According to some embodiments, the SiNW shell has a thickness of from about 5 nm to about 250 nm. In further embodiments, the SiNW shell has a thickness of from about 10 nm to about 120 nm. In still further embodiments, the SiNW shell has a thickness of from about 20 nm to about 100 nm. In certain embodiments, the shell has a thickness of about 20 nm, 25 nm, 30 nm, 40 nm, 50 nm, 60 nm, 70 nm, 80 nm or 85 nm. Each possibility represents a separate embodiment of the invention. In certain embodiments, said shell is amorphous.

The length and thickness of the SiNWs according to the principles of the present invention can be controlled by the CVD growth time. In particular, the thickness of the amorphous shell can be defined by the CVD growth time.

FIGS. 2E-2J show low and high-magnification TEM micrographs of SiNWs according to some embodiments of the present invention, wherein the SiNWs have a crystalline core and amorphous shell.

The SiNWs can be doped with at least one element selected from the group consisting of boron, arsenic, phosphorus, iron, chromium, aluminum and a combination thereof. In certain embodiments, the doping element is boron. The atomic ratio between the doping element and silicon can range from about 1:500 to about 1:10,000. In certain embodiments, the atomic ratio is between about 1:1000 and 1:8000. Composite nanowires, such as, but not limited to, silicon/germanium alloy nanowires or core-shell nanowires, wherein the core and the shell comprise distinct materials, are also within the scope of the present invention.

Si Tubular Nanostructures

According to some embodiments, there is provided an anode comprising: an electrically conductive substrate, comprising at least one non-uniform surface; and a random network of silicon tubular nanostructures, chemically grown on the at least one non-uniform surface of the substrate.

The term "tubular nanostructure", as used herein, relates in some embodiments to nanostructures, which are shaped as hollow tubes, preferably entirely hollow along their longitudinal axis. The terms "tubular nanostructure" and "nanotubes" can be used interchangeably.

The tubular nanostructures may include single walled nanotubes or multi walled nanotubes. The term "multi walled nanostructure", as used herein, refers to a nanostructure which comprises two or more walls, each wall being a hollow tubular nanostructure, as defined herein, wherein each tubular nanostructure is interposed within a consecutive larger tubular nanostructure. The multi walled nanotubes may further include hybrid tubular nanostructures such as, for example, "tube-in-tube" and "wire-in-tube" nanostructures. In some embodiments of the present invention, the multi-walled nanostructures can be tubular, conical or both ("funnel-like").

Si nanotubes can have a diameter in the range from about 5 nm to about 500 nm. According to some embodiments, the length of the Si nanotubes is from about 0.5 μm to about 500 μm.

According to the preferred embodiments, at least about 30% of the Si nanotubes have an amorphous morphology. The Si nanotubes can be doped with at least one element selected from the group consisting of boron, arsenic, phosphorus, iron, chromium, aluminum and a combination thereof. Composite nanotubes, such as, but not limited to, silicon/germanium alloy nanotubes or core-shell nanotubes, wherein the core and the shell comprise distinct materials, are also within the scope of the present invention.

Growth of the Si Elongated Nanostructures on the Substrate

The SiNWs and/or Si nanotubes can be grown on the at least one non-uniform surface of the substrate or, optionally, on the plurality of non-uniform surfaces of the substrate. Thus, in some embodiments, the SiNWs are disposed on the first non-uniform surface of the substrate or, optionally, on the plurality of non-uniform surfaces of the substrate.

According to some embodiments, the SiNWs are concurrently grown on the plurality of non-uniform surfaces of the substrate.

Figure 3A:
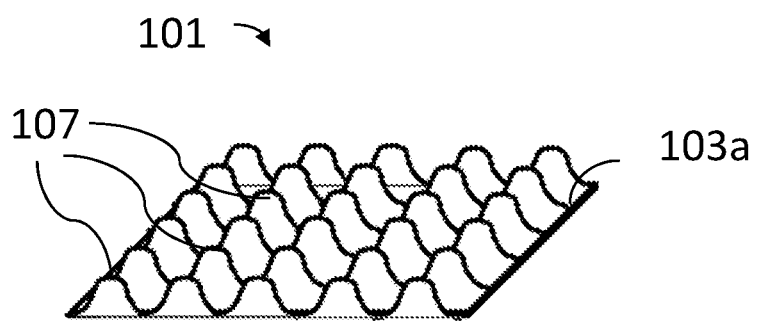
FIGS. 3A-3D: Schematic representation of growth of SiNWs on the substrate comprising at least one non-uniform surface or a plurality of non-uniform surfaces.
Figure 3B:
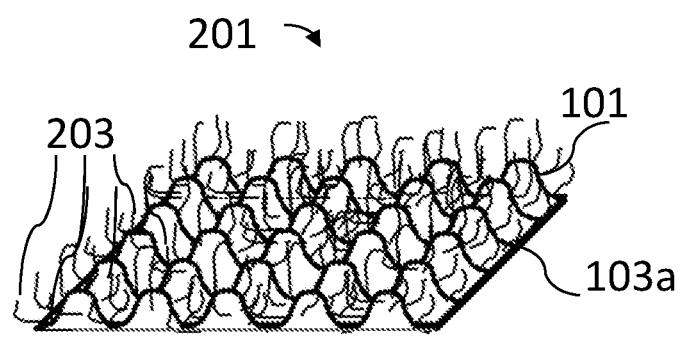

Reference is now made to FIGS. 3A-3B, which schematically illustrate growth of SiNWs on the substrate comprising at least one non-uniform surface, according to some embodiments of the invention. FIG. 3A shows bare substrate 101, including non-uniform surface 103a having a plurality of topographical irregularities 107. FIG. 3B shows anode 201, comprising a plurality of SiNWs 203 chemically grown on non-uniform surface 103a of substrate 101. Without wishing to being bound by theory or mechanism of action, the plurality of irregularities 107 afford for the growth of SiNWs 203 in a random network configuration on non-uniform surface 103a.

Figure 3C:
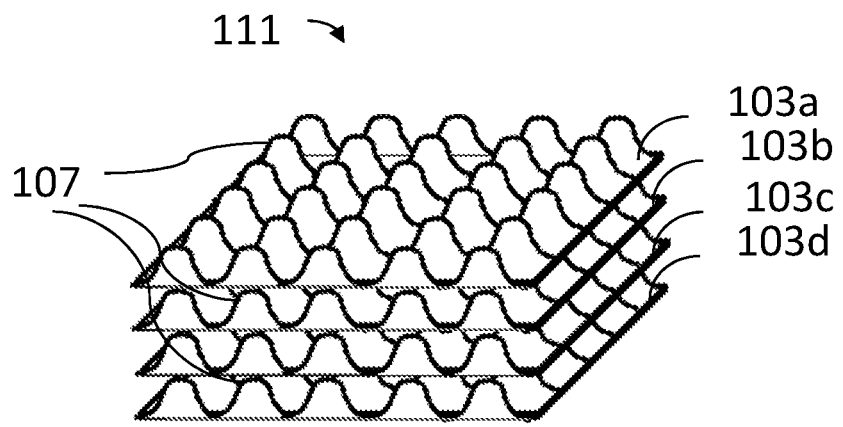
Figure 3D:
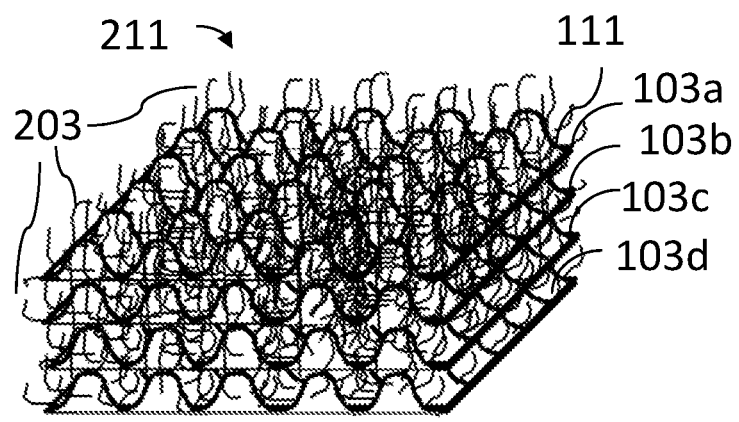

Reference is now made to FIGS. 3C-3D, which schematically illustrate growth of SiNWs on the substrate comprising a plurality of non-uniform surfaces, according to some embodiments of the invention. FIG. 3C shows bare substrate 111, including a plurality of non-uniform surfaces 103a, 103b, 103c and 103d having a plurality of topographical irregularities 107. FIG. 3C shows anode 211, comprising a plurality of SiNWs 203 chemically grown on the plurality of non-uniform surfaces 103a, 103b, 103c and 103d of substrate 111. Without wishing to being bound by theory or mechanism of action, the plurality of irregularities 107 afford for the growth of SiNWs 203 in a random network configuration on the plurality of non-uniform surfaces 103a, 103b, 103c and 103d of substrate 111.

Alternatively, the SiNWs can be grown on the first non-uniform surface of the substrate and optionally, in the non-uniform bulk portion of the substrate and the second non-uniform surface of the substrate. Thus, in some embodiments, the SiNWs are disposed on the first non-uniform surface of the substrate and optionally in the non-uniform bulk portion of the substrate and on the second non-uniform surface of the substrate. In some embodiments, the SiNWs are grown in the non-uniform bulk surface of the substrate and on the first non-uniform surface of the substrate. In other embodiments, the SiNWs are grown in the non-uniform bulk portion of the substrate, on the first non-uniform surface of the substrate and on the second non-uniform surface of the substrate. According to additional embodiments, the SiNWs are concurrently grown on the first non-uniform surface of the substrate, in the non-uniform bulk portion of the substrate, and optionally, on the non-uniform second surface of the substrate.

Figure 4A:
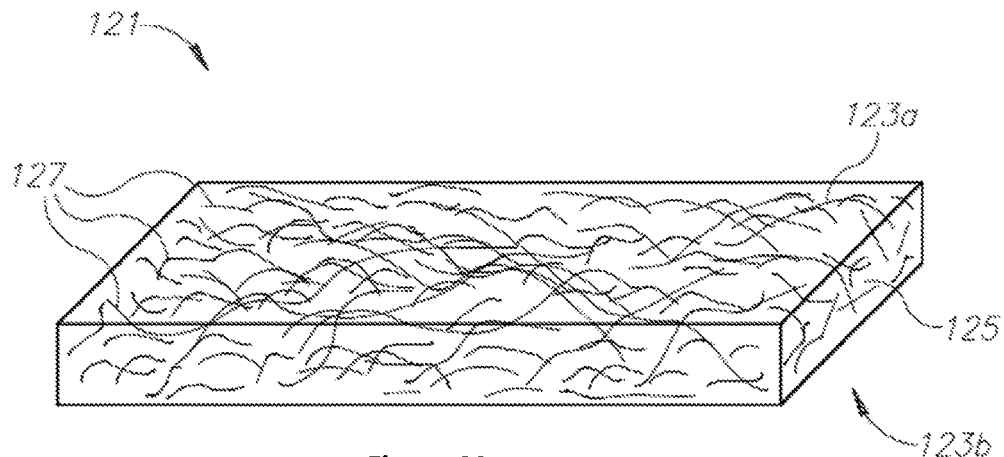
FIGS. 4A-4C: Schematic representation of growth of SiNWs on the substrate comprising a non-uniform bulk portion.
Figure 4B:
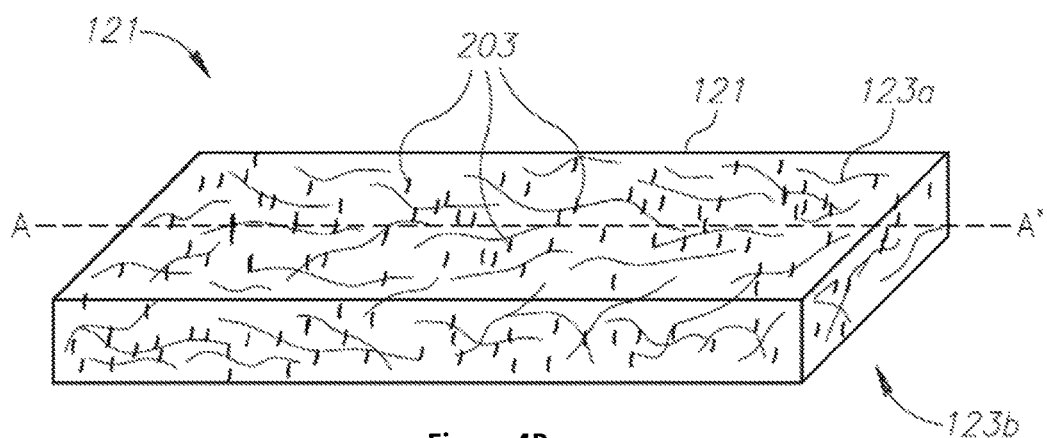
Figure 4C:
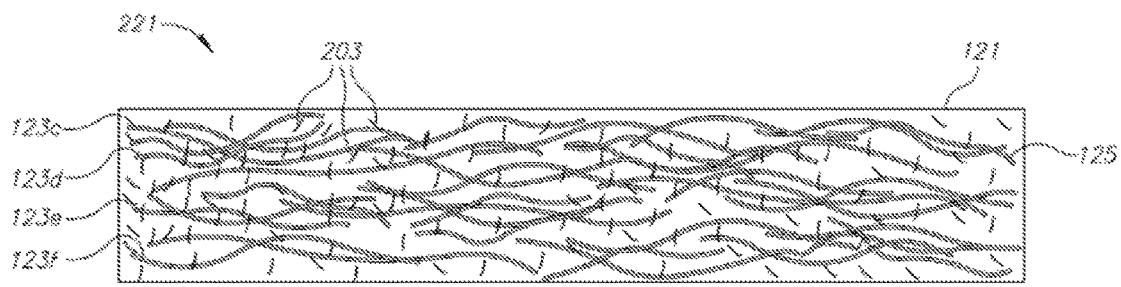

Reference is now made to FIGS. 4A-4C, which schematically illustrate growth of SiNWs on the substrate having a non-uniform bulk portion, according to some embodiments of the invention. FIG. 4A shows bare substrate 121, including first non-uniform surface 123a, second non-uniform surface 123b and non-uniform bulk portion 125. Substrate 121 is made of a plurality of fibers 127. FIG. 4B shows anode 221, comprising a plurality of SiNWs 203 chemically grown on non-uniform surface 123a, non-uniform surface 123b and additional non-uniform surfaces of substrate 121. FIG. 4C shows a cross section of anode 221 along the line AA' in FIG. 4B. It can be seen, that a plurality of SiNWs 203 are grown also in non-uniform bulk portion 125 of substrate 121, comprising a plurality of non-uniform surfaces, such as 123c, 123d, 123e and 123f.

The SiNWs are chemically grown on the substrate. Thus, one of the advantages of the present invention is that SiNWs are directly connected to the substrate. Accordingly, the SiNWs can be connected to the substrate without a binder.

According to some embodiments, the SiNWs are chemically grown in the trenches of the non-uniform surface of the substrate. In further embodiments, the SiNWs are chemically bonded to the substrate non-uniform surface.

According to some embodiments, the SiNWs are chemically grown on the fibers of the substrate. In further embodiments, the SiNWs are chemically bonded to the substrate fibers. According to some embodiments, the substrate fibers have a thickness of from about 1 to about 30 μm and the SiNWs have a thickness of from about 20 nm to about 300 nm.

One of the multiple advantages of the anodes of the present invention is that they provide a wide range of silicon loadings, which can be adjusted to the desired battery configuration, including exceptionally high silicon loadings. The anode of the present invention comprises a random network of SiNWs on the substrate, wherein a silicon loading on the substrate can be from about 0.3 mg/cm$^2$ to about 20 mg/cm$^2$. In some embodiments, the silicon loading is from about 0.5 mg/cm$^2$ to about 20 mg/cm$^2$. In further embodiments, the loading is from about 2 mg/cm$^2$ to about 6 mg/cm$^2$. In some embodiments, the silicon loading is at least about 0.5 mg/cm$^2$, or at least about 1 mg/cm$^2$, or at least about 2 mg/cm$^2$, or at least about 3 mg/cm$^2$, or at least about 4 mg/cm$^2$, or even at least about 5 mg/cm$^2$. Each possibility represents a separate embodiment of the invention. The high silicon loadings of the anodes of the present invention can beneficially be used in a "sandwich-like" cell configuration, comprising an anode positioned between two cathodes. Said configuration does not require depositing the anode on the anode current collector. The high silicon loading of the anode supplies sufficient mass of silicon for each cathode.

The weight ratio between the carbon substrate and the silicon nanowires according to the principles of the present invention can range from about 1:0.1 to about 1:6. In some embodiments, the range is from about 1:0.2 to about 1:5, from about 1:0.5 to about 1:4 or from about 1:1 to about 1:3. Each possibility represents a separate embodiment of the invention. In certain embodiments, the weight ratio between the carbon substrate and the silicon nanowires is at least about 1:0.5. In further embodiments, the weight ratio is at least about 1:1. In still further embodiments, the weight ratio is at least about 1:2.

According to some embodiments, at least about 10% of the substrate non-uniform surface is covered by SiNWs. In further embodiments, at least about 40% of the substrate non-uniform surface is covered by SiNWs, or at least about 70%, or even at least about 80% of the substrate non-uniform surface. According to some embodiments, at least about 10% of the substrate trenches' surface is covered by SiNWs. In further embodiments, at least about 40% of the substrate trenches' surface is covered by SiNWs, or at least about 70%, or even at least about 80% of the substrate trenches' surface. According to some embodiments, at least about 10% of the substrate elongated structures' surface is covered by SiNWs. In further embodiments, at least about 40% of the substrate elongated structures' surface is covered by SiNWs, or at least about 70%, or even at least about 80% of the substrate elongated structures' surface. According to some embodiments, at least about 10% of the substrate fibers' surface is covered by SiNWs. In further embodiments, at least about 40% of the substrate fibers' surface is covered by SiNWs, or at least about 70%, or even at least about 80% of the substrate fibers' surface. Each possibility represents a separate embodiment of the invention.

According to some embodiments, at least about 30%, 60%, or 90% of the SiNWs of the anode is disposed within the non-uniform bulk portion of the substrate. In some preferred embodiments, the SiNWs are homogeneously dispersed throughout the substrate.

The thickness of the anode of the present invention can be defined as a total thickness of the substrate and a layer of the SiNWs chemically grown on the at least one non-uniform surface thereof. In some embodiments, the anode has a thickness of from about 5 μm to about 500 μm, such as from about 10 μm to about 400 μm, or from about 20 μm to about 300 μm, or even from about 50 μm to about 200 μm. Each possibility represents a separate embodiment of the invention.

SiNWs Chemical Vapor Deposition

According to some embodiments, there is provided a method for manufacturing an anode comprising providing an electrically conductive substrate, comprising at least one non-uniform surface; and chemically growing a random network of silicon nanowires on the at least one non-uniform surface of the substrate. In certain embodiments, the SiNWs have at least about 30% amorphous morphology. In some embodiments, the anode is a lithium ion battery anode.

The random network of SiNWs can be chemically grown on the electrically-conductive substrate comprising at least one non-uniform surface by any suitable technique, configured to provide growth of the SiNWs on said non-uniform surface, and, optionally, throughout the total volume of the substrate. The non-limiting examples of such technique include chemical vapor deposition (CVD) and solution growth. Each possibility represents a separate embodiment of the invention. CVD is a chemical process used to produce high-purity, high-performance solid materials. In typical CVD, the substrate is exposed to one or more volatile precursors, which react and/or decompose on the substrate surface to produce the desired deposit.

According to some embodiments, the SiNWs are grown on the substrate via a catalytic CVD technique. Catalytic CVD employs a noble metal catalyst, such as, but not limited to gold and aluminum, in order to assist the growth of SiNWs. The most common noble metal in the SiNWs growth process from silicon-containing precursor gases (silane, disilane) or silicon liquid precursors (trisilane) is gold (Au). The growth of SiNWs is explained by the vapor-liquid-solid (VLS) mechanism. Silane is decomposed to form a liquid Au—Si eutectic on Au particles at low temperatures. According to the phase diagram of Au—Si, the solubility of Si in solid Au is negligibly small Pure silicon then precipitates at the liquid-solid interface.

According to some embodiments, the process of chemically growing a random network of SiNWs on the substrate includes a step of pretreating the substrate. Without wishing to being bound by theory or mechanism of action, the substrate is pretreated in order to improve the surface wetting properties thereof. According to some embodiments, the process of chemically growing a random network of SiNWs on the substrate comprises a step of treating the substrate by oxygen plasma. The substrate can be pre-treated by oxygen-plasma gas treatment to increase hydrophilicity of the substrate and improve its wetting properties. According to some embodiments, the process further includes a step of treating the substrate by adsorption of an electrostatic adhesion agent. Said electrostatic adhesion agent can be poly-L-lysine. Poly-Lysine deposits on the substrate non-uniform surface, making them positively charged. Without wishing to being bound by theory or mechanism of action, deposition of poly-L-lysine on the substrate surface allows the further deposition of negatively charged gold nanoparticles at a controlled density on the plurality of substrate non-uniform surfaces and/or in the non-uniform bulk portion thereof.

The process of chemically growing a random network of SiNWs according to some embodiments further comprises a step of deposition of catalytic nanoparticles on the substrate. In some embodiments, the catalytic nanoparticles are deposited on the at least one non-uniform surface of the substrate. In some embodiments, the catalytic nanoparticles are deposited on the plurality of non-uniform surfaces of the substrate. In some embodiments, the catalytic nanoparticles are deposited in the non-uniform bulk portion of the substrate. In further embodiments, the catalytic nanoparticles are deposited on the first and/or on the second non-uniform surface of the substrate. The non-limiting examples of said catalytic nanoparticles include gold, aluminum or copper nanoparticles. Each possibility represents a separate embodiment of the invention. Typically, the catalytic nanoparticles have a diameter in the range from about 5 nm to 500 nm, preferably from about 20 nm to about 80 nm.

According to some embodiments, the deposition of catalytic nanoparticles is performed by immersing the substrate into an aqueous colloidal solution of the catalytic nanoparticles. According to the principles of the present invention, the substrate is immersed in the aqueous colloidal solution for at least about 5 min, for at least about 10 min, or for at least about 15 min Each possibility represents a separate embodiment of the invention.

According to some embodiments, the deposition of catalytic nanoparticles is performed by electroless deposition. According to some embodiments, the electroless deposition includes immersing the substrate into an aqueous/ethanolic solution of a gold salt precursor and a reducing agent, at different incubation times. Control over the water/ethanol ratios, gold salt precursor concentration, reducing agent nature and concentration, and time of incubation, provide the control over density and dimensions of deposited gold nanoparticles.

The CVD process is typically performed in a CVD reactor. In some embodiments, the CVD process is performed at a temperature of about 280-600° C. In some embodiments, the CVD process is performed at a pressure of from about 400° C. to about 500° C. In some embodiments, the CVD process is performed at a temperature of at least about 480° C. In some embodiments, the CVD process is performed in a gaseous atmosphere, comprising silane ($SiH_4$), diborane ($B_2H_6$) and argon (Ar). According to some embodiments, the CVD process is performed at a pressure of above about 30 torr. In further embodiments, the CVD process is performed at a pressure of above about 50 torr.

Without wishing to being bound by theory or mechanism of action, said CVD process conditions enable formation of SiNWs having at least about 30% amorphous morphology. It is further contemplated that said CVD process conditions enable formation of the SiNWs core-shell structure, wherein the shell is amorphous. In further embodiments, the core is crystalline.

The CVD process, according to the principles of the present invention, is typically performed for about 30 to about 120 min. As mentioned hereinabove, the CVD growth period affects the length and thickness of the SiNWs, according to some embodiments of the invention. Without wishing to being bound by theory or mechanism of action, said correlation between the growth time and the length and/or thickness of the SiNWs provides effective control over the Si loading of the anode.

According to some exemplary embodiments, the CVD is performed in a one-step process. In further embodiments, the one-step CVD process provides core formation in combination with pyrolytic deposition of the amorphous silicon shell at the same CVD process conditions. Accordingly, the one step CVD process is fast and convenient, since it does not require sequential core formation followed by pyrolytic deposition of amorphous silicon at different growth conditions. As mentioned hereinabove, the CVD growth period can define the thickness of the amorphous shell, thereby providing effective control over the Si loading of the anode. Without further wishing to being bound by theory, it is assumed that the crystalline core thickness is defined by the mean diameter of the catalytic nanoparticle.

According to other embodiments, the CVD is performed in a multi-step process.

Si Nanotubes Chemical Vapor Deposition

According to some embodiments, there is provided a method for manufacturing an anode comprising providing an electrically conductive substrate, comprising at least one non-uniform surface; and chemically growing a random network of silicon nanotubes on the at least one non-uniform surface of the substrate. In some embodiments, the anode is a lithium ion battery anode.

According to some embodiments, silicon nanotubes are grown on the substrate through a template assisted method. The template assisted method generally includes a step of growing sacrificial nanowires of a given diameter, such as, but not limited to, germanium nanowires. Further, the nanowires are covered conformally by a layer of silicon, of a given thickness. Finally the sacrificial nanowire cores are removed by oxidation and/or sublimation of cores in a CVD system. In some embodiments, the CVD operating parameters include oxygen pressure of under about 1 Atm and temperature of above 350° C. More details about a template assisted method for growing Si nanotubes may be found in International Patent Application WO 2010/052704, which is hereby incorporated by reference in its entirety.

Si Elongated Nanostructures Conducting Coating

Typically, when a Si-based sample is removed from the CVD chamber, it immediately reacts with air to form a thin silicon oxide ($SiO_2$) layer on the surface of Si. The oxide film may increase impedance of the SiNWs and slow down the silicon lithiation and de-lithiation processes. In order to avoid or reduce the formation of the oxide layer on the freshly-prepared SiNWs, the nanowires can be coated by a protective layer. In some embodiments, the SiNWs are coated by a conducting coating. The SiNWs comprising the conducting coating may have a core-shell structure, wherein the core comprises the SiNW (which can have the crystalline core-amorphous shell structure) and the shell comprises the conducting coating. In some embodiments, the Si nanotubes are coated by said conducting coating.

The conductive coating can be selected to provide additional desired properties or enhance the existing properties of the SiNWs grown on the electrically-conductive substrate. For example, the SiNWs can be coated by an electron-conducting coating, thus improving electrical contact between the anode, and particularly the substrate thereof, which can be connected to a current collector, and Li ions. In that way, the battery impedance is decreased, providing improved efficiency and a more stable cycle life. Alternatively, or additionally, the SiNWs can be coated by a Li ion conducting coating. In some embodiments, the Li conducting coating forms a solid electrolyte film. Without wishing to being bound by theory or mechanism of action, formation of the solid electrolyte film prior to the cycling of the electrode reduces formation of the SEI during cycling, thus allowing to significantly decrease the capacity loss and/or the irreversible capacity of the anode. Thus, according to some embodiments, the conducting coating comprises an electron conducting coating, a Li cation conducting coating or a combination thereof. In certain embodiments, the anode comprises a random network of SiNWs chemically grown on the electrically conductive substrate, wherein the SiNWs are coated with the electron conducting coating. In other certain embodiments, the anode comprises a random network of SiNWs chemically grown on the electrically conductive substrate, wherein the SiNWs are coated with the Li cation conducting coating. In further certain embodiments, the anode comprises a random network of SiNWs chemically grown on the electrically conductive substrate, wherein the SiNWs are coated with the electron conducting coating and with the Li cation conducting coating.

The non-limiting examples of the electron conducting coatings include carbon, graphite, reduced graphene oxide and combinations thereof.

The Li cation conducting coating can comprise a solid lithium electrolyte, including, but not limited to, lithium imide ($Li_3N$), lithium oxide ($Li_2O$), lithium sulfate ($Li_2SO_4$), lithium fluoride (LiF), lithium carbonate ($Li_2CO_3$), lithium phosphate ($Li_3PO_4$) or combinations thereof. In some embodiments, the Li cation conducting coating on the SiNWs forms a Solid-Electrolyte Interface (SEI). In some embodiments, the Li cation conducting coating further comprises a polymer. In some embodiments, the polymer is present in the Li cation conducting coating in a weight percent of up to about 50% of the total weight of the Li cation conducting coating. The polymer may be selected from the group consisting of polyolefins, polycarbonate, poly(methyl methacrylate) and combinations thereof.

In further embodiments, the Li cation conducting cation comprises a ceramic material, such as, but not limited to $Al_2O_3$, ZnO, TiO, or HfO.

The conducting coating can comprise one or more layers of the conducting material. In some embodiments, the thickness of the conducting coating is from about 1 nm to about 10 nm. In further embodiments, the thickness is from about 2 nm to about 8 nm, or from about 4 nm to about 6 nm. Each possibility represents a separate embodiment of the invention.

Conducting Coating Preparation

The conducting coating can be applied to the SiNWs by any suitable technique, such as but not limited to, CVD, Physical Vapor Deposition (PVD), pyrolysis of a precursor or salt precipitation combined with thermal treatment. Each possibility represents a separate embodiment of the invention. According to some embodiments, the coating is applied to the SiNWs prior to the formation of the $SiO_2$ layer.

In some embodiments, the application of the electron conducting coating is performed by CVD, PVD, pyrolysis or a combination thereof. The CVD process for forming a carbon conducting coating can be performed using methane gas precursor and hydrogen gas as a carrier. In further embodiments said CVD process is performed at a temperature of from about 800° C. to about 900° C. The pressure in the CVD chamber can be about 1-50 torr. The pyrolysis process can be performed by heating a solution of a suitable precursor to a temperature of from about at 500 to 1000° C. in the presence of oxygen. The non-limiting examples of sitable precursors include saccharide, oligomer or polymer precursors. One non-limiting example of suitable saccharide is sucrose. The non-limiting examples of the polymers include poly(methyl methacrylate) (PMMA) or polynitrile (PN).

In some embodiments, the application of the Li cation conducting coating is performed by PVD, salt precipitation combined with thermal treatment or a combination thereof. The method of salt precipitation combined with thermal treatment comprises applying to the SiNWs a composition comprising a Li salt. The non-limiting examples of suitable Li salts include lithium nitrate ($LiNO_3$), lithium carbonate ($Li_2CO_3$), lithium triflate ($CF_3SO_3$), lithium imide (lithium bis(perfluoroethylsulfonyl)imide or combinations thereof. The salt-solvent composition, which is applied to the SiNWs before the heat treatment, includes a non-aqueous solvent. The non-limiting examples of suitable non-aqueous solvents include acetonitrile; propylene carbonate; diethyl carbonate; dimethyl carbonate; glyme, including without a limitation monoglyme, diglyme, triglyme or tetraglyme; ether or combinations thereof. The composition can further comprise a polymer. The non-limiting examples of suitable polymers include polyolefins, polycarbonate and poly(methyl metacrylate).

In some embodiments, the method of salt precipitation combined with thermal treatment comprises evaporating the non-aqueous solvent. The method can further include heat treating the Li salt at a temperature of from about 100 to about 1000° C. preferably from about 300 to about 700° C.

According to some embodiments, the PVD process for the application of the Li cation conducting coating includes a step of precursor evaporation. The precursor can be a Li salt, including, but not limited to, lithium nitrate ($LiNO_3$), lithium carbonate ($Li_2CO_3$), lithium triflate ($CF_3SO_3$), lithium imide (lithium bis(perfluoroethylsulfonyl)imide) or combinations thereof. According to some embodiments, the PVD process evaporation is performed at a temperature between 500-850° C., depending on salt precursor vapor pressure. According to further embodiments, the precursor is volatilized under the flow of inert carrier gas, such as, but not limited to argon or helium). The volatilized precursors are then deposited as a shell on surfaces of silicon nanowires which are held at a lower temperature of about 350-600° C. Control over the volatilizing temperature of lithium salt precursor, the flow of inert gas, the time of deposition and the deposition temperature allows to finely control the Li salt shell thickness within 1-100 nm.

Ceramic Li conducting coating can be applied to the SiNWs by means of ALD (atomic layer deposition), CVD (chemical vapor deposition), solution phase coating, or sputtering.

Anode Electrochemical Properties

The lithium ion battery anodes according to the principles of the present invention exhibit improved electrochemical properties, as compared to the prior art SiNWs-based anodes. Specifically, the geometric capacity, irreversible capacity, cycle life stability and current efficiency of the anodes of the present invention are close to those of graphite anodes and are required in the current lithium ion battery technology.

The very low irreversible capacity of about 10% is close to that of graphite, such that no change needs to be made in the electrode capacity balance.

In various embodiments, the anode according to the principles of the present invention has a geometric capacity of from about 0.5 mAh/cm$^2$ to about 20 mAh/cm$^2$, from about 1 mAh/cm$^2$ to about 16 mAh/cm$^2$, from about 1 mAh/cm$^2$ to about 15 mAh/cm$^2$, from about 1 mAh/cm$^2$ to about 10 mAh/cm$^2$, from about 2 mAh/cm$^2$ to about 8 mAh/cm², or from about 4 mAh/cm² to about 6 mAh/cm². Each possibility represents a separate embodiment of the invention. In some embodiments, the anode has a geometric capacity of at least about 2 mAh/cm², or about 3 mAh/cm², or even about 4 mAh/cm². Each possibility represents a separate embodiment of the invention. In certain embodiments, the anode maintains said geometric capacity for at least about 20 cycles.

Presently known lithium ion batteries are assembled with 3-4 mAh/cm² anode capacity. Thus, the high SiNWs-based anode capacity of about 4 mAh/cm² of the anodes, according to the principles of the present invention, allows the application of these anodes in practical, pouch or prismatic, lithium ion batteries for portable and electric vehicles applications. Moreover, SiNWs-based anodes of the present invention, having extremely high capacity of about 7-16 mAh/cm² can be used in a sandwich-like configuration, between two cathodes with no current collector, in pouch and in prismatic lithium ion batteries. In some exemplary embodiments, the thickness of said anode is about 160 microns, and divided by a factor of 2 when facing two cathodes, gives a thickness of about 80 microns which is similar to the thickness of the graphite anode in common, high-energy lithium ion batteries.

According to some embodiments, a decrease in the geometric capacity is below about 10% for at least about 100 cycles at a charge/discharge rate of 0.1 mA/cm². According to further embodiments the decrease is below about 7%, or below about 5%, or even below about 3%. According to some exemplary embodiments, the anode maintains from about 90% to about 97% of the geometric capacity thereof for at least about 100 cycles at a charge/discharge rate of 0.1 mA/cm².

According to some embodiments, a decrease in the geometric capacity is below about 27% for at least about 200 cycles at a charge/discharge rate of 0.1 mA/cm². According to further embodiments the decrease is below about 25%, or below about 20%, or even below about 16%. Each possibility represents a separate embodiment of the invention. According to some exemplary embodiments, the anode maintains from about 73% to about 84% of the geometric capacity thereof for at least about 200 cycles at a charge/discharge rate of 0.1 mA/cm². According to further exemplary embodiments, the decrease in the geometric capacity of the anode is about 0.1% per cycle a charge/discharge rate of 0.1 mA/cm². According to further embodiments, the initial geometric capacity of said anode is at least about 2 mAh/cm², at least about 3 mAh/cm², or at least about 4 mAh/cm². Each possibility represents a separate embodiment of the invention.

It has been shown by the inventors of the present invention that the anodes according to the principles of the present invention can be taken out of the exploited cell, washed and reassembled in said cell, providing at least about 70% of the initial geometric capacity. In further embodiments, the anode provides at least about 80% of the initial capacity or at least about 90% of the initial geometric capacity, following washing and cell reassembly. It can be, therefore, assumed that since washing of the anode enables substantial rehabilitation thereof, the decrease in the geometric capacity of the cell during cycling is essentially not caused by the irreversible pulverization or detachment of the SiNWs from the substrate. Accordingly, in some embodiments, the SiNWs remain chemically connected to the at least one non-uniform surface of the substrate for at least about 100 cycles. In further embodiments, the SiNWs remain chemically connected to the plurality of non-uniform surfaces, to the non-uniform bulk portion or to a combination thereof. Each possibility represents a separate embodiment of the invention. In some embodiments, at least about 70% of the SiNWs remain chemically connected for at least about 100 cycles, at least about 80% of the SiNWs or even at least about 90% of the SiNWs. Each possibility represents a separate embodiment of the invention. In further embodiments, the SiNWs remain chemically connected to the at least one non-uniform surface, to the non-uniform bulk portion or a combination thereof for at least about 200 cycles. In further embodiments, the SiNWs remain connected for at least about 300 cycles, for at least about 400 cycles or for at least about 500 cycles. Each possibility represents a separate embodiment of the invention.

According to some embodiments, the irreversible capacity of the anode is below about 15% of the total geometric capacity. According to further embodiments, the irreversible capacity of the anode is below about 12.5% of the total geometric capacity. According to still further embodiments, the irreversible capacity of the anode is below about 10% of the total geometric capacity. The very low irreversible capacity of about 10% is close to that of graphite, thus, advantageously, no change needs to be made in the electrode capacity balance.

According to some embodiments, the anode is configured to be charged and discharged at C rate of at least about 0.4C. According to some embodiments, the anode is configured to be charged and discharged at C rate of at least about 1.3C. In some exemplary embodiments, the decrease in the geometric capacity is below about 10% for cycling at C rate of about C/4 for at least about 70 cycles. In these embodiments, the C rate is calculated for a $LiFePO_4$ cathode. The high power demonstrated by the SiNWs-based anodes of the present invention (less than one hour discharge and charge time, as disclosed in the experimental section hereinbelow), is very appealing for various lithium ion batteries applications.

According to some embodiments, the anode of the present invention provides at least about 92% Faradaic efficiency. According to some preferred embodiments, the anode provides at least about 98% Faradaic efficiency, or at least about 99%, or even at least about 99.5% Faradaic efficiency. Each possibility represents a separate embodiment of the invention. In said preferred embodiments, the geometric capacity of the anode is at least about 2 mAh/cm², at least about 3 mAh/cm², or at least about 4 mAh/cm². Each possibility represents a separate embodiment of the invention.

Lithium Ion Battery

The anodes according to the principles of the present invention can be incorporated into lithium ion batteries. Thus, according to another aspect, there is provided a lithium ion battery comprising an anode comprising a three-dimensional electrically conductive substrate, comprising at least one non-uniform surface; and a random network of silicon elongated nanostructures chemically grown on the at least one non-uniform surface of the substrate. In some embodiments, the silicon elongated nanostructures comprise Si nanowires. In some embodiments, the silicon elongated nanostructures comprise Si nanotubes.

The lithium ion battery according to the principles of the present invention can further comprise an electrolyte. Typically, the lithium ion battery electrolyte includes a Li salt in a non-aqueous solvent. The non-limiting examples of suitable electrolytes include lithium hexafluorophosphate ($LiPF_6$), lithium trifluoromethanesulfonate (lithium triflate, $CF_3SO_3Li$), or lithium imide (lithium bis(perfluoroethylsulfonyl)imide.

In some embodiments, the anode in the battery faces the electrolyte. In particular embodiments, the SiNWs grown on the non-uniform surface of the substrate faces the electrolyte. In certain such embodiments, the substrate comprises at least one non-uniform surface. In further certain such embodiments, the substrate comprises a first non-uniform surface and a second uniform surface, wherein the first non-uniform surface faces the electrolyte. The substrate material, according to the principles of the present invention, should be compatible with the electrolyte.

The lithium ion battery according to the principles of the present invention can further comprise at least one cathode. In some embodiments, the lithium ion battery comprises two cathodes. The non-limiting examples of suitable electrolytes include lithium iron phosphate (LiFePO$_4$), sulfur-based cathode, lithium metal oxide-based cathode, and air or oxygen cathode. The lithium metal oxide-based cathode can comprise a metal selected from Ni, Mn, Co or Al.

The lithium ion battery according to the principles of the present invention can further comprise at least one current collector. In certain such embodiments, the substrate comprises at least one non-uniform surface and a flat surface, wherein the flat surface faces the current collector. In other embodiments, the substrate comprises a first non-uniform surface and a second uniform surface, wherein the second non-uniform surface faces the current collector. In order to improve electric contact between the anode and the current collector, an electronically-conducting material can be applied to the flat surface or the second non-uniform surface of the anode substrate. Thus, according to some embodiments, the second non-uniform surface of the substrate is coated with an electrode ink. According to further embodiments, the electrode ink comprises carbon powder and a binder. The non-limiting examples of suitable binders include poly(styrene-co-butadiene), polyvinylidene fluoride (PVDF), poly(methyl methacrylate) (PMMA) or combinations thereof. According to yet further embodiments, the electrode ink further comprises a non-aqueous solvent, such as, but not limited to, acetonitrile; propylene carbonate; diethyl carbonate; dimethyl carbonate; glyme, including without a limitation monoglyme, diglyme, triglyme or tetraglyme; ether or combinations thereof. Typically, about 0.03 ml to about 0.3 ml, preferably about 0.05 to about 0.1 ml of the electrode ink is applied to 1 cm$^2$ of the substrate second surface.

The anode according to the principles of the present invention, comprising a random network of SiNWs chemically grown on two opposed non-uniform surfaces of the substrate can be advantageously incorporated into a Li ion battery in a "sandwich-like" configuration. Thus, according to some embodiments, the anode is disposed in the battery between two cathodes. In certain such embodiments, the anode is not placed on current collector but connected to it at one or more of its edges. The anode suitable for use in said "sandwich-like" configuration can have a geometric capacity of above about 5 mAh/cm$^2$, such as, for example, from about 7 to about 10 mAh/cm$^2$. In certain embodiments, the anode further includes SiNWs chemically grown in the non-uniform bulk portion of the substrate.

According to some embodiments, the lithium ion battery according to the principles of the present invention is packed in a prismatic cell, pouch cell, cylinder cell or coin cell configuration.

As used herein and in the appended claims the singular forms "a", "an," and "the" include plural references unless the content clearly dictates otherwise. Thus, for example, reference to "an organic coating" includes a plurality of such organic coatings and equivalents thereof known to those skilled in the art, and so forth. It should be noted that the term "and" or the term "or" is generally employed in its sense including "and/or" unless the content clearly dictates otherwise.

As used herein, the term "about", when referring to a measurable value such as an amount, a temporal duration, and the like, is meant to encompass variations of +/−20%, more preferably +/−5%, even more preferably +/−1%, and still more preferably +/−0.1% from the specified value, as such variations are appropriate to perform the disclosed methods.

The term "plurality," as used herein, means two or more.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1—Anode and Battery Fabrication

SiNWs Growth on the Carbon-Based Substrate:

TABLE 1

SiNWs anodes having various loadings and different substrates.

| substrate | Si loading (mg/cm$^2$) | SiNWs modification | cells built of samples | cell name |
|---|---|---|---|---|
| Freudenberg | 1.08 | | 2 | FRD1, FRD2 |
| SGL | 1.056 | | 2 | SGL1, SGL2 |
| Freudenberg | 0.11 | | 2 | FRDN1, FRDN2 |
| SGL | 0.46 | | 2 | SGLN1, SGLN2 |
| Freudenberg | 0.24 | | 2 | FRDS1, FRDS2 |
| SGL | 0.17 | | 2 | SGLS1, SGLS2 |
| SGL | 0.23 | | — | — |
| SGL | 0.36 | | — | — |
| Freudenberg | 0.59 | | 3 | FRDS3, FRDS4, FRDS5 |
| Freudenberg | 0.62 | | — | — |
| SGL | 1.63 | | — | — |
| SGL | 0.95 | | 3 | SGLS3, SGLS4, SGLS5 |

TABLE 1-continued

SiNWs anodes having various loadings and different substrates.

| substrate | Si loading (mg/cm$^2$) | SiNWs modification | cells built of samples | cell name |
|---|---|---|---|---|
| SGL | 1.92 | | 3 | SGLS6, SGLS7, SGLS8 |
| Freudenberg | 3.46 | | — | — |
| SGL | 5.16 | | — | — |
| Freudenberg | 7.88 | | 2 | FRDS6, FRDS7 |
| SGL | 4.7 | | 2 | SGLS9, SGLS10 |
| Freudenberg | 2.63 | | — | — |
| SGL | 2.87 | | — | — |
| Freudenberg | 1.88 | | 1 vs. Li, 1 vs. LFP | FRDS8, FRDF1 |
| SGL | 1.55 | | 1 vs. Li, 1 vs. LFP | SGLS11, SGLF1 |
| Freudenberg | 0.96 | | — | — |
| SGL | 0.94 | | — | — |
| Freudenberg | 0.48 | | — | — |
| SGL | 2.30 | | — | — |
| Freudenberg | 2.28 | | — | — |
| Freudenberg | 1.98 | Boron doping 1:8000 | 2 | FRDS11, FRDS12 |
| Freudenberg | 1.88 | Boron doping 1:1000 | 2 | FRDS13, FRDS14 |
| Freudenberg | 1.39 | Boron doping 1:8000, carbon coating | 1 | FRDC3 |
| Freudenberg | 1.39 | Boron doping 1:8000, carbon coating | 1 | FRDC4 |
| Freudenberg | 1.75 | Boron doping 1:1000, carbon coating | 1 | FRDC5 |
| SGL | 0.42 | Alumina coating | 1 | SGLA2 |
| SGL | 0.97 | Alumina coating | 1 | SGLA3 |
| SGL | 0.97 | Alumina coating | 1 | SGLA4 |
| SGL | 0.99 | — | 1 | SGLS14 |
| Freudenberg | 0.5 | LiF coating | 1 | FRDL1 |

Silicon nanowires were grown by the CVD-VLS method on the carbon fibers-based three-dimensional conductive networks substrates. The substrates included 160 μm thick SGL25AA carbon paper substrate (FIG. 1C) and 150 μm thick Freudenberg carbon non-woven cloth substrate (FIG. 1D). The fibers thickness of the SGL25A carbon substrate was about 7 microns. The fibers thickness of the Freudenberg carbon non-woven cloth was about 10 microns. The SiNWs were grown in a three dimensional configuration, on the surface and inside the substrate, throughout the whole volume thereof. First, the carbon fiber conductive networks substrate was treated by oxygen plasma (400 mTorr, 100 watts) for 10 minutes, in order to modify and improve its surface wetting properties, followed by the adsorption of poly-L-lysine at room temperature for 60 min. The positively charged polylysine layer serves as an electrostatic adhesion agent for the subsequent deposition of gold nanoparticles. Following the substrate pretreatment step, the substrate was immersed in an aqueous solution of Au nanoparticles (AuNPs) having a diameter of 20-80 nm, for 15 minutes.

SiNWs growth was carried out in CVD reactor via the VLS mechanism at 460-550° C. and 25-50 Torr, using $SiH_4$ gas as precursor (flow rate 5 sccm), $B_2H_6$ (flow rate 6.25 sccm) and diluted with Ar gas carrier (flow rate 10 sccm) for a period of 30-120 minutes. CVD was carried out for different periods of time in order to obtain anodes having various mass loadings of Si, which are summarized in Table 1.

SiNWs Coating by a Conducting Coating:

Some of the manufactured anodes were subjected to the formation of a Li ion conducting coating or a carbon coating on the SiNWs, as presented in FIG. 1.

Solid electrolyte film was formed by first coating the SiNWs by a thin layer of a non-aqueous solution (NAS) of $LiNO_3$ or $Li_2CO_3$. Following the coating, the non-aqueous solvent was evaporated at a temperature of 100 to 200° C. to precipitate the lithium salt. Further, the coated anode was heat treated at a temperature of 200 to 700° C. to decompose the $LiNO_3$, or the $Li_2CO_3$ salt into its decomposition product $Li_2O$ or possibly $Li_3N$.

Alumina coating was formed by an ALD (atomic layer deposition) process as follows:
- 10-200 cycles of TMA (trimethyl aluminum)/Water.
- deposition temperature 80-150 degrees Celsius.
- Trimethyl Alumminum precursor.
- Water precursor.
- TMA pulse length 0.015-0.3 seconds.
- Water pulse length 0.015-0.3 seconds.
- Purging duration between pulses 30 seconds-2 minutes.

Carbon coating was prepared by:
1. CVD using methane gas precursor and hydrogen gas as carrier at a temperature of 850° C. at a total pressure of 1-50 torr, and
2. Pyrolysis at 500 to 1000° C. of a saccharide or polymer precursor. The sucrose precursor was sucrose, which was dissolved in a solution of water and ethanol and pyrolized at 750° C. The polymers included PMMA and PN.

Some of the SiNWs were doped by boron during the CVD growth step

Coin Cell Fabrication:

The fabricated anodes were cut into about 1 cm$^2$ square pieces, and a drop of an ink made of Shawinigan Black® carbon and poly (styrene-co-butadiene) (Sigma-Aldrich) mixture in toluene (9:1 w/w) was applied to one side of the sheet in order to improve the electric contact to the stainless steel current collector. The carbon loading was about 0.5 mg/cm$^2$. The electrodes were dried in vacuum for 24 h at 50° C., and 2 h at 100° C.

CR2032 coin cells were assembled inside a glove-box ($O_2$ and $H_2O<0.1$ ppm) filled with ultra-high purified argon. The coin cells were comprised of the SiNWs-based anode, a 2400 Celgard separator and a lithium foil. A about 2 to 3 drops of electrolyte were applied to the separator and to the SiNWs-based anode. In all tests the electrolyte was 1M $LiPF_6EC:DEC$ (1:1) with 2% vinylene carbonate (VC) to which, 15% by volume, fluoroethylene carbonate (FEC) (Solvay-Fluor) was added. The battery-grade electrolyte was purchased from Solvionic. Lithium metal foil was purchased from Rockwood Lithium Inc.

Example 2—Morphology Characterization of the Anodes

The morphology of the samples was examined by using several techniques, including Scanning Electron Microscopy (SEM) on Quanta 200FEG ESEM equipped with an energy dispersive X-ray spectrometer), Transmission Electron Microscopy (TEM) on FEG-HRTEM, Fei Tecnai F20, X-ray diffraction (XRD) on Bruker, D8 Discovery, Transmission Electron Microscopy (TEM) and Environmental Scanning Electron Microscopy (ESEM).

Figure 2A:
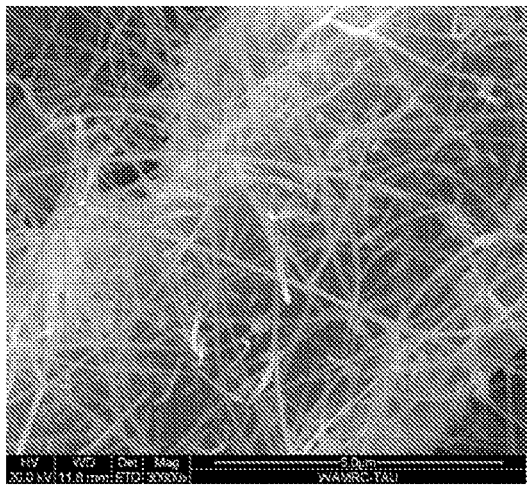
FIGS. 2A-2J: SEM and Transmission electron microscopy (TEM) micrographs of the SiNWs anode.
Figure 2B:
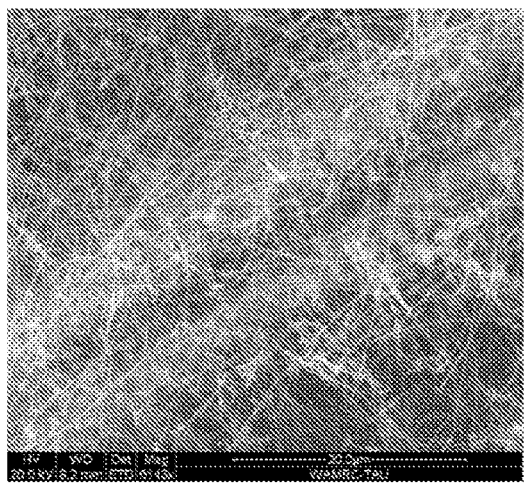
Figure 2C:
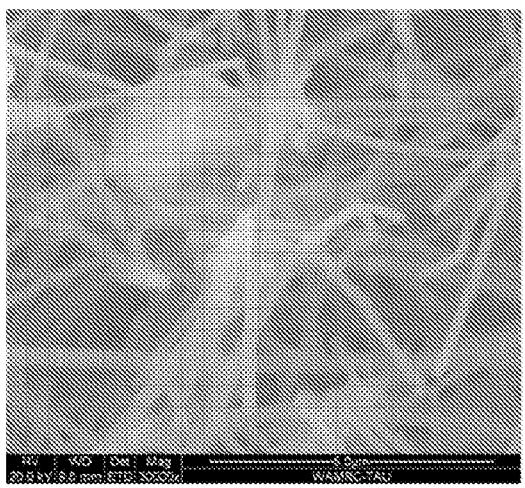
Figure 2D:
Figure 2E:
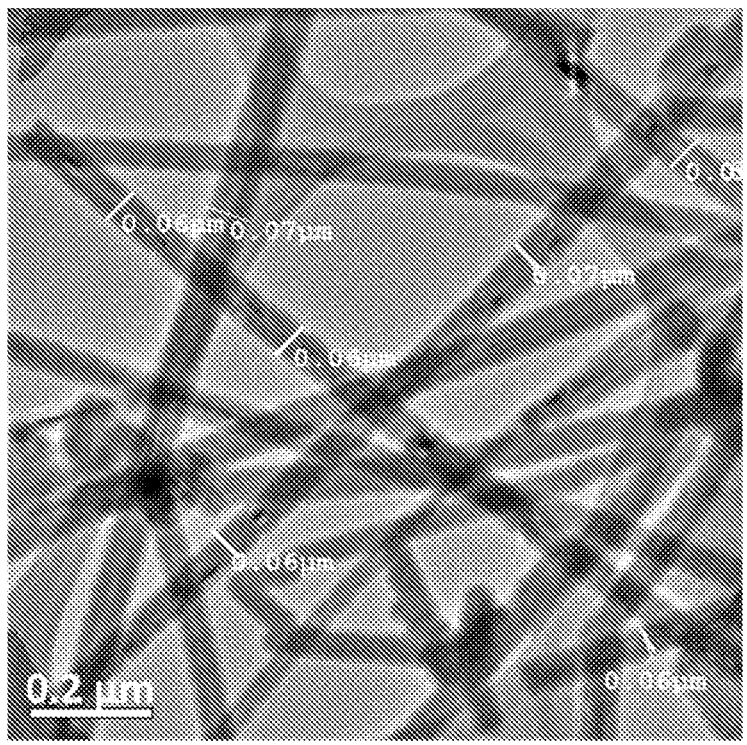
Figure 2F:
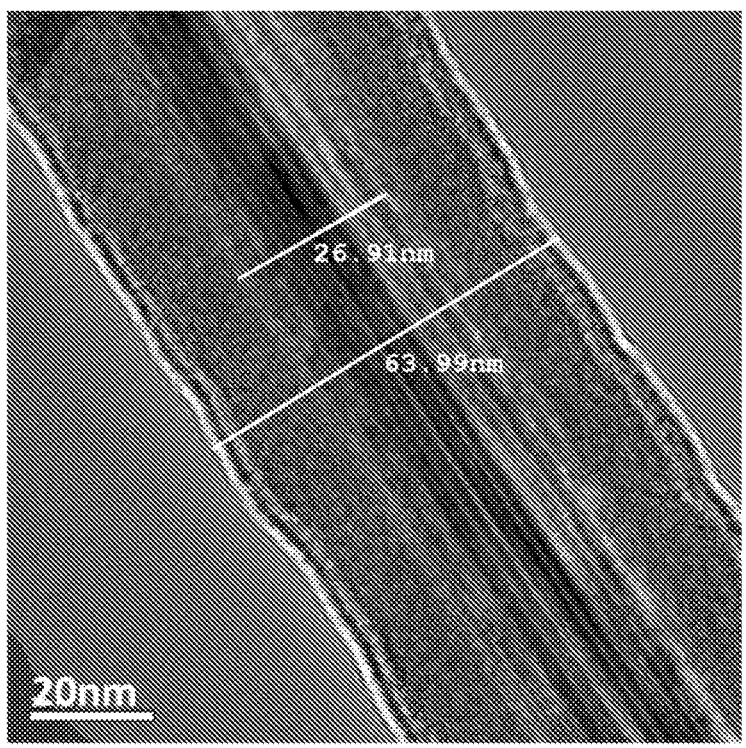
Figure 2G:
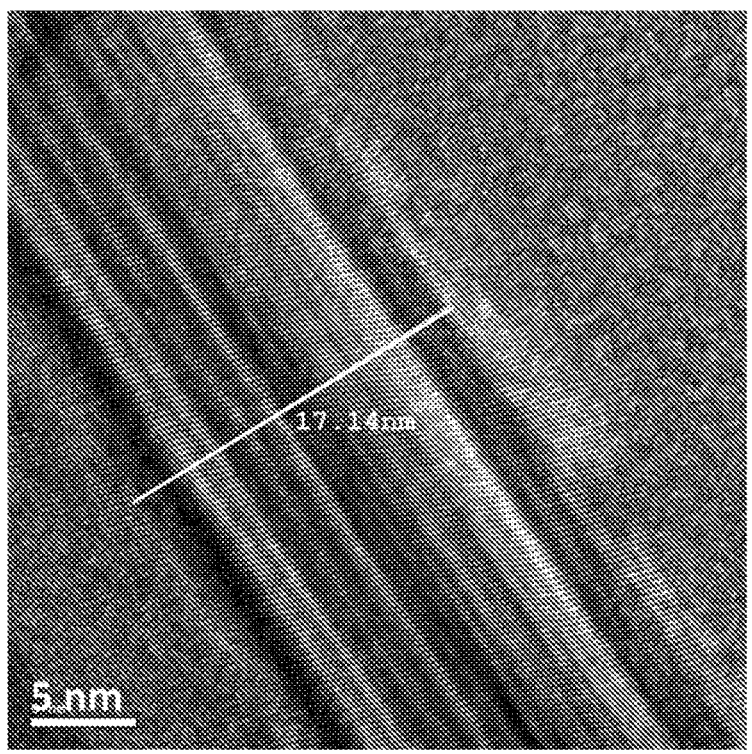
Figure 2H:
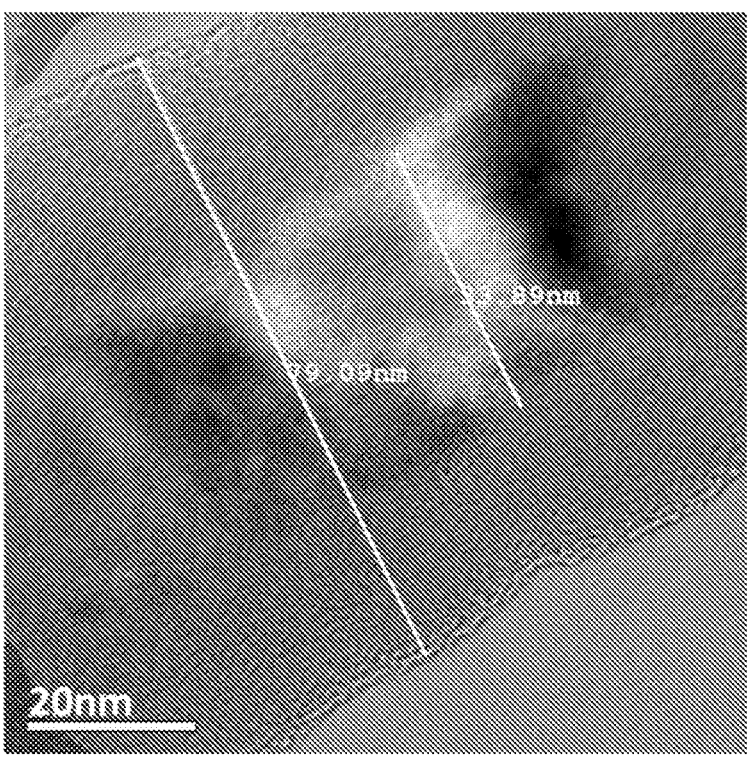

FIGS. 2A-2C show SEM micrographs of the one of the surfaces of the anodes, including SiNWs chemically grown on the fibrous carbon substrate (FIG. 1C), manufactured according to the procedure described in Example 1, having various Si loadings (0.36, 1.92 and 4.7 $mgSi/cm^2$, respectively), while FIG. 2D represents a SEM micrograph of the 4.7 $mgSi/cm^2$ anode cross-section. It can be seen that SiNWs are present both on the surface of the anode and in the bulk portion thereof, thus significantly increasing Si loading and geometric capacity of the anode.

FIGS. 2E-2J show low and high-magnification TEM micrographs of SiNWs, prepared according to the procedure described in Example 1, wherein the SiNWs have a crystalline core and amorphous shell. FIGS. 4E-4H show the SiNWs grown at 25 Torr for 30 min. The thickness of the SiNWs ranges from about 60 nm to about 80 nm, wherein the average core diameter is about 30 nm.

Figure 2I:
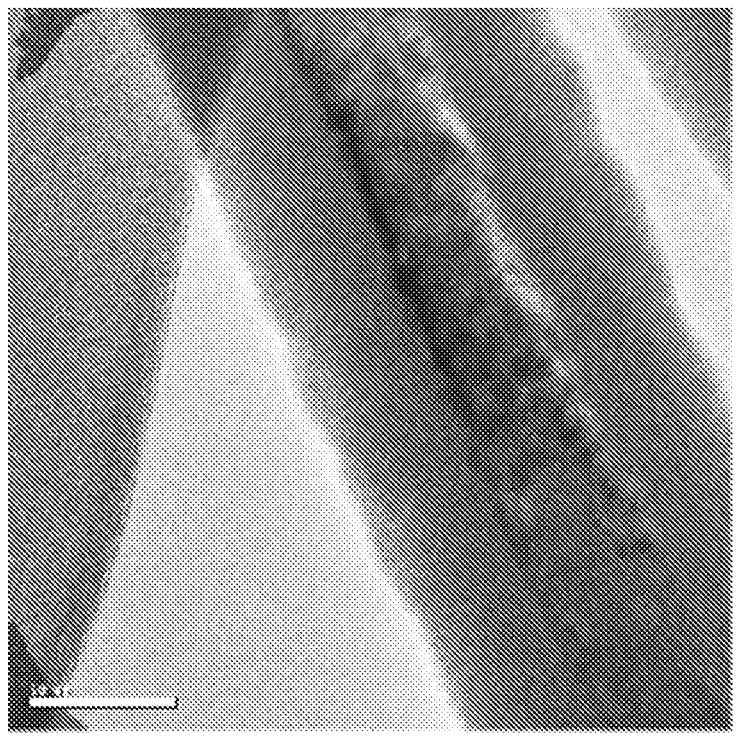
Figure 2J:
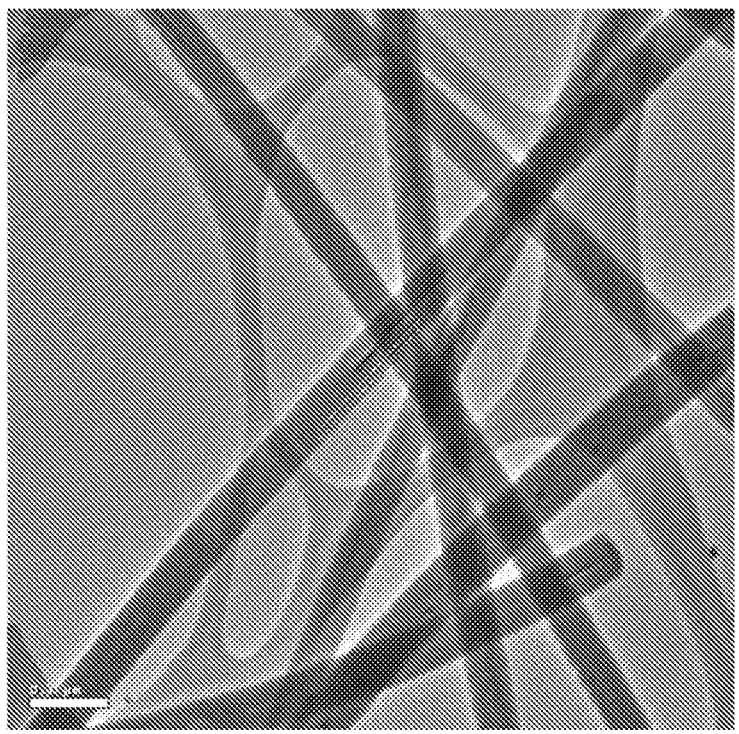

FIG. 2I shows a TEM image of a single nanowire with a crystalline core and an amorphous shell displaying a total thickness of about 120 nm and a core diameter of about 34 nm Said SiNW was grown at 25 Torr for 60 min. FIG. 2J shows low-magnification TEM image of nanowires with a crystalline core and an amorphous shell, displaying a total thickness of about 200 nm and a core thickness of about 32 nm. Said SiNWs were grown at 25 Torr for 120 min.

A representative high-resolution TEM micrograph shows that the nanowires consist of a highly crystalline core with visible Si(111) lattice fringes with a diameter of 30-42 nm surrounded by an thick amorphous silicon shell, resulting in a total nanowire thickness of about 60-250 nm, depending on the growth time. Notably, this crystalline-amorphous core-shell radial heterostructures, formed on the carbon matrix, were grown in a single CVD step, as described in Example 1. In can be seen from the TEM images that the thickness of the amorphous silicon shell, formed by the pyrolitic deposition of silicon on the growing crystalline core, depends on the growth time. Longer growth times lead to longer wires, as well as thicker amorphous shells. Importantly, the diameter of the crystalline cores remained between 30 and 40 nm (being close to the average diameter of AuNPs used as catalysts). This single-step approach for the synthesis of core-shell nanowires of controlled dimensions and morphology allows for the simple fine-tuning over the silicon loadings of the resulting anodes.

The higher loading anode (4.7 $mgSi/cm^2$) was further tested by Energy-dispersive X-ray spectroscopy (EDS), revealing that both the crystalline core and amorphous shell of the SiNWs are composed of 100% Si, as presented in Table 2.

TABLE 2

| EDS atomic composition evaluation of the SiNWs | |
|---|---|
| Element | % atomic |
| C K | 0 |
| O K | 0 |
| F K | 0 |
| Si K | 100 |
| P K | 0 |

Figure 5:
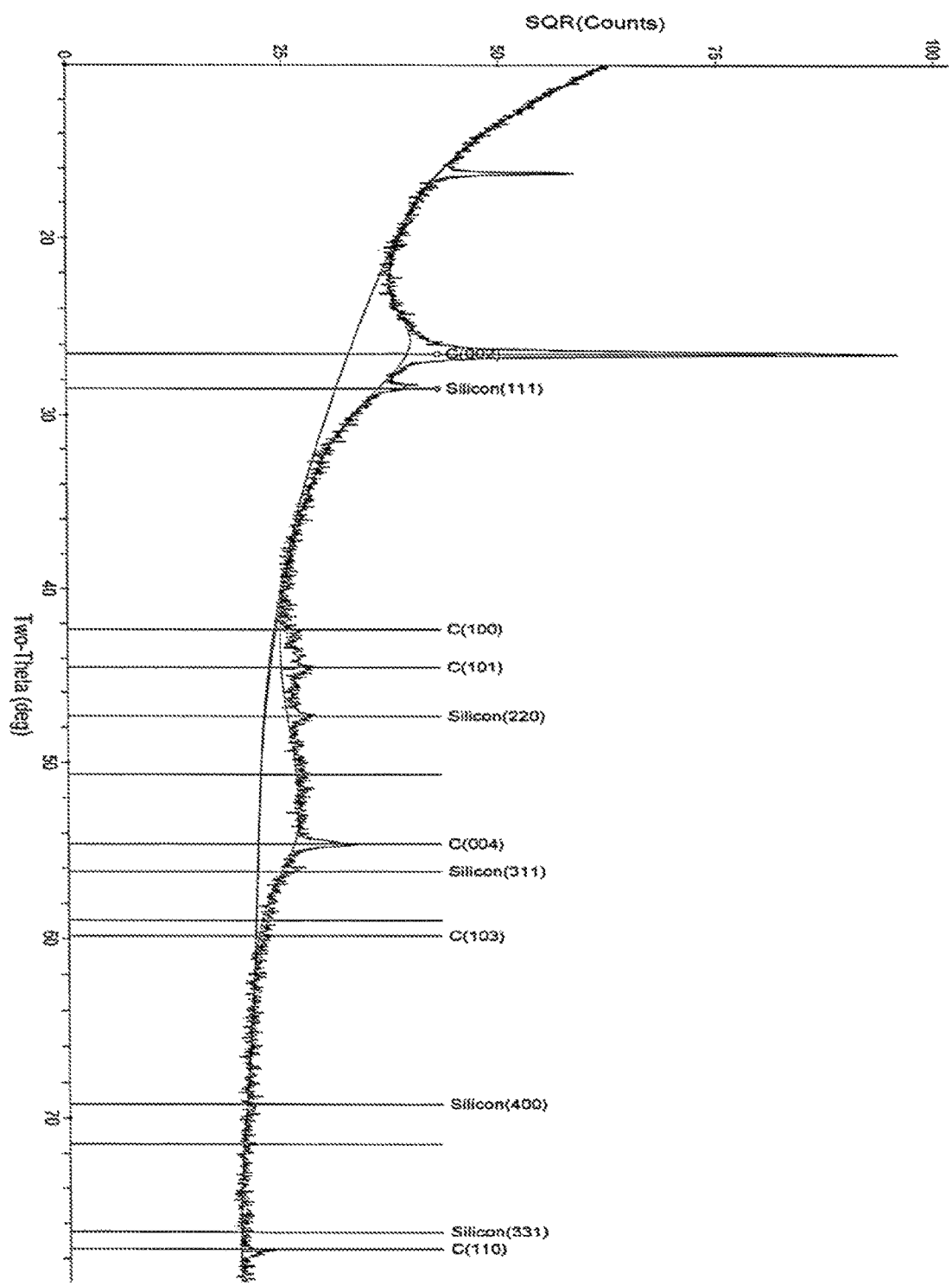
FIG. 5: An XRD spectra of SiNWs anode on SGL AA25, 1.92 mg/cm$^2$ SiNWs loading.

FIG. 5 shows an XRD spectrum of the anode having a 1.92 $mg/cm^2$ Si loading on the SGL carbon paper. According to the XRD spectrum, 1.2% of the entire sample is comprised of crystalline silicon, whereas silicon makes up about 30% of the total weight of the sample. It can be therefore concluded that more than 90% of the silicon in the sample is amorphous.

Figure 6A:
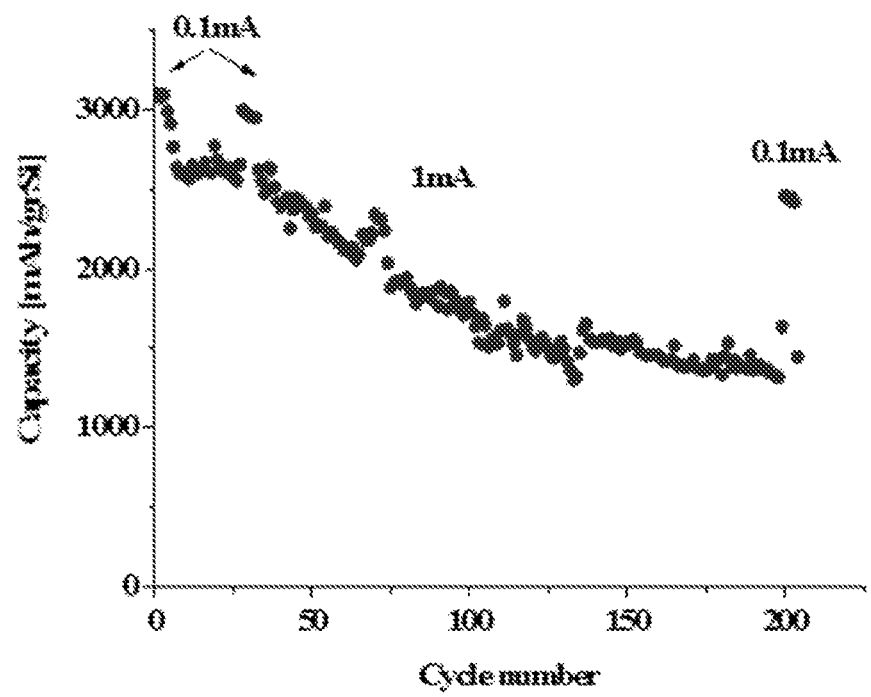
FIGS. 6A-6C.
Figure 6B:
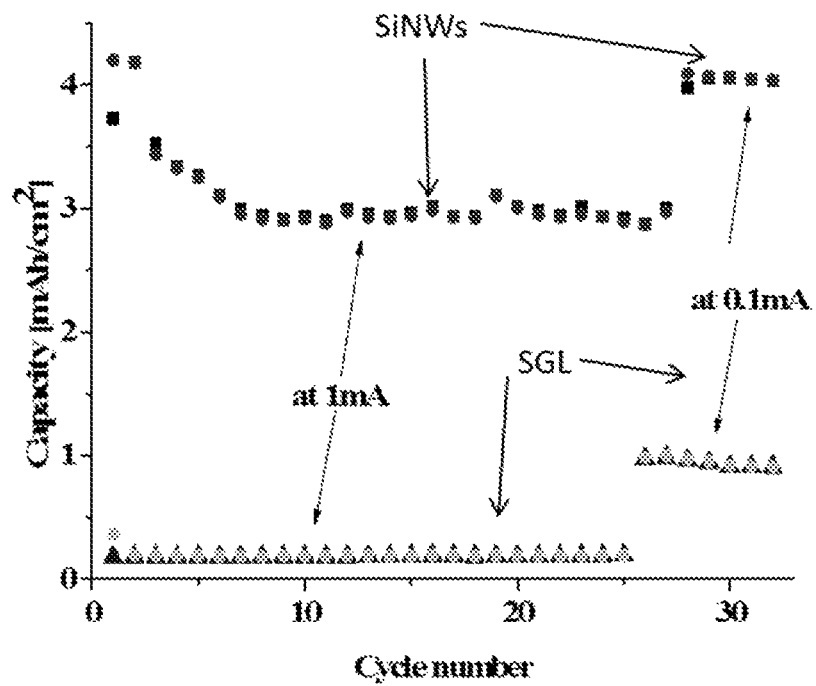
Figure 6C:
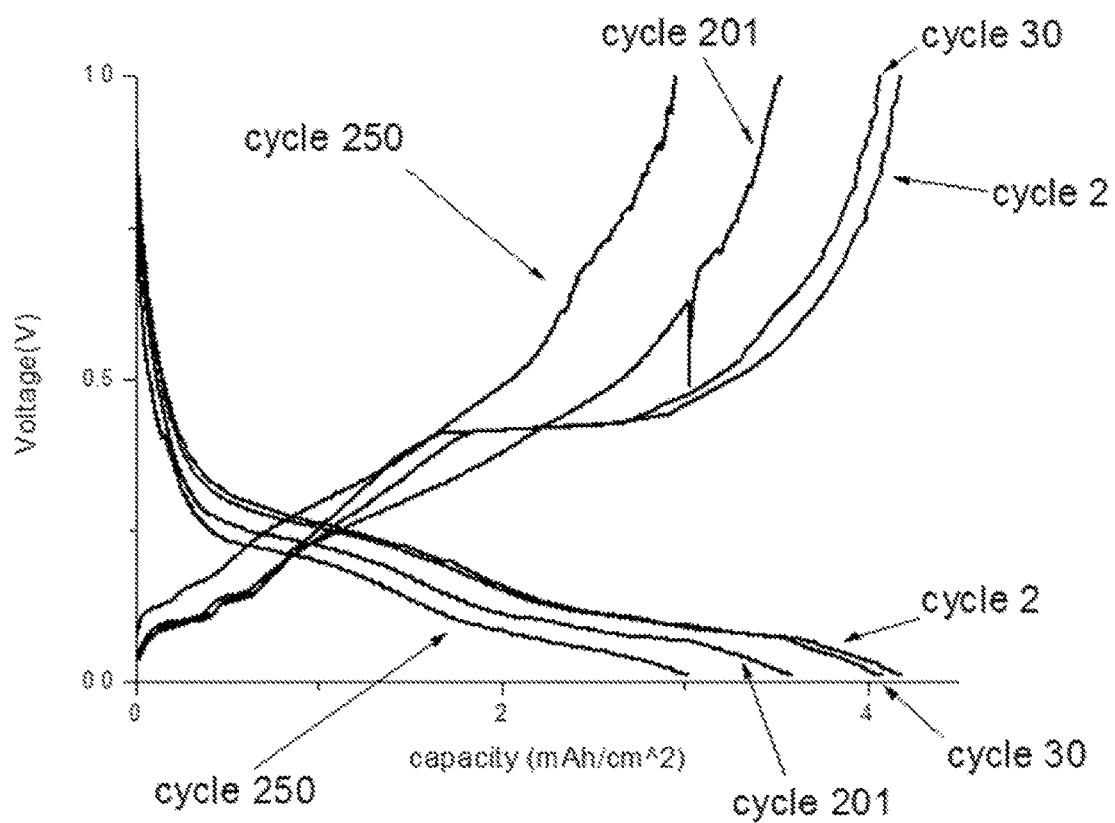

Example 3—Lithiation and De-Lithiation Capacity and Faradaic Efficiency of the Anodes Several SiNW-SGL anodes, with Si loadings in the range of 0.36 to 4.7 $mgSi/cm^2$ were tested in SiNW/Li coin cells. The cells were tested at 30° C., with the use of an Arbin BT-2000 battery tester. For aging tests, the cells were cycled at a constant current of 1 mA, in the range of 0.01-1V. At the beginning of the tests, and after 100 and/or 200 cycles, the cells were cycled for a few cycles at 0.1 mA (FIG. 6A). This was done in order to determine the maximum (full) capacity of the SiNWs-based anode. The anodes contain both carbon (in the SGL paper) and SiNW. In order to calculate the specific capacity of each component, parallel cycle life tests of only the SGL paper were run. FIG. 6B depicts both the SiNWs-based anode capacity, and the SGL electrode capacity versus the cycle number and FIG. 6C shows the SiNWs-based anode capacity. For anodes having 1.06 $mgSi/cm^2$ loading, at high current density of 1 $mA/cm^2$, the SGL paper capacity is one order of magnitude lower while, at 0.1 $mA/cm^2$ the SGL paper provides about 20% of the anode capacity. The initial de-lithiation capacity for a 1.06 $mgSi/cm^2$ anode is 3.7 $mAh/cm^2$ (FIG. 6B), and drops to about 3 $mAh/cm^2$ after 7 cycles, stabilizing at this level for tens of subsequent cycles. At cycle 27 the current density was reduced to ~0.1 $mA/cm^2$, causing a capacity rise to about 4 $mAh/cm^2$. At this point it is important to note that this value, 4 $mAh/cm^2$, is one of the highest values reported for silicon-based anodes of any kind, and in particular for SiNWs-based anodes.

FIG. 6A depicts a plot of the net silicon de-lithiation capacity (excluding the carbon paper capacity) as a function of cycle number. The initial capacity, measured at 1 $mA/cm^2$, is 3100 mAh/gSi. It drops quickly, after 7 cycles, to 2650 mAh/gSi, and further decreases slowly to 1350 mAh/gSi after 200 cycles. In order to find out whether the major reason for capacity loss is due to disintegration, pulverization (or contact loss) of the SiNWs, or an increase of the cell impedance, the cells were cycled for a few cycles at a low rate of 0.1 mA, both at the beginning and at the end of the tests (FIG. 6A). The capacity loss of three SiNW-SGL anodes, two having capacity of about 4 $mAh/cm^2$ and one with extremely high capacity of 8.63 mAh/cm$^2$, are summarized in Table 3. The capacity loss of the SiNW-SGL anodes (measured at 0.1 mA) is between 3 to 10% after 100 cycles, and between 16 to 27% after 200 cycles, i.e. about 0.1% per cycle and close to that of the common graphite anode. The loss of the heavily-loaded anode (8.63 mAh/cm$^2$) is larger, 39% after 100 cycles and 63% after 200 cycles. These results clearly show that, at least for the 4 mAh/cm$^2$ anodes, the major reason for the capacity loss is an increase of cell impedance and not disintegration or pulverization of the SiNWs.

So far over 300 cycles were demonstrated and some cells are still running. The average faradaic efficiency, measured for 200 cycles, for three 4 mAh/cm$^2$ samples, is 100, 99.2 and 98%, and that measured for the very heavily loaded 8.63 Ah/cm$^2$ sample is 92.3% (Table 3). Faradaic efficiencies close to 100%, for the 4 mAh/cm$^2$ samples, are the highest values measured for such anodes, as well as of extremely large applicative importance. The capacity loss for the 4 mAh/cm$^2$ anodes, after 200 cycles, was on average 21% (Table 3). Thus, this is the maximum amount of SiNWs that physically degraded (pulverized) or lost contact to the current collector during 200 cycles.

Example 5—Irreversible Capacity of the Anodes

Figure 8A:
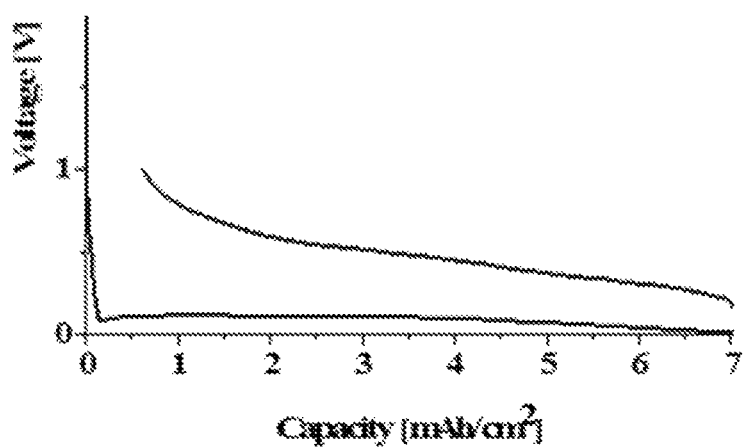
FIGS. 8A-8C.
Figure 8B:
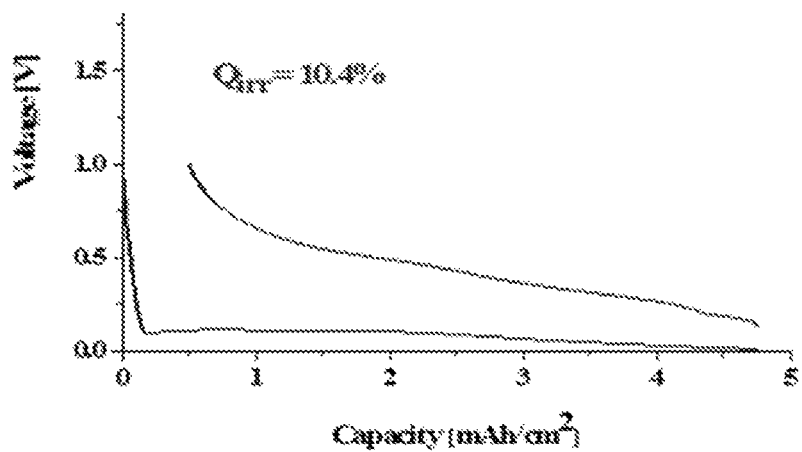
Figure 8C:
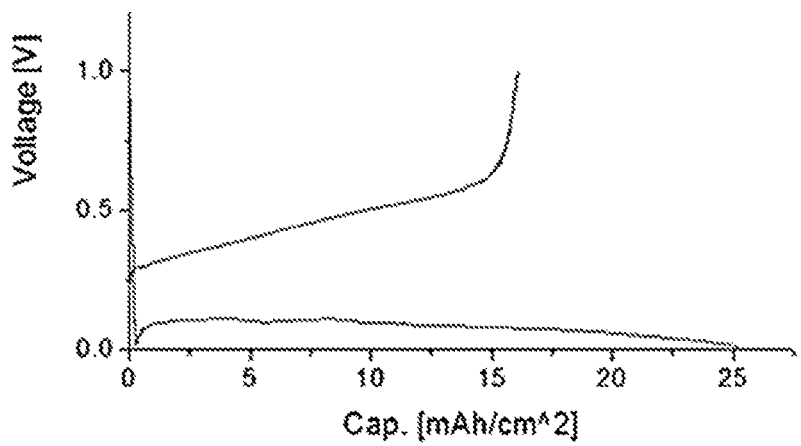

Another very important property of silicon anodes is the value of the irreversible capacity loss at the first intercalation, which is consumed for the formation of the SEI on the anode (E. Peled, J. Electrochem. Soc. 126, 2047-2051 (1979)). Most publications on SiNWs-based anodes display very high irreversible capacity values, over 30%. One of the significant achievements of the present invention is a very low irreversible capacity loss of the SiNWs-based anode, lower than 10%, as can be seen in FIGS. 8A and 8B. These figures depict the first lithiation and de-lithiation curves for 0.95 and 1.92 mgSi/cm$^2$ SiNW-based anodes, showing a 8.6% 10.4% loss, respectively. These values are close to the irreversible capacity loss of common lithium ion batteries using a graphite anode. FIG. 8C depicts the first lithiation and de-lithiation curves for a 4.46 mgSi/cm$^2$ SiNW-based anode, having the irreversible capacity of about 38%.

Example 6—Charge and Discharge Rate Capability of the Anodes

Additionally, the three-dimensional SiNWs-based anodes of the present invention provide very high rate capabilities,

TABLE 3

Capacity and Faradaic efficiency of the anodes

| Cell code | Capacity at the initial cycles | | | capacity loss up to mid-life | | capacity loss up to final cycles | | Faradaic efficiency |
|---|---|---|---|---|---|---|---|---|
| | cycle no. | [mAh/cm$^2$] | [mAh/grSi] | cycle no. | % | cycle no. | % | (%) for all cycles |
| SGL2 | 1-2 | 4.19 | 3088 | 28-32 | 3 | 200-204 | 21 | 100 |
| SGLS3 | 11-13 | 3.78 | 3088 | 101-103 | 10 | 201-203 | 27 | 98 |
| SGLS4 | 11-13 | 4.19 | 3481 | 101-103 | 8.7 | 201-203 | 16 | 99.2 |
| SGLS7 | 11 | 8.63 | 4368 | 101-103 | 39 | 201-203 | 63 | 92.3 |

Example 4—SiNWs Morphology Change During Cycling

Figure 7A:
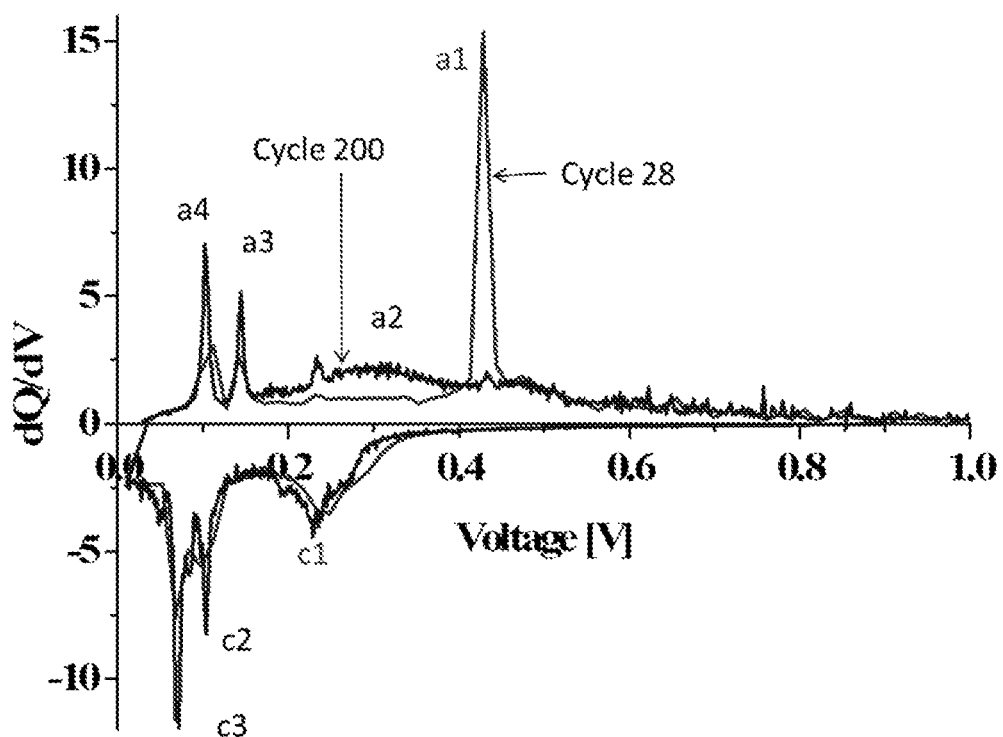
FIGS. 7A-7C.
Figure 7B:
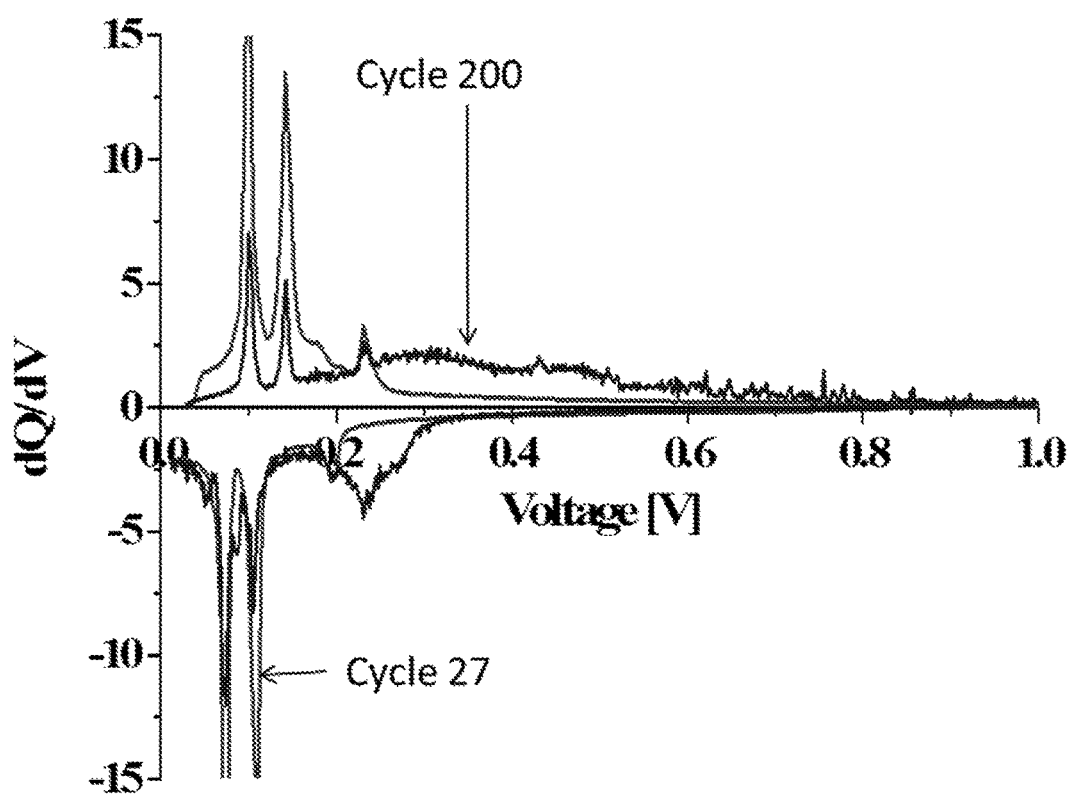
Figure 7C:
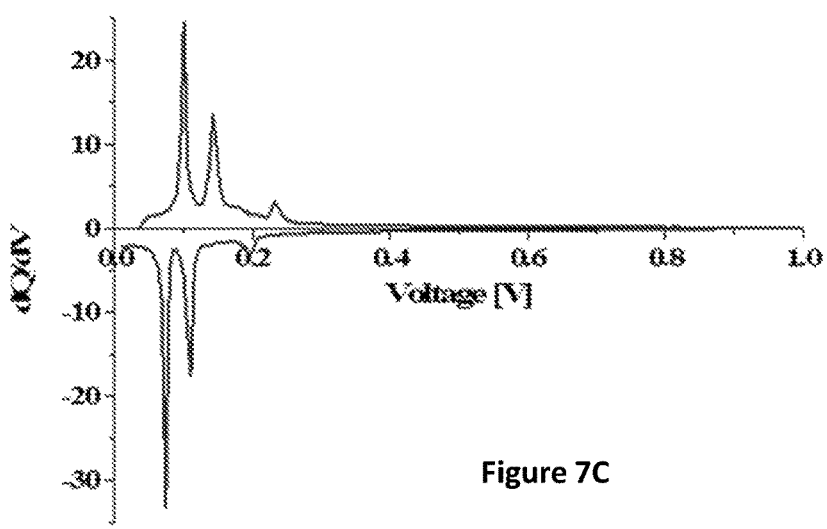
Figure 9:
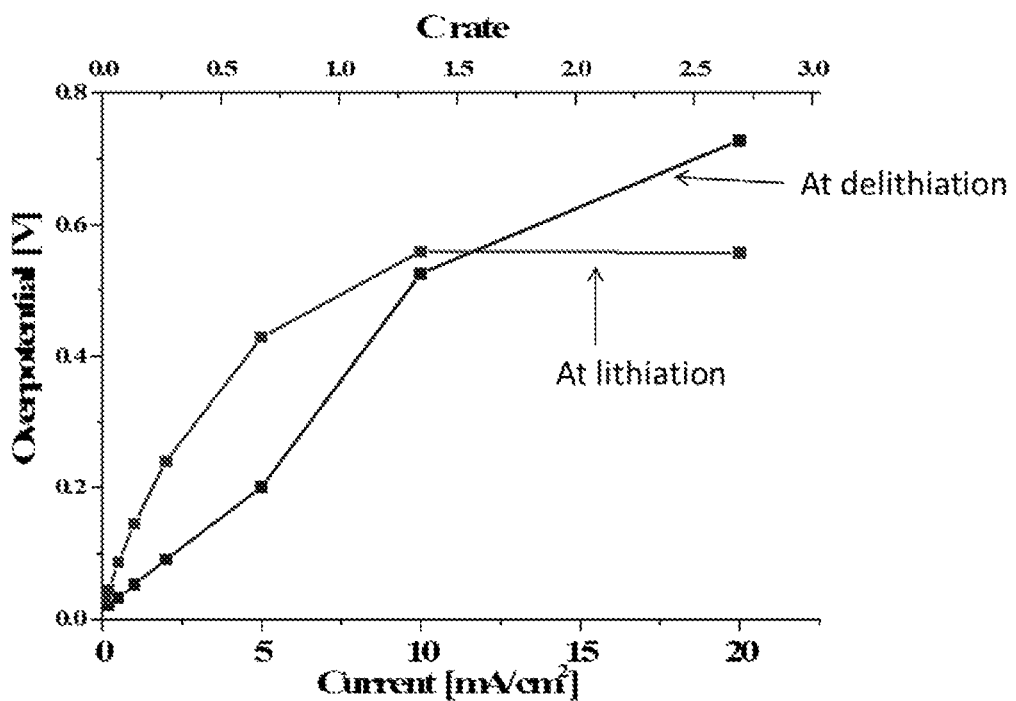
FIG. 9: Polarization curve for anode made of 1.92 mg/cm$^2$ SiNWs, 1 minute pulse de-lithiation and lithiation at different currents.
Figure 10:
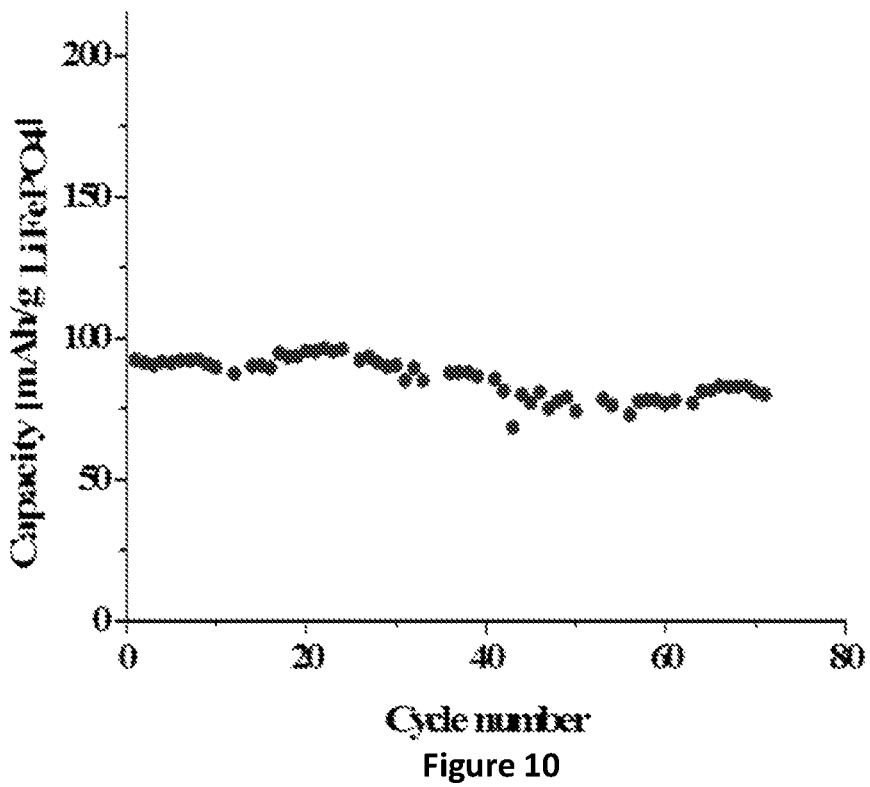
FIG. 10: Capacity—cycle life plot for a battery including: 1.6 mg/cm$^2$ SiNWs anode and LiFePO4 cathode (loading 6 mg/cm$^2$, of which 84% LiFePO4+8% PVDF+8% Carbon C-65), applied current—0.1 mA/cm$^2$ (about C/4), cycling at 30° C.

In order to investigate the effect of cycling on the morphology of the SiNWs, dQ/dV plots were extracted at several low rate cycles (0.1 mA/cm$^2$). A typical behavior is seen in FIG. 7A, where four anodic peaks (a1, a2, a3, a4) and three cathodic peaks (c1, c2, c3) are displayed by a 1 mgSi/cm$^2$ anode at cycle 28. A dQ/dV plot for the SGL carbon substrate (free of SiNWs) is seen in FIG. 7B. The sharp a1 peaks and the broad c1 peak are assigned to the lithiation reaction of SiNWs (c1) and de-lithiation of SiNWs (a1, a2). The as-prepared SiNWs are mostly amorphous (determined from XRD data), and during several cycles, crystalline phase is formed in equilibrium with the amorphous phase as shown by the sharp de-lithiation peak (a1) at 0.425V (FIG. 7A). Peaks a3, a4, c2 and c3 (FIG. 7A) are associated with the de-intercalation and intercalation of lithium into the SGL carbon substrate, as seen in FIG. 7B. After 200 cycles, the carbon SGL peaks become sharper indicating a higher degree of crystallinity (or a faster equilibrium between phases). After 200 cycles, the de-lithiation peak of the SiNWs (a1) almost disappears, reflecting an amorphous state, while the lithiation peak of SiNWs (c1), remains almost unchanged, possibly reflecting a change from amorphous to a partially crystalline state.

uncommon for Si anodes. In FIG. 9, the de-lithiation overpotential was measured as a function of current density and C rate values for a 1.92 mgSi/cm$^2$ anode (using the coin cell). At 5 mA/cm$^2$ (about 0.7C), at 10 mA/cm$^2$ (about 1.3C) and at 20 mA/cm$^2$ (about 2.7C) the over-voltage was 0.2, 0.55 and 0.72V, respectively. A 2.7C value means that the battery, assuming a high rate cathode, can be discharged at 22 minutes only. These overvoltage values are acceptable for lithium ion battery applications. The lithiation overvoltage value is, up to 10 mA/cm$^2$, similar to that of the de-lithiation process (FIG. 9) indicating a potential for high rate (about 1.3C) charge. A full cell consisting of a SiNWs-based anode and a LiFePO$_4$ cathode was assembled and tested (FIG. 10), where no efforts were made to balance the anode and cathode capacity. The cell was cycled at C/4 for over 70 cycles, displaying only minor capacity loss. It delivered 90 mAh/g of LiFePO$_4$, which is about 70% of its theoretical capacity. Further balancing of the anode and cathode capacity should yield even better performances.

Example 7—SiNWs Modification

Effect of boron doping and application of conducting coating to the SiNWs was investigated.

Figure 11A:
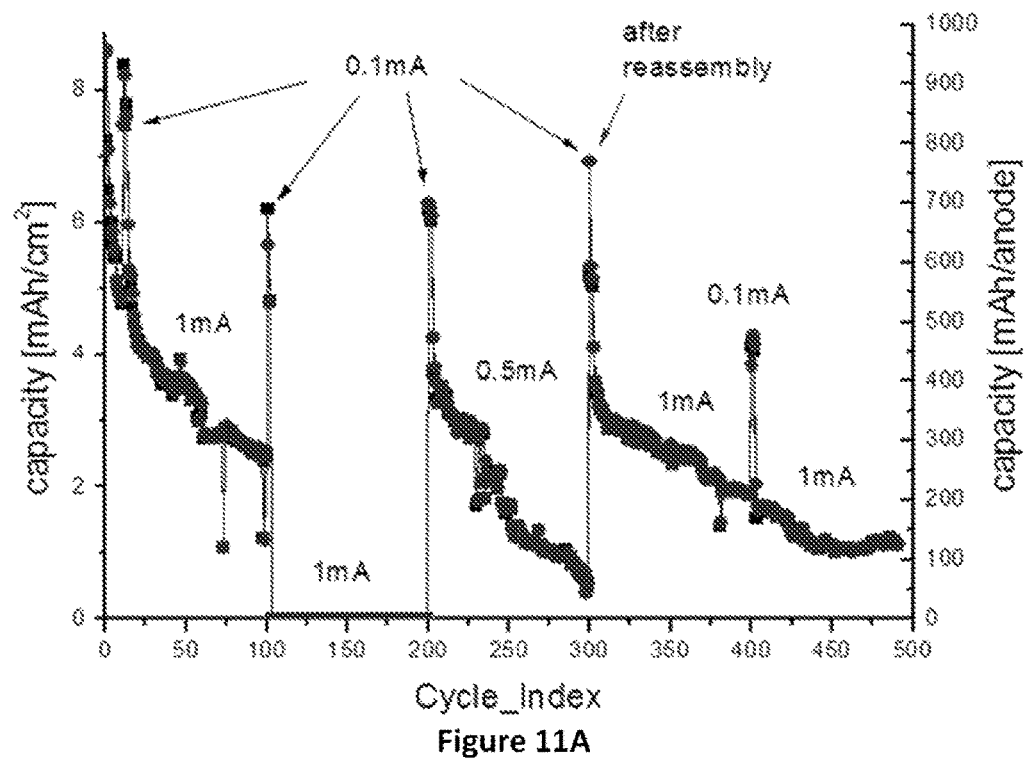
FIGS. 11A-11B: Effect of boron doping of the SiNWs on (■)—charge capacity, (●)—discharge capacity.
Figure 11B:
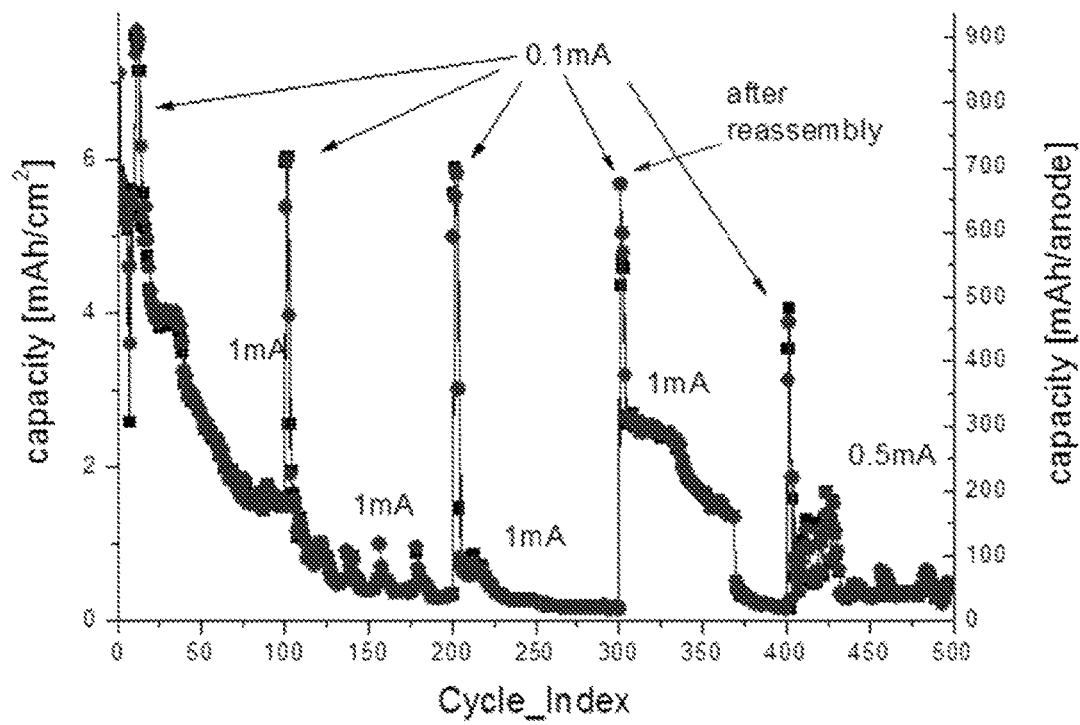

Cells FRDS11 and FRDS14 included SiNWs doped with boron, wherein the B:Si ratio in FRDS11 cell was 1:8000 and in FRDS14 was 1:1000. FIGS. 11A and 11B show geometric capacities of said cells cycled at 0.1 mA-1 mA in the voltage range of 1-0.05V. The average Faradaic efficiency of the anodes of cells FRDS11 and FRDS14 was 99.26% and 99.48% respectively. Irreversible capacity of the anodes of cells FRDS11 and FRDS14 was 15.8% and 18%, respectively. The lower doping of SiNWs provided higher charge and discharge capacities and Faradaic efficiency and lower irreversible capacity.

Figure 12A:
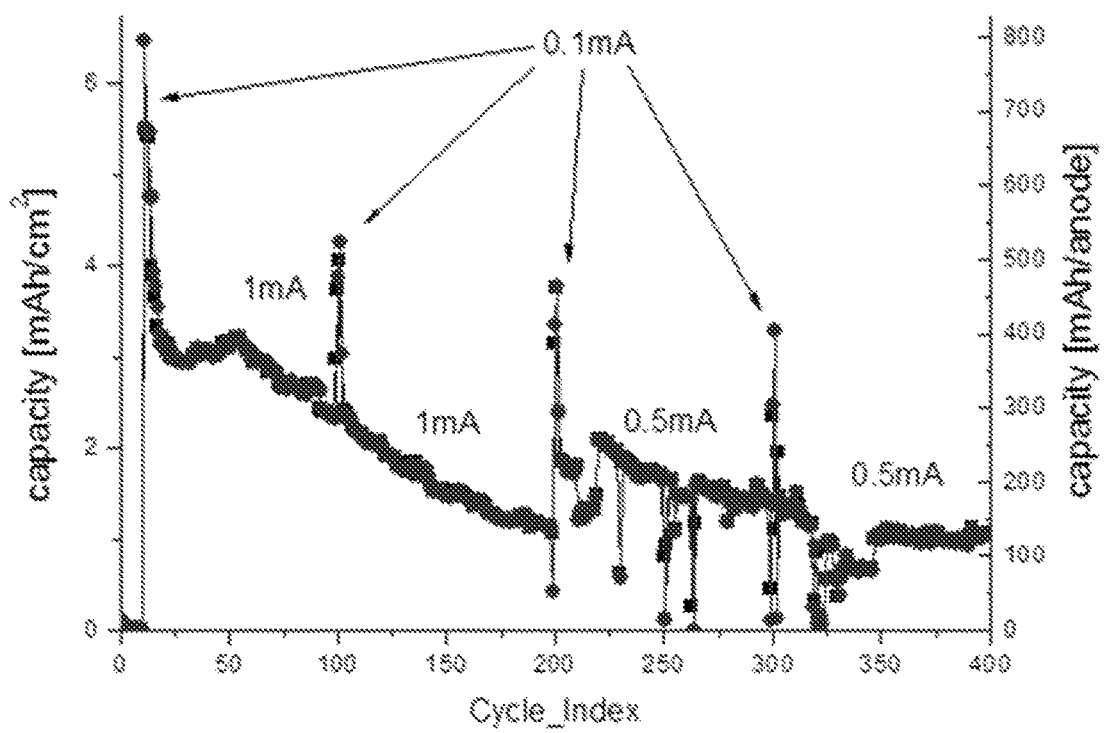
FIGS. 12A-12C: Effect of carbon coating of the SiNWs on (■)—charge capacity, (●)—discharge capacity.
Figure 12B:
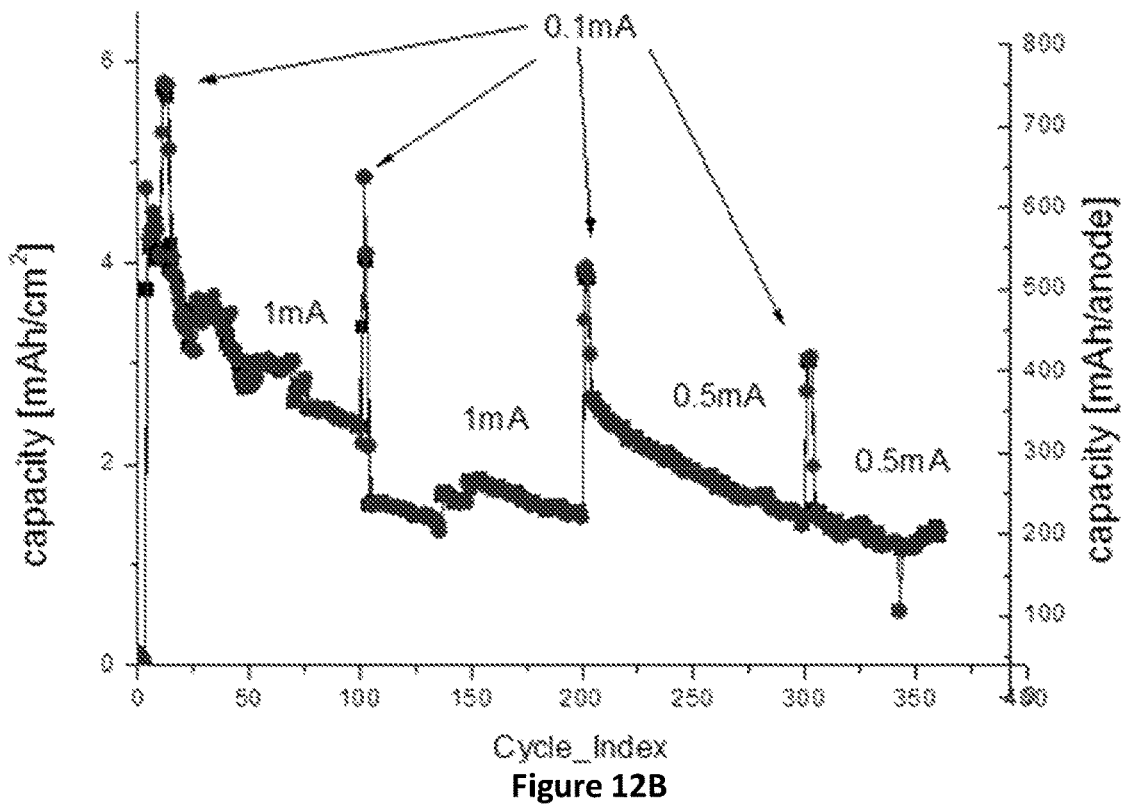
Figure 12C:
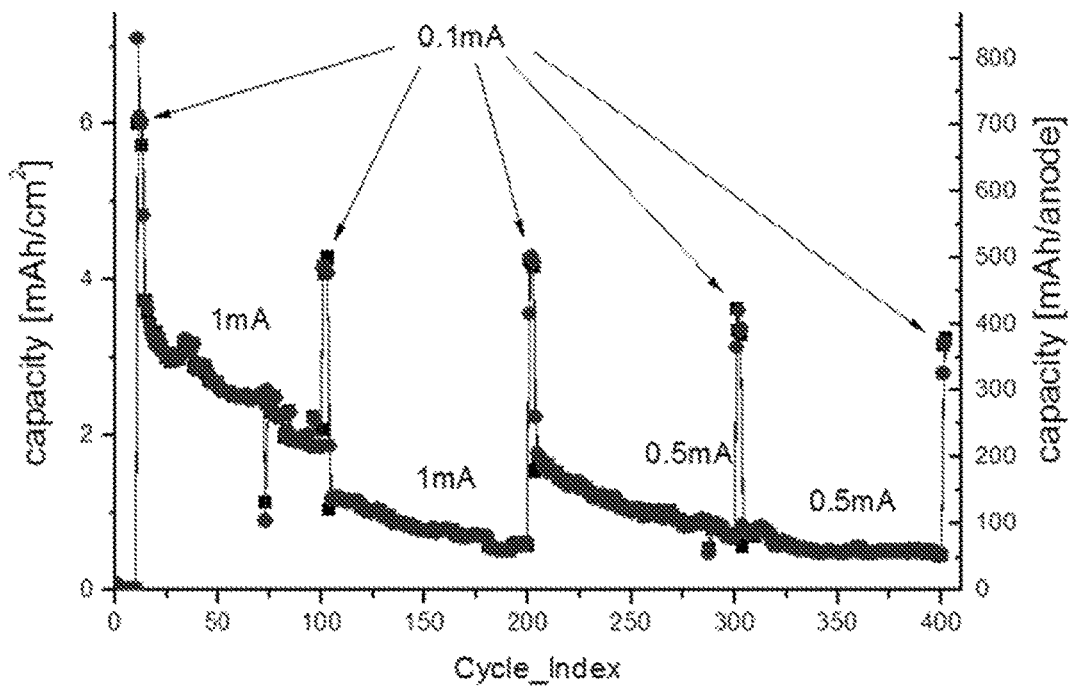

Cells FRDC3, FRDC4 and FRDS14 included SiNWs doped with boron and coated with a carbon coating, applied to the SiNWs by pyrolysis of sucrose. Cells FRDC3 and FRDC4 included doped SiNWs with the B:Si ratio of 1:8000 and cell FRDS14 included SiNWs with the B:Si ratio 1:1000. FIGS. 12A-12C show geometric capacities of said cells cycled at 0.1 mA-1 mA in the voltage range of 1-0.05V. The average Faradaic efficiency of the anodes of cells FRDC3, FRDC4 and FRDS14 was 99.87% (calculated starting from cycle 11), 100.03% (calculated starting from cycle 4) and 99.77% (calculated starting from cycle 11), respectively. It can be clearly seen that the carbon coating has a positive effect on the cycle-life stability of the cell, regardless of the doping level.

Figure 13:
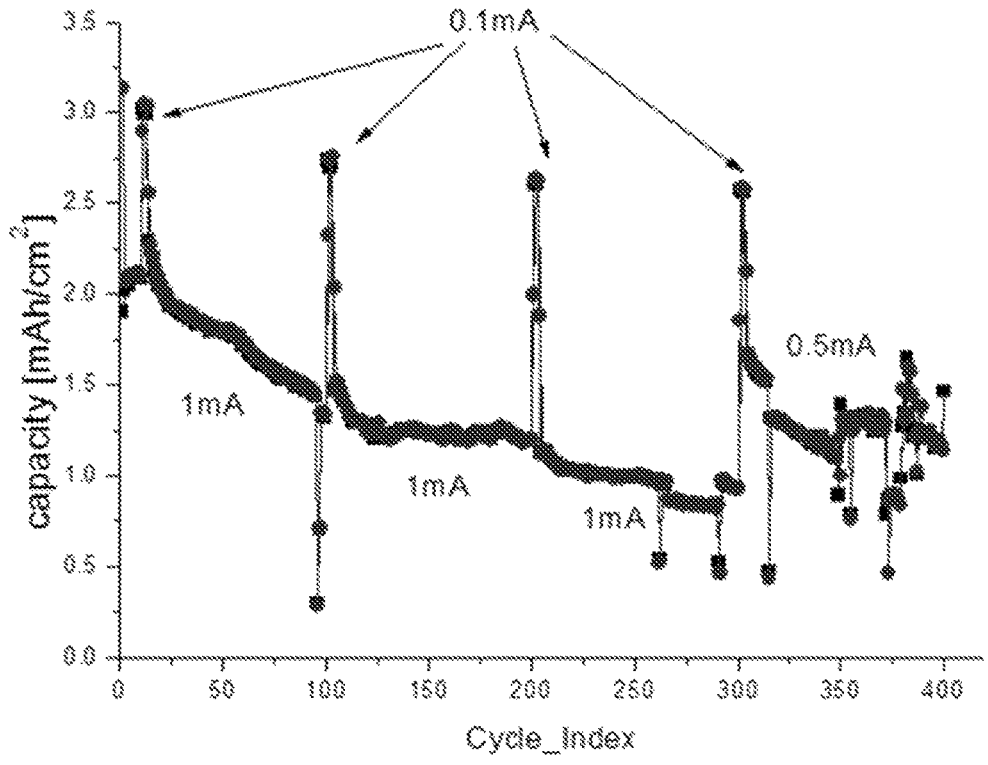
FIG. 13: Effect of LiF coating of the SiNWs on (■)—charge capacity, (●)—discharge capacity: Cycle life of about 0.5 mg SiNWs, 1.01 cm$^2$ anode with LiF coated SiNWs (cell name "FRDL1"), cycled at 0.1-1 mA/cm$^2$ and voltage range of 1-0.05V, with an average efficiency of 99.898%.
Figure 14A:
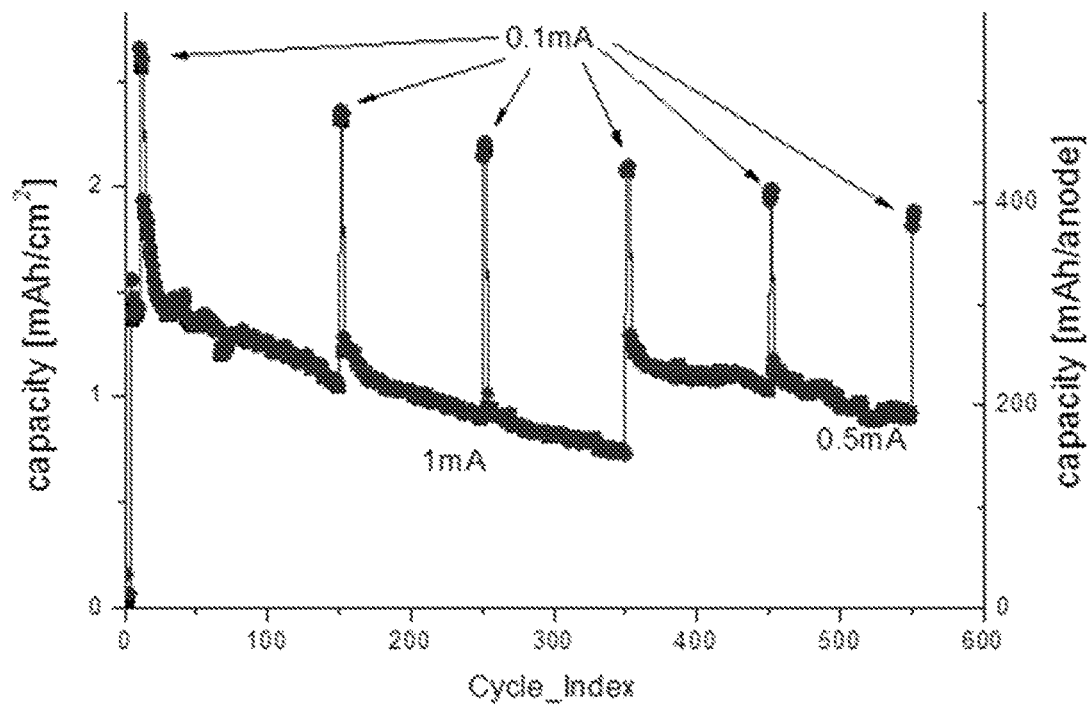
FIGS. 14A-14D: Effect of alumina coating of the SiNWs on (■)—charge capacity, (●)—discharge capacity.
Figure 14B:
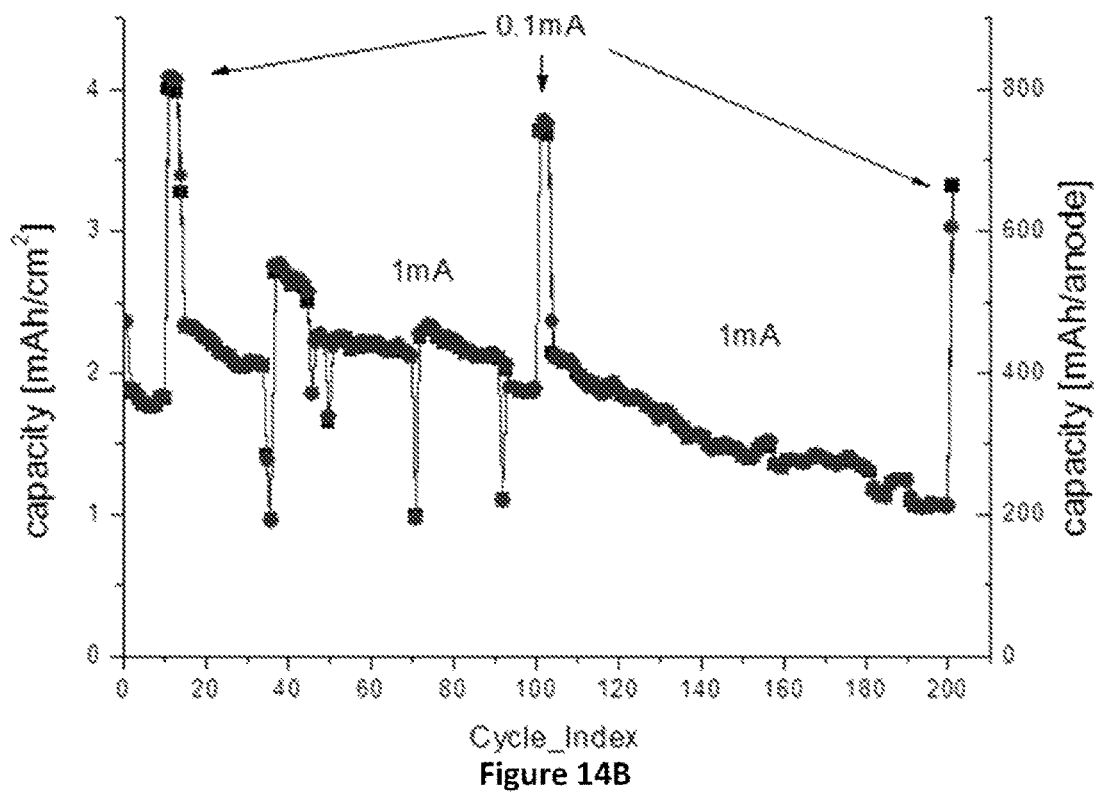
Figure 14C:
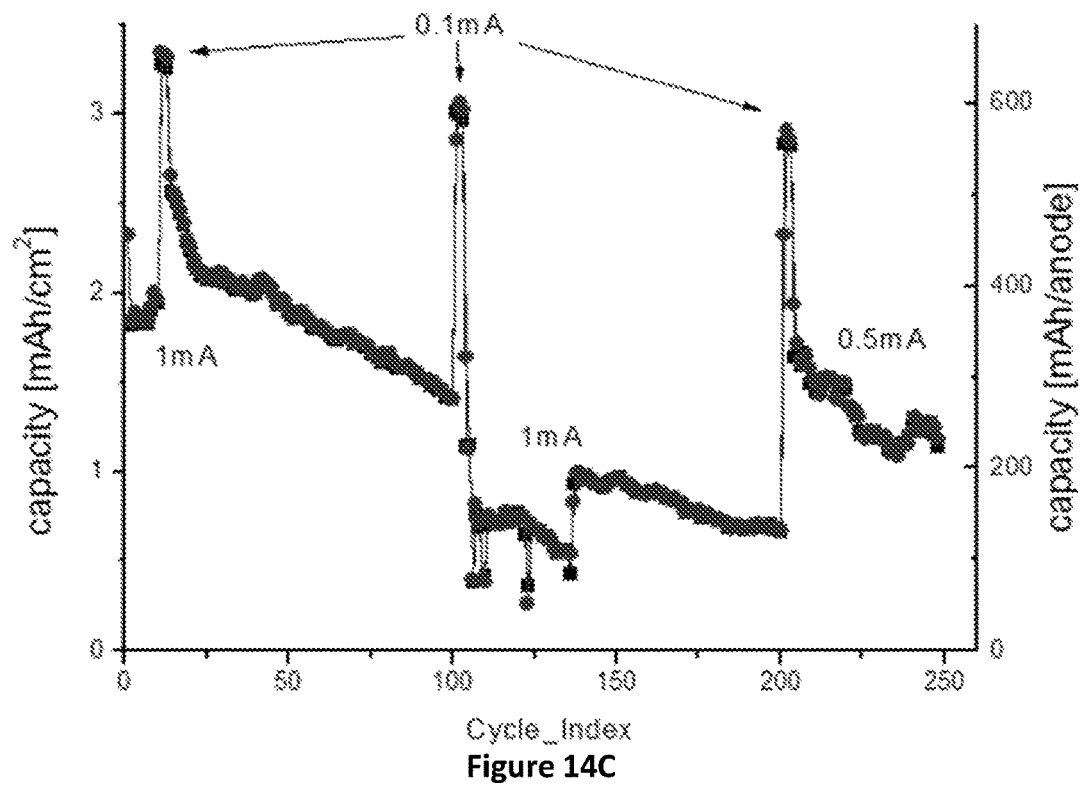
Figure 14D:
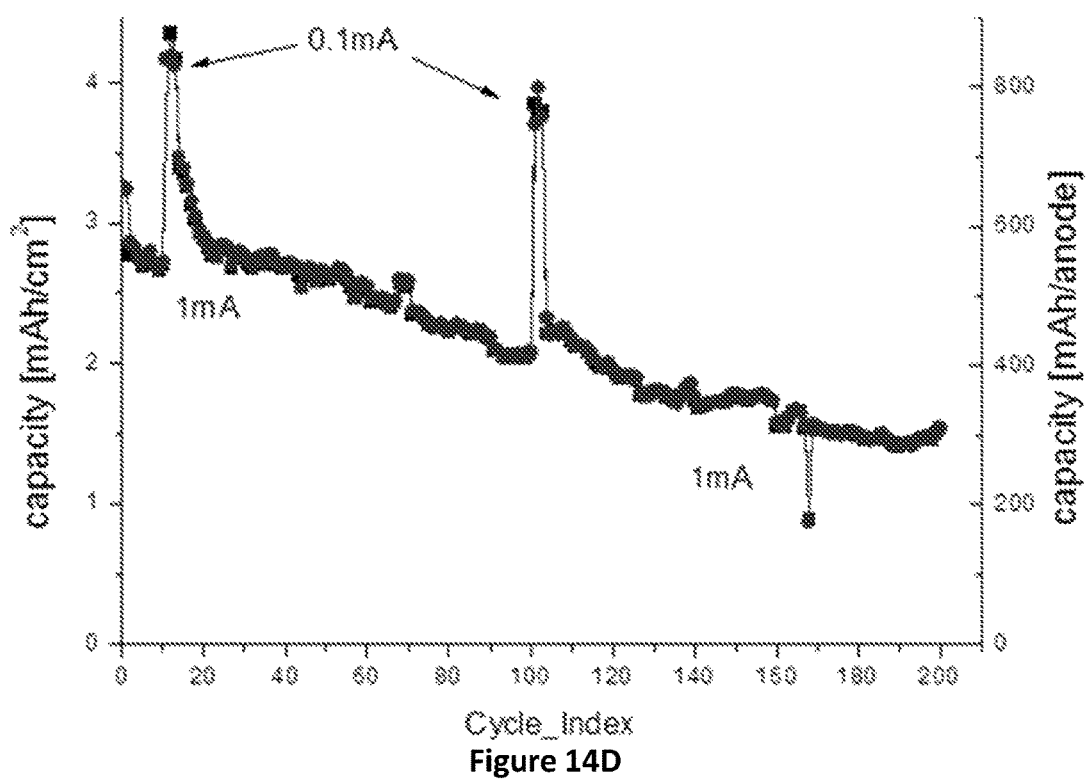

Li ion conducting coating including LiF, applied to the SiNWs by a method described in Example 1, provided an anode having an irreversible capacity of 39.3% and the average Faradaic efficiency of 99.898%. FIG. 13 shows geometric capacities of cell FRDL1, including LiF-coated SiNWs-based anode, cycled at 0.1 mA-1 mA in the voltage range of 1-0.05V. Despite the relatively low capacity, the LiF coating allowed cycling of the cell at 1 mA until cycle 300 in contrast to the cells, which were cycled at 1 mA only up to 200 cycles. LiF therefore imparts stability to the SiNWs anode and to the cell including said anode.

Cells SGLA2, SGLA3 and SGLA4 included SiNWs coated with a Li ion conducting coating including alumina. Si loading of the anodes of cells SGLA2, SGLA3 and SGLA4 was 0.42 mg/cm$^2$, 0.97 mg/cm$^2$, and 0.97 mg/cm$^2$, respectively and the weight of alumina on the SiNWs was negligible. Reference cell SGLA14 included an anode having Si loading of 0.99 mg/cm2, without alumina coating. FIGS. 14A-14D show geometric capacities of said cells cycled at 0.5 mA-1 mA in the voltage range of 1-0.05V. The average Faradaic efficiency of the anodes of cells SGLA2, SGLA3, SGLA4 and SGLA14 was 99.68% (calculated starting from cycle 5), 99.51%, 99.45% and 99.47%, respectively. The irreversible capacity of cells SGLA3, SGLA4 and SGLA14 was 20.3%, 21.9% and 14.7%, respectively. Accordingly, anodes including alumina coating on the SiNWs show a noticeable improvement in the cycle-life stability and the stability of current efficiency.

Example 8—SiNWs Bonding Stability

Cells FRDS11 and FRDS14 were disassembled after 300 cycles of operation and the anodes were washed with DMC, ethanol and water. The anodes were assembled in the cells again and ran for additional 200 cycles. Washing and reassembly of the cells provided charge and discharge capacities, which were only about 20% lower than the initial capacities, wherein the cells were ran at the same currents. It can therefore be contemplated that the decrease in the geometric capacity of the anode during the cell cycling mainly results from the adsorption of decomposition products on the substrate and not from the detachment or pulverization of the SiNWs.

It is appreciated by persons skilled in the art that the present invention is not limited by what has been particularly shown and described hereinabove. Rather the scope of the present invention includes both combinations and sub-combinations of various features described hereinabove as well as variations and modifications. Therefore, the invention is not to be constructed as restricted to the particularly described embodiments, and the scope and concept of the invention will be more readily understood by references to the claims, which follow.

The invention claimed is:

1. An anode comprising:
    an electrically conductive substrate, comprising at least one continuous non-uniform surface; and
    a random network of silicon nanowires (SiNWs) chemically grown on the at least one non-uniform surface of the substrate,
    wherein the SiNWs have at least about 30% amorphous morphology.

2. The anode according to claim 1, wherein said anode is a lithium ion battery anode.

3. The anode according to claim 1, wherein from about 30% to about 95% of the mass of each SiNW is amorphous.

4. The anode according to claim 1, wherein the SiNWs have a core-shell structure, wherein the shell is amorphous.

5. The anode according to claim 1, wherein the SiNWs have a thickness of from about 10 nm to about 500 nm and a length of from about 1 μm to about 200 μm.

6. The anode according to claim 1, having a silicon loading on the substrate of from about 0.5 mg/cm$^2$ to about 20 mg/cm$^2$.

7. The anode according to claim 1, wherein the substrate comprises a non-uniform bulk portion, comprising a plurality of non-uniform surfaces, wherein the SiNWs are chemically grown in the non-uniform bulk portion.

8. The anode according to claim 1, wherein the at least one non-uniform surface comprises elongated structures, selected from the group consisting of fibers, trenches and combinations thereof.

9. The anode according to claim 8, wherein the elongated structures have a thickness of from about 0.1 μm to about 100 μm and a length of from about 1 mm to about 10000 mm.

10. The anode according to claim 1, wherein the substrate comprises a material selected from the group consisting of carbon, graphite, metal, metal alloy and combinations thereof.

11. The anode according to claim 10, wherein the metal or metal alloy comprises at least one element selected from the group consisting of copper (Cu), nickel (Ni), iron (Fe) and chromium (Cr).

12. The anode according to claim 1, wherein the substrate is selected from the group consisting of paper, woven cloth, non-woven cloth, film and foil.

13. The anode according to claim 12, wherein the surface of the film or foil is selected from the group consisting of an etched, carved, scratched, engraved surface and combinations thereof.

14. The anode according to claim 13, wherein the substrate further comprises a carbon or graphite coating.

15. The anode according to claim 1, wherein the substrate has a thickness of from about 5 μm to about 500 μm.

16. The anode according to claim 1, wherein the SiNWs comprise a conducting coating selected from the group consisting of an electron conducting coating, a Li cation conducting coating and a combination thereof.

17. The anode according to claim 16, wherein the electron conducting coating comprises a material selected from the group consisting of carbon, graphite, reduced graphene oxide and combinations thereof.

18. The anode according to claim 16, wherein the Li cation conducting coating comprises a solid lithium electrolyte, selected from the group consisting of lithium imide ($Li_3N$), lithium oxide ($Li_2O$), lithium sulfate ($Li_2SO_4$), lithium fluoride (LiF), lithium phosphate ($Li_3PO_4$), lithium carbonate ($Li_2CO_3$) and combinations thereof; or a ceramic coating selected from the group consisting of aluminum oxide ($Al_2O_3$), zinc oxide (ZnO), titanium oxide (TiO), hafnium oxide (HfO) and combinations thereof.

19. A lithium ion battery comprising the anode according to claim 2 and further comprising an electrolyte, comprising a Li salt selected from the group consisting of lithium hexafluorophosphate ($LiPF_6$), lithium trifluoromethanesulfonate (lithium triflate, $CF_3SO_3Li$), lithium bis(perfluoroethylsulfonyl)imide and combinations thereof and at least one cathode selected from the group consisting of lithium iron phosphate ($LiFePO_4$), sulfur-based cathode, lithium metal oxide-based cathode, air cathode and oxygen cathode.

20. The lithium ion battery according to claim 19, wherein the lithium metal oxide-based cathode comprises a metal selected from the group consisting of nickel (Ni), manganese (Mn), cobalt (Co) and aluminum (Al).

21. The lithium ion battery according to claim 19, wherein the anode comprises a substrate comprising two opposed non-uniform surfaces, wherein the random network of SiNWs is chemically grown on said two opposed non-uniform surfaces and the anode is disposed between two cathodes.

22. The lithium ion battery according to claim 19 packed in a cell configuration selected from the group consisting of a prismatic cell, pouch cell, cylinder cell and coin cell.

23. A method of manufacturing the anode according to claim 1, the method comprising:
 a. providing an electrically conductive substrate comprising at least one continuous non-uniform surface; and
 b. chemically growing a random network of silicon nanowires (SiNWs) on the at least one non-uniform surface of the substrate.

24. The method according to claim 23, wherein the step of providing an electrically conductive substrate comprises forming a non-uniform surface on an essentially flat substrate.

25. The method according to claim 23, wherein the substrate comprises a non-uniform bulk portion, comprising a plurality of non-uniform surfaces, and wherein the step of chemically growing a random network of SiNWs further comprises growing said SiNWs in the non-uniform bulk portion of the substrate.

26. The method according to claim 23, wherein the process of chemically growing a random network of SiNWs comprises a Chemical Vapor Deposition (CVD) process.

27. The method according to claim 25, wherein the process of chemically growing a random network of SiNWs comprises a step of depositing catalytic nanoparticles on the at least one non-uniform surface of the substrate and in the non-uniform bulk portion of the substrate.

28. The method according to claim 27, wherein the deposition of the catalytic nanoparticles is performed by immersing the substrate into an aqueous colloidal solution of the catalytic nanoparticles or by electroless deposition of metal nanoparticles.

29. The method according to claim 28, wherein the substrate is immersed in the aqueous colloidal solution for at least about 5 min.

30. The method according to claim 23, further comprising a step of coating the SiNWs with a conducting coating by using a technique selected from the group consisting of CVD, Physical Vapor Deposition (PVD), pyrolysis of a precursor, salt precipitation combined with thermal treatment, and combinations thereof.

* * * * *